United States Patent
Amano et al.

(10) Patent No.: US 8,917,763 B2
(45) Date of Patent: Dec. 23, 2014

(54) MOTION COMPENSATION APPARATUS, VIDEO CODING APPARATUS, VIDEO DECODING APPARATUS, MOTION COMPENSATION METHOD, PROGRAM, AND INTEGRATED CIRCUIT

(75) Inventors: Hiroshi Amano, Osaka (JP); Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 298 days.

(21) Appl. No.: 13/638,629

(22) PCT Filed: Dec. 20, 2011

(86) PCT No.: PCT/JP2011/007139
§ 371 (c)(1),
(2), (4) Date: Oct. 1, 2012

(87) PCT Pub. No.: WO2012/120582
PCT Pub. Date: Sep. 13, 2012

(65) Prior Publication Data
US 2013/0044816 A1 Feb. 21, 2013

(30) Foreign Application Priority Data
Mar. 7, 2011 (JP) ................................. 2011-049638

(51) Int. Cl.
H04N 7/26 (2006.01)
H04N 19/433 (2014.01)
H04N 7/32 (2006.01)

(52) U.S. Cl.
CPC .............................. H04N 19/00515 (2013.01)
USPC ........................................................ 375/240

(58) Field of Classification Search
USPC ....................................................... 375/240
See application file for complete search history.

(56) References Cited

U.S. PATENT DOCUMENTS 6,404,815 B1 6/2002 Sekiguchi et al.
6,736,606 B1 5/2004 Ohmi et al.
(Continued)

FOREIGN PATENT DOCUMENTS

JP 2004-218648 8/2004
JP 2005-277968 10/2005
(Continued)

OTHER PUBLICATIONS

International Search Report issued Apr. 3, 2012 in International (PCT) Application No. PCT/JP2011/007139.
(Continued)

*Primary Examiner* — Sath V Perungavoor
*Assistant Examiner* — Howard D Brown, Jr.
(74) *Attorney, Agent, or Firm* — Wenderoth, Lind & Ponack, L.L.P.

(57) ABSTRACT

A motion compensation apparatus performs motion compensation on a current block having a non-rectangular shape, using a reference image stored in a frame memory and includes: a reference block memory for storing part of the reference image; a frame-memory-transfer control unit which identifies, in the reference image, a pixel block having a rectangular shape and including a reference block having a non-rectangular shape and used for motion compensation, and transfers pixel data of the identified pixel block from the frame memory to the reference block memory and a motion compensation processing unit which generates a prediction block of the current block, using the reference block included in the pixel block stored in the reference block memory.

16 Claims, 46 Drawing Sheets

(56) References Cited

U.S. PATENT DOCUMENTS

| | | |
|---|---|---|
| 6,896,490 B2 | 5/2005 | Ohmi et al. |
| 7,110,456 B2 | 9/2006 | Sekiguchi et al. |
| 7,447,266 B2 | 11/2008 | Yamashita et al. |
| 7,747,094 B2 * | 6/2010 | Sekiguchi et al. ............ 382/239 |
| 7,852,343 B2 | 12/2010 | Tanaka et al. |
| 8,098,734 B2 | 1/2012 | Sekiguchi et al. |
| 8,170,105 B2 | 5/2012 | Sekiguchi et al. |
| 8,194,742 B2 | 6/2012 | Sekiguchi et al. |
| 8,275,047 B2 * | 9/2012 | Denolf .................... 375/240.25 |
| 8,345,763 B2 * | 1/2013 | Chen et al. ............... 375/240.16 |
| 2002/0118758 A1 | 8/2002 | Sekiguchi et al. |
| 2004/0191079 A1 | 9/2004 | Ohmi et al. |
| 2006/0023789 A1 | 2/2006 | Yamashita et al. |
| 2006/0133508 A1 | 6/2006 | Sekiguchi et al. |
| 2006/0159180 A1 | 7/2006 | Sekiguchi et al. |
| 2007/0208919 A1 | 9/2007 | Tanaka et al. |
| 2008/0144721 A1 * | 6/2008 | Suzuki et al. ............ 375/240.24 |
| 2008/0259089 A1 | 10/2008 | Matsubara |
| 2009/0175334 A1 * | 7/2009 | Ye et al. .................... 375/240.12 |
| 2009/0196342 A1 | 8/2009 | Divorra Escoda et al. |
| 2010/0172415 A1 | 7/2010 | Sekiguchi et al. |
| 2011/0122950 A1 * | 5/2011 | Ji et al. ..................... 375/240.16 |
| 2011/0200097 A1 * | 8/2011 | Chen et al. ............... 375/240.02 |
| 2011/0200109 A1 * | 8/2011 | Joshi et al. ............... 375/240.16 |
| 2011/0200110 A1 * | 8/2011 | Chen et al. ............... 375/240.16 |
| 2012/0300850 A1 * | 11/2012 | Yie et al. .................. 375/240.16 |
| 2013/0022119 A1 * | 1/2013 | Chien et al. .............. 375/240.16 |
| 2013/0034164 A1 * | 2/2013 | Shibahara et al. ....... 375/240.16 |
| 2013/0136184 A1 * | 5/2013 | Suzuki et al. ............ 375/240.16 |
| 2013/0287312 A1 * | 10/2013 | Minezawa et al. ............ 382/233 |
| 2014/0139627 A1 * | 5/2014 | Chen et al. ...................... 348/43 |

FOREIGN PATENT DOCUMENTS

| | | |
|---|---|---|
| JP | 2008-271292 | 11/2008 |
| JP | 4180547 | 11/2008 |
| JP | 2010-258530 | 11/2010 |
| WO | 98/42135 | 9/1998 |
| WO | 2005/109205 | 11/2005 |
| WO | 2008/016605 | 2/2008 |
| WO | 2008/016609 | 2/2008 |

OTHER PUBLICATIONS

Òscar Divorra Escoda et al., "Geometry-Adaptive Block Partitioning for Video Coding", Acoustics, Speech and Signal Processing, IEEE International Conference on (ICASSP 2007), Apr. 2007.

Òscar Divorra et al., "Geometry-adaptive Block Partioning", ITU—Telecommunications Standardization Sector Study Group 16 Question 6 Video Coding Experts Group (VCEG), VCEG-AF10, Apr. 2007.

* cited by examiner

- Pixels for filtering
- Pixels in decoded block

FIG. 12

|        | x_offset | y_offset | refidx | state |
|--------|----------|----------|--------|-------|
| bank0  | 0        | 0        | pic0   | valid |
| bank1  | 0        | 0        | pic0   | valid |
| bank2  | 0        | 0        | pic0   | valid |
| bank3  |          |          |        |       |
| bank4  |          |          |        |       |
| bank5  |          |          |        |       |
| bank6  |          |          |        |       |
| bank7  |          |          |        |       |
| bank8  |          |          |        |       |
| bank9  |          |          |        |       |
| bank10 |          |          |        |       |
| bank11 |          |          |        |       |
| bank12 |          |          |        |       |
| bank13 |          |          |        |       |
| bank14 |          |          |        |       |
| bank15 |          |          |        |       |

MOTION COMPENSATION APPARATUS, VIDEO CODING APPARATUS, VIDEO DECODING APPARATUS, MOTION COMPENSATION METHOD, PROGRAM, AND INTEGRATED CIRCUIT

TECHNICAL FIELD

The present invention relates to video processing apparatuses for video data, and in particular to a motion compensation apparatus which uses non-rectangular motion compensation.

BACKGROUND ART

As widely-used recent standards for video compression techniques, there are, for example, H.261 and H.263 bp the ITU-T (International Telecommunication Union Telecommunication Standardization Sector), MPEG (Moving Picture Experts Group)-1, MPEG-2, MPEG-4, etc. by the ISO/IEC (International Organization for Standardization/International Electrotechnical Commission), and H.264/MPEG-4 AVC (Advanced Video Coding) by the JVT (Joint Video Team) as a joint team of the ITU-T and the MPEG. Furthermore, the next-generation video compression technique is now under consideration by the ITU-T, the ISO/IEC, and so on.

In general, one of the important elements of a video compression technique is inter-picture prediction involving motion compensation intended to compress the amount of information by reducing temporal redundancies between plural consecutive images that make up video. The inter-picture prediction involving motion compensation is a coding method involving (i) detecting the amount and direction of a motion in a reference image located forward or backward of a current image that is to be coded in units of an image block, (ii) generating a prediction image (hereinafter also referred to as "a motion compensation block" or "an inter prediction block"), and (iii) coding a difference value between the prediction image and the current image.

The information indicating how much and to what direction a motion compensation block in the current image to be coded is moved in the reference image located forward or backward of the current image is referred to as a motion vector. An image to be referred to is called as a reference image. The motion compensation block is capable of having an independent motion vector and a reference image. The image block necessary for motion compensation is referred to as a reference block In the inter-picture prediction involving motion compensation according to H.264/MPEG-4 AVC, seven patterns of rectangular motion compensation blocks including 16×16, 16×8, 8×16, 8×8, 8×4, 4×8, 4×4, are used.

Meanwhile, there are motion compensation techniques (hereinafter also referred to as "polygonal motion compensation" or "non-rectangular motion compensation") which adaptively changes the shape or size of a motion compensation block according to the characteristics of an image and the like in order to achieve better coding efficiency for the inter-picture prediction involving motion compensation proposed as the next-generation video compression technique in ITU-T, ISO/IEC, and so on (NPL 1, NPL 2, PTL 1, and PTL 2).

FIG. 42 shows an example of macroblock segment described in PTL 2. As shown in FIG. 42, a macroblock is segmented geometrically and each of the inter prediction blocks is decoded. In addition, FIG. 43 is a flow chart of an exemplary method of decoding the inter prediction blocks resulting from geometrical segmentation described in PTL 2.

Referring to FIG. 43, a method 100 generally shows an exemplary method of decoding the inter prediction blocks resulting from the geometrical segmentation.

The method 100 includes a starting block 112 for transferring control to a functional block 114. The functional block 114 determines whether or not a current mode type is a geometric mode type. When the current mode type is the geometric mode, the control is transferred to the functional block 116. When the current mode type is not the geometric mode, the control is transferred to an end block 120.

The functional block 116 decodes a geometric partition parameter (when, for example, proximity geometric data is available for prediction, the proximity geometric data is used to properly adapt a coding table and transfer the control to a functional block 118. The functional block 118 decodes a partition inter prediction (when, for example, proximity decoded data is available for prediction, the proximity decoded data is used to properly adapt a coding table) and transfer the control to the end block 120.

In addition, there is conventionally a motion compensation apparatus that uses a cache memory for improving memory access performance when reading a reference block (see, for example, PTL 3). FIG. 44 is a detailed flowchart of the process of determining whether or not a reference macroblock straddles a cache line boundary, and the process of changing a preload designation address, which are performed by the conventional motion compensation apparatus described in PTL 3. FIG. 45 is a diagram explaining a method of setting a preload designation address performed by a conventional motion compensation apparatus described in PTL 3, when a reference macroblock straddles the cache line boundary.

FIG. 44 is a detailed flowchart of the process of determining whether or not a reference macroblock straddles a cache line boundary, and the process of changing a preload designation address. The following describes FIG. 44 with reference to the explanation diagram of FIG. 45 for the address when the reference macroblock straddles the cache line boundary. First, in FIG. 45, it is assumed that a starting address of the uppermost row in a reference macroblock is the address A and the final address in the row is the address B. The cache line boundary is at the address C. Since the address C is positioned between the address A and the address B, it is determined that the reference macroblock straddles the cache line boundary; that is, the row of the reference macroblock includes the cache line boundary.

In Step S21 of FIG. 44, the top address in the row of the reference cache line boundary macroblock is calculated and the address is determined as the address A, and in Step S22, the final address in the row of the reference macroblock is calculated and the address is determined as the address B. Then in Step S 23, whether or not the cache line boundary is present between the address A and the address B is determined. When it is determined that the cache line boundary is present, the address is calculated as the address C. In Step S24, it is determined that the cache line boundary is straddled, and in Step S25, the preload designation address; that is the top address in preloading, is changed from the address A in the conventional example into the address C. When the cache line boundary is not present between the address A and the address B, it is determined that the cache line boundary is not straddled in Step S26, and in Step S27, the preload designation address is determined as being the top address in the row; that is the address A.

As described in FIG. 45, when the reference macroblock straddles the cache line boundary, the preload top address is set as the address C, so that a previous region of the perform; that is, the region A in FIG. 45 is not to be preloaded in the decoding process on a macroblock this time. Thus, there is a possibility of cache miss according to the region A; however, it is more likely that a macroblock close to a left end is a preloaded macroblock than a macroblock closer to a right end in a macroblock in the reference frame image even taking a motion vector into account, by employing a macroblock scanning method in the raster order; that is, by decoding starting from a macroblock at the left end in the row.

Accordingly, since the region A is positioned at the left end of the reference macroblock in FIG. 45, it is highly likely that data in the region A has already preloaded in the cache memory. According to PTL 3, it is expected that cache miss is prevented from occurring by issuing a data preloading instruction according to the characteristics of video data processing.

CITATION LIST

Patent Literature

[PTL 1] WO2008/016605
[PTL 2] WO2008/016609
[PTL 3] Japanese Patent No. 4180547

Non Patent Literature

[NPL 1] Oscar Divorra Escoda et al, "GEOMETRY-ADAPTIVE BLOCK PARTITIONING FOR VIDEO CODING" In Proc. Of International Conference on Acoustics, Speech, and Signal Processing (ICASSP 2007), April 2007
[NPL 2] Oscar Divorra et al, "Geometry-adaptive Block Partioning" ITU-Telecommunications Standardization Sector STUDY GROUP 16 Question 6 Video Coding Experts Group (VCEG) document VCEG-AF10, April 2007

SUMMARY OF INVENTION

Technical Problem

However, with the conventional configuration described in PTL 2, there is no description regarding memory accessing to a memory in which a reference block is stored which is used for inter-picture prediction involving motion compensation proposed as a next-generation image compression technique, and there is a problem that it is difficult to reduce the amount of time from decoding header information such as a memory bandwidth and a motion vector of a memory stored in the reference block when the inter-picture prediction involving motion compensation to reading the reference block.

In addition, with the conventional configuration described in PTL 3, the method of determining whether or not there is a cache line boundary between two pixels of a left-end pixel coordinate and a right-end pixel coordinate to determine a preload address in order to improve the memory accessing performance at the time of reading a reference block necessary for motion compensation. Accordingly, when performing polygonal motion compensation, since a reference block has a polygonal shape, the reference block does not include two or more pixels in a horizontal direction in some cases, and thus with the conventional configuration in such cases, there is a problem that the preload address cannot be calculated and a problem that, even when the reference block includes two or more blocks in the horizontal direction, it is not possible to determine whether or not a cache line is straddled by calculating only once the left-end pixel and the right-end pixel in the reference block.

The present invention solves the conventional problems described above, and aims to provide a motion compensation apparatus capable of reducing the amount of time from the point when header information such as a memory bandwidth and a motion vector is decoded to the point when a reference block is read, when performing motion compensation on a polygonal (non-rectangular) current target block.

Solution to Problem

A motion compensation apparatus according to an aspect of the present invention performs motion compensation on a current block included in video and having a non-rectangular shape, using a reference image stored in a frame memory. More specifically, the motion compensation apparatus comprises a reference block memory for storing part of the reference image; a frame-memory-transfer control unit configured to identify a pixel block in the reference image and transfer pixel data of the identified pixel block from the frame memory to the reference block memory, the pixel block having a rectangular shape and including a reference block that has a non-rectangular shape and is used for the motion compensation on the current block; and a motion compensation processing unit configured to generate a prediction block of the current block, using the reference block included in the pixel block stored in the reference block memory.

According to the above-described configuration, it is possible to reduce processing time taken for transferring pixel data from the frame memory. More specifically, the time taken for the process of identifying a rectangular pixel block is much shorter than the time taken for the process of identifying a reference block. On the other hand, since a rectangular pixel block is a larger region than a non-rectangular reference block, the time taken for transferring the rectangular pixel block from a frame memory to a reference block memory is much longer than the time taken for transferring the non-rectangular reference block. To put the above together, it is possible to reduce the processing time taken from starting the process of identifying a rectangular pixel block to completing transfer, to a larger degree compared to the case of a non-rectangular reference block.

In addition, the motion compensation apparatus may further comprise a reference-block-transfer control unit configured to extract the reference block having the non-rectangular shape from the pixel block having the rectangular shape, and transfer pixel data of the extracted reference block, from the reference block memory to the motion compensation processing unit. The motion compensation processing unit may generate the prediction block of the current block, using the reference block transferred from the reference block memory by the reference-block-transfer control unit.

As an example, the frame-memory-transfer control unit may identify the pixel block that circumscribes the reference block, and transfer pixel data of the identified pixel block from the frame memory to the reference block memory, the pixel block having the rectangular shape, and the reference block having the non-rectangular shape.

As another example, the frame-memory-transfer control unit may identify, from among a plurality of pixel blocks each included in the reference image and having the rectangular shape and a predetermined size, at least one pixel block including a pixel that is included in the reference block having the non-rectangular shape, and transfer pixel data of the identified at least one pixel block from the frame memory to the reference block memory As described above, the rectangular pixel block that is transferred from the frame memory to the reference block memory may be a single pixel block including the non-rectangular reference block or may be a group of pixel blocks including the non-rectangular reference block.

In addition, the motion compensation apparatus may further comprise a reference-block-memory-state managing unit configured to manage, per transfer block of a predetermined size, whether or not pixel data of the reference image is stored in the reference block memory. The frame-memory-transfer control unit may selectively transfer pixel data of the identified at least one pixel block which is not stored in the reference block memory, per transfer block managed by the reference-block-memory-state managing unit.

According to the above-described configuration, since it is possible to omit transferring of pixel data already stored in the reference block memory, it is possible to further reduce the processing time for transferring pixel data from the frame memory A video decoding apparatus according to an aspect of the present invention decodes a coded stream to generate decoded video. More specifically, the video decoding apparatus comprises a frame memory for storing a reference image; the motion compensation apparatus described above, and a decoding unit configured to obtain block partition information and a motion vector from the coded stream, and generate the decoded video from the coded stream, using the coded stream and the prediction block generated by the motion compensation apparatus, the block partition information indicating a shape of the reference image. The frame-memory-transfer control unit is configured to identify the pixel block, using the block partition information and the motion vector which are obtained by the decoding unit, the pixel block having the rectangular shape and including the reference block having the non-rectangular shape.

A video coding apparatus according to an aspect of the present invention codes video to generate a coded stream. More specifically, the video coding apparatus comprises: a frame memory for storing a reference image; the motion compensation apparatus described above; and a coding unit configured to generate block partition information and a motion vector, and generate the coded stream from the video, using the prediction block generated by the motion compensation apparatus, the block partition information indicating a shape of the reference image The frame-memory-transfer control unit is configured to identify the pixel block, using the block partition information and the motion vector which are generated by the coding unit, the pixel block having the rectangular shape and including the reference block having the non-rectangular shape.

A motion compensation method according to an aspect of the present invention is a method for performing motion compensation on a current block included in video and having a non-rectangular shape, using a reference image stored in a frame memory, which is performed by a motion compensation apparatus including a reference block memory for storing part of a reference image. More specifically, the motion compensation method comprises: identifying a pixel block in the reference image and transferring pixel data of the identified pixel block from the frame memory to the reference block memory, the pixel block having a rectangular shape and including a reference block that has a non-rectangular shape and is used for motion compensation on the current block; and generating a prediction block of the current block, using the reference block included in the pixel block stored in the reference block memory.

A program according to an aspect of the present invention causes a computer to perform motion compensation on a current block included in video and having a non-rectangular shape, using a reference image stored in a frame memory, the computer including a reference block memory for storing part of a reference image. More specifically, the program causes a computer to execute: identifying a pixel block in the reference image and transferring pixel data of the identified pixel block from the frame memory to the reference block memory, the pixel block having a rectangular shape and including a reference block that has a non-rectangular shape and is used for the motion compensation on the current block; and generating a prediction block of the current block, using the reference block included in the pixel block stored in the reference block memory.

An integrated circuit according to an aspect of the present invention performs motion compensation on a current block included in video and having a non-rectangular shape, using a reference image stored in a frame memory. More specifically, the integrated circuit comprises: a reference block memory for storing part of the reference image; a frame-memory-transfer control unit configured to identify a pixel block in the reference image and transfer pixel data of the identified pixel block from the frame memory to the reference block memory, the pixel block having a rectangular shape and including a reference block that has a non-rectangular shape and is used for the motion compensation on the current block; and a motion compensation processing unit configured to generate a prediction block of the current block, using the reference block included in the pixel block stored in the reference block memory.

Advantageous Effects of Invention

The present invention makes it possible to provide a motion compensation apparatus capable of reducing the amount of time from the point when header information such as a memory bandwidth and a motion vector is decoded to the point when a reference block is read, when performing polygonal (non-rectangular) motion compensation.

BRIEF DESCRIPTION OF DRAWINGS

FIG. 12 is a diagram illustrating an example of information held in a reference-block-memory-state managing unit.

DESCRIPTION OF EMBODIMENTS

Embodiments according to the present invention will be described below with reference to the drawings.

(Embodiment 1)

Figure 1:
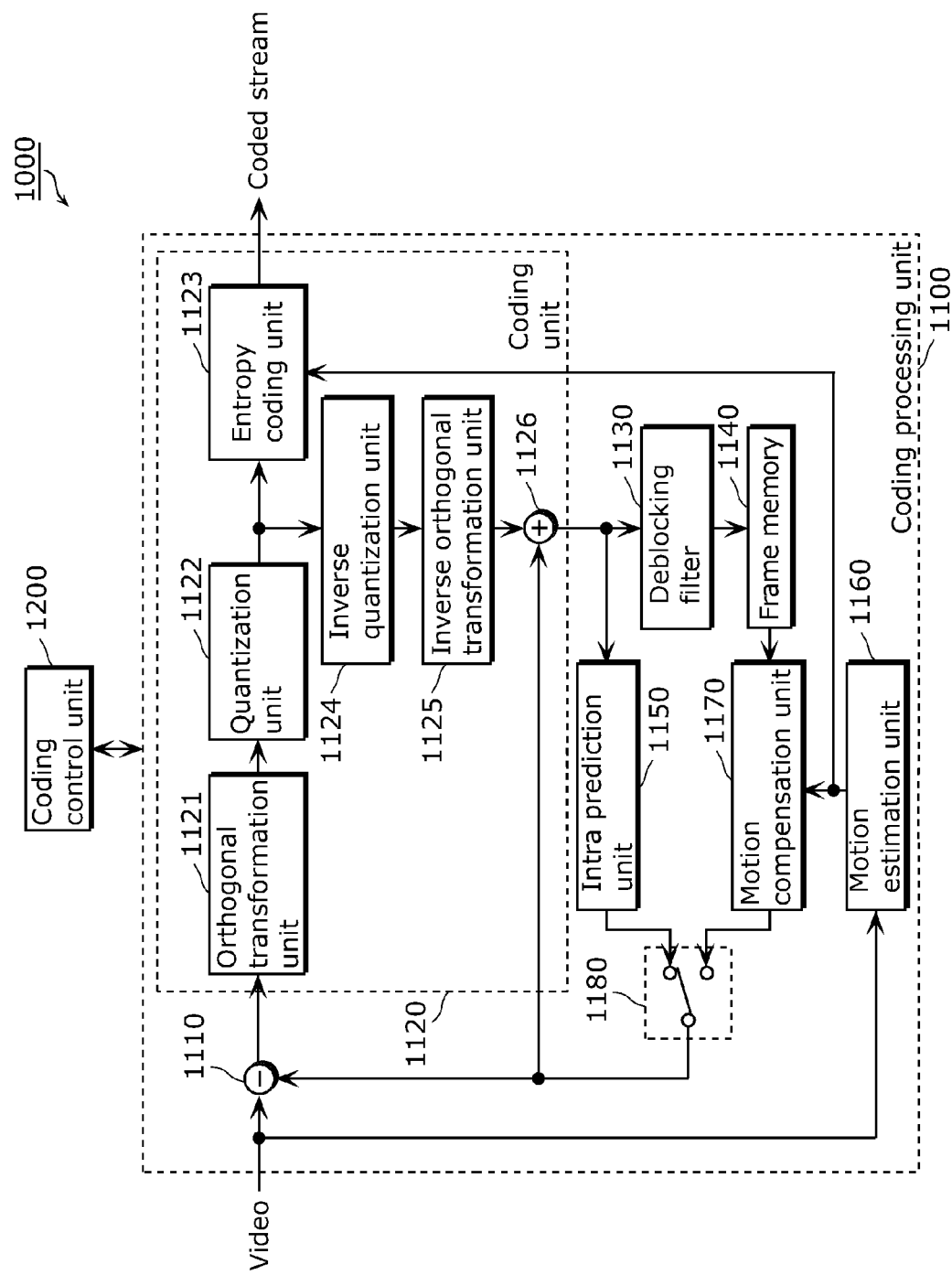
FIG. 1 is a block diagram illustrating an image coding apparatus according to Embodiment 1.

FIG. 1 is a block diagram illustrating a configuration of an image coding apparatus according to the present embodiment. An image coding apparatus 1000 includes a coding processing unit 1100 and a coding control unit 1200 that controls an operation of the coding processing unit 1100.

The coding processing unit 1100 generates a coded stream by coding video on a block-by-block basis. The coding processing unit 1100 as described above includes: a subtractor 1110; an orthogonal transformation unit 1121; a quantization unit 1122; an entropy coding unit 1123; an inverse quantization unit 1124; an inverse orthogonal transformation unit 1125; an adder 1126; a deblocking filter 1130; a frame memory 1140; an intra prediction unit 1150; a motion compensation unit 1170; a motion estimation unit 1160; and a switch 1180.

The subtractor 1110 obtains video, while obtaining a prediction image (prediction block) from the switch 1180. Then, the subtractor 1110 generates a residual image (a residual block by subtracting the prediction image from a target block to be coded (current block) included in the video.

The orthogonal transformation unit 1121 performs orthogonal transformation such as discrete cosine transformation on the residual image generated by the subtractor 1110, thereby transforming the residual image into a coefficient block including plural frequency coefficients. The quantization unit 1122 quantizes each of the frequency coefficients included in the coefficient block, thereby generating a quantized coefficient block.

The entropy coding unit 1123 generates a coded stream by performing entropy coding (variable length coding) on the coefficient block quantized by the quantization unit 1122, the motion vector detected by the motion estimation unit 1160, block partition information (to be described later), reference image identifying information, and so on.

The inverse quantization unit 1124 performs inverse quantization on the coefficient block quantized by the quantization unit 1122. The inverse orthogonal transformation unit 1125 performs inverse orthogonal transformation such as inverse discrete cosine transformation on each of the frequency coefficients included in the coefficient block on which the inverse quantization is performed, thereby generating a decoded residual image (decoded residual block).

The adder 1126 adds the prediction image obtained from the switch 1180 and the decoded residual image generated by the inverse orthogonal transformation unit 1125, thereby generating a local decoded image (decoded block).

It is to be noted that, the orthogonal transformation unit 1121, the quantization unit 1122, the entropy coding unit 1123, the inverse quantization unit 1124, the inverse orthogonal transformation unit 1125, and the adder 1126 described above are included in a coding unit 1120 according to the present embodiment, however, the included elements are not limited to those described above. For example, the motion estimation unit 1160, the coding control unit 1200, or the like may further be included.

The deblocking filter 1130 removes blocking effects of the local decoded image generated by the adder 1126, and stores the local decoded image into the frame memory 1140.

The intra prediction unit 1150 performs intra prediction on the current block, using the local decoded image generated by the adder 1126, thereby generating a prediction image (prediction block).

The motion estimation unit 1160 detects a motion vector for the current block included in the video, and outputs the detected motion vector, the block partition information, and the reference image identifying information to the motion compensation unit 1170 and the entropy coding unit 1123. It is to be noted that the block partition information refers to information indicating the shape of the current block (reference block). In addition, the reference image identifying information refers to information for identifying one of the plural reference images stored in the frame memory 1140.

Figure 7:
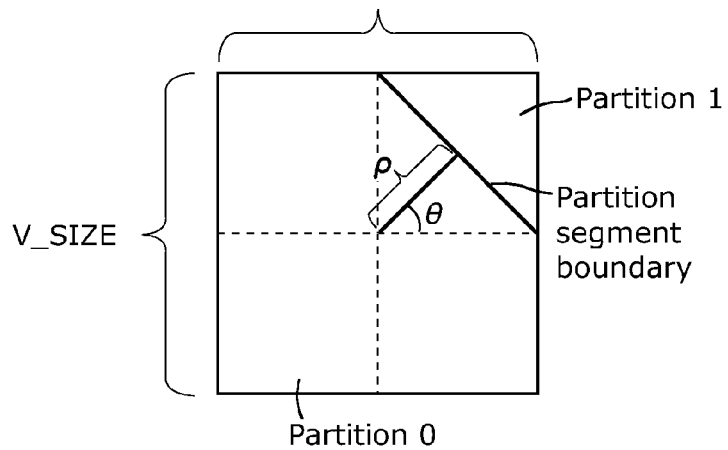
FIG. 7 is a diagram illustrating an example of the relationship between a pixel block and a partition.

As shown in FIG. 7, for example, the block partition information includes a horizontal size H_SIZE of a reference block and a vertical size V_SIZE of the reference block, and ρ and θ described in the conventional examples (PTL 1, PTL 2, NPL 1, and NPL 2).

ρ and θ are parameters that determine a partition for the reference block, and a line that is orthogonal to a line segment defined by ρ and θ is defined as a partition segment boundary, ρ represents the length of the line segment extending from the center of the pixel block orthogonally to the partition segment boundary. θ represents the angle of the line segment when the right side with respect to the center of the pixel block in a horizontal direction is 0° and a counterclockwise direction represents positive with respect to the center of the pixel block.

In addition, the left-side region with respect to the partition segment boundary is defined as a partition 0, and the right-side region with respect to the partition segment boundary is defined as a partition 1. In other words, out of two partitions segmented by the partition segment boundary, the partition including a pixel positioned at the upper left of the pixel block is defined as the partition 0, and the other partition is defined as the partition 1.

The motion compensation unit 1170 performs the motion compensation on the current block using the reference image stored in the frame memory 1140 and the motion vector detected by the motion estimation unit 1160. The motion compensation unit 1170 generates a prediction image (prediction block) for the current block, based on the motion compensation described above.

It is to be noted that the motion compensation unit 1170 according to the present invention is capable of performing motion compensation for a rectangular current block and motion compensation for a non-rectangular current block. In addition, "rectangular" in the present application corresponds to a square and a rectangle. On the other hand, "non-rectangular" in the present application corresponds to shapes not corresponding to the rectangular, more specifically, shapes including: a polygon other than a quadrangle, such as a trapezoid, a parallelogram, a triangle, a pentagon, and so on; a circle; an ellipse; and so on.

The switch 1180, when the intra prediction coding is performed on the current block, outputs the prediction image generated by the intra prediction unit 1150 to the subtractor 1110 and the adder 1126. On the other hand, the switch 1180, when the inter-picture prediction coding is performed on the current block, outputs the prediction image generated by the motion compensation unit 1170 to the subtractor 1110 and the adder 1126.

Figure 2A:
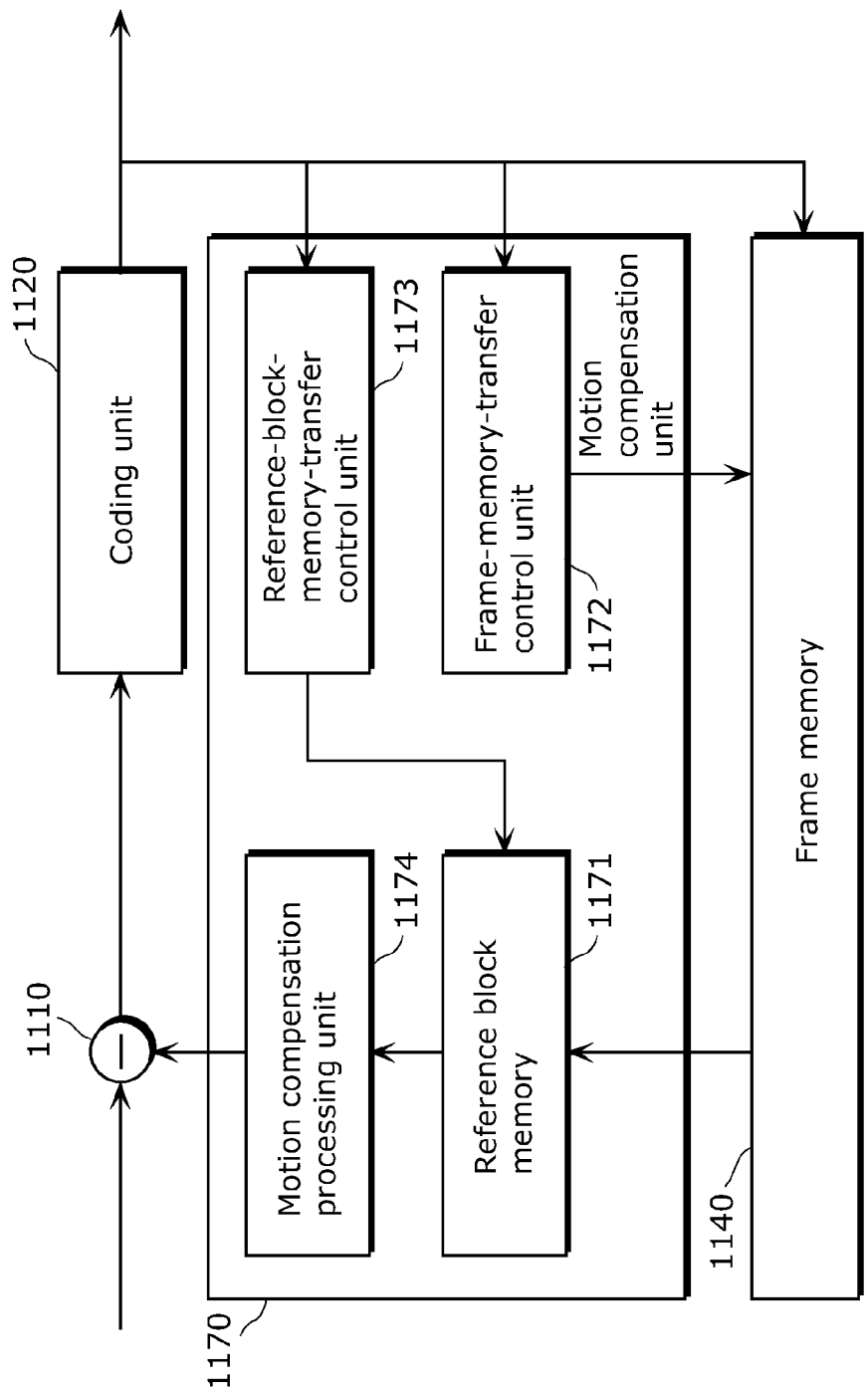
FIG. 2A is an example of a block diagram of a motion compensation unit.

Next, with reference to FIG. 2A, an example of a configuration of the motion compensation unit (motion compensation apparatus) will be explained. FIG. 2A is an example of a block diagram of the motion compensation unit 1170. The motion compensation unit 1170 shown in FIG. 2A includes a reference block memory 1171, a frame-memory-transfer control unit 1172, a reference-block-memory-transfer control unit 1173, and a motion compensation processing unit 1174.

The reference block memory 1171 is a storage unit for storing part of the reference image stored in the frame memory 2140. More specifically, the part of the reference image, which is used for processing in the motion compensation processing unit 1174, is stored.

It is to be noted that the reference block memory 1171 typically is a storage unit having a storage capacity smaller than the storage capacity of the frame memory 2140, and higher data-reading speed than the data-reading speed of the frame memory 2140. Typically, the frame memory 2140 is a DRAM (dynamic random access memory) and the reference block memory 1171 is an SRAM (static random access memory); however, but the frame memory 2140 and the reference block memory 1171 are not limited to those memories.

The frame-memory-transfer control unit 1172 transfers pixel data of a pixel block that is a region of part of the reference image, from the frame memory 2140 to the reference block memory 1171. It is to be noted that the pixel block refers to a rectangular region including the reference block used by the motion compensation processing unit 1174. In addition, the reference block refers to a region which is part of the reference image and used for motion compensation performed on a current block. Here, the current block and the reference block normally have the same shape. In other words, when the current block is rectangular, the reference block is also rectangular, and when the current block is non-rectangular, the reference block is also non-rectangular.

Accordingly, the frame-memory-transfer control unit 1172 identifies a position and a shape of the pixel block, based on the motion vector, the block partition information, and the reference image identifying information which are obtained from the motion estimation unit 1160. Then, when the reference block is rectangular, the frame-memory-transfer control unit 1172 transfers pixel data of a pixel block that is identical to the reference block, from the frame memory 2140 to the reference block memory 1171. On the other hand, when the reference block is non-rectangular, the frame-memory-transfer control unit 1172 identifies a pixel block that includes (typically, circumscribes) the reference block in the reference image, and transfers pixel data of the identified pixel block, from the frame memory 2140 to the reference block memory 1171.

Figure 8:
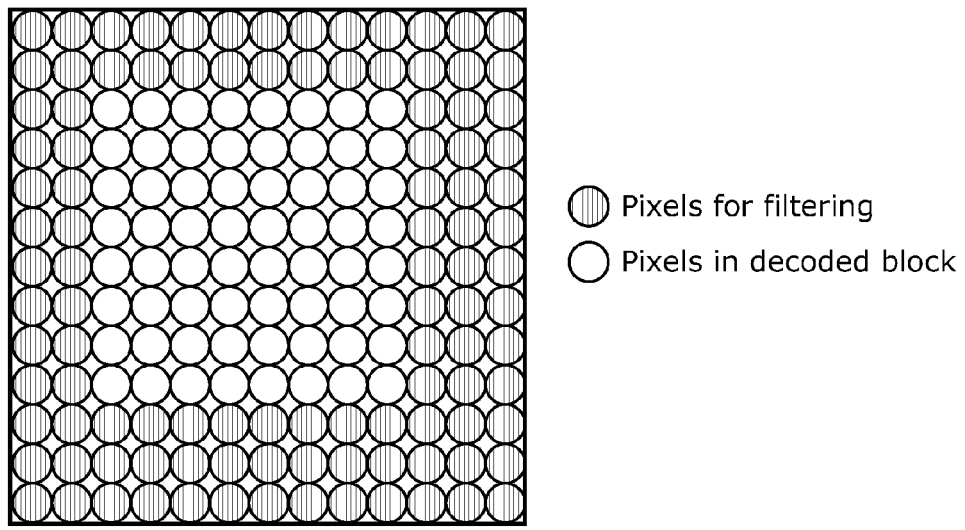
FIG. 8 is a diagram illustrating a pixel block and neighboring pixels which are transferred together with the pixel block.

However, the frame-memory-transfer control unit 1172, in practice, transfers pixel data of neighboring pixels around the identified pixel block together with the pixel data of the identified pixel block, regardless of whether the reference block is rectangular or non-rectangular. More specifically, the pixel data of the pixel block and the pixel data of neighboring pixels around the pixel block are transferred together, as shown in FIG. 8. The details will be described later.

The reference-block-memory-transfer control unit 1173 transfers pixel data of a reference block from the reference block memory 1171 to the motion compensation processing unit 1174. The reference-block-memory-transfer control unit 1173 identifies a position and a shape of the reference block, based on the motion vector, the block partition information, and the reference image identifying information which are obtained from the motion estimation unit 1160.

Then, when the reference block is rectangular, the reference-block-memory-transfer control unit 1173 transfers, as it is, the pixel data of the pixel block stored in the reference block memory 1171 to the motion compensation processing unit 1174. On the other hand, when the reference block is non-rectangular, the reference-block-memory-transfer control unit 1173 extracts a non-rectangular reference block from the rectangular pixel block, and transfers pixel data of the extracted reference block, from the reference block memory 1171 to the motion compensation processing unit 1174.

However, the reference-block-memory-transfer control unit 1173, in practice, transfers pixel data of neighboring pixels around the extracted reference block together with the pixel data of the extracted reference block, regardless of whether the reference block is rectangular or non-rectangular. The details will be described later.

The motion compensation processing unit 1174 generates a prediction block of a current block, using the reference block included in the pixel block stored in the reference block memory 1171, more specifically, the reference block transferred by the reference-block-memory-transfer control unit 1173.

Figure 2B:
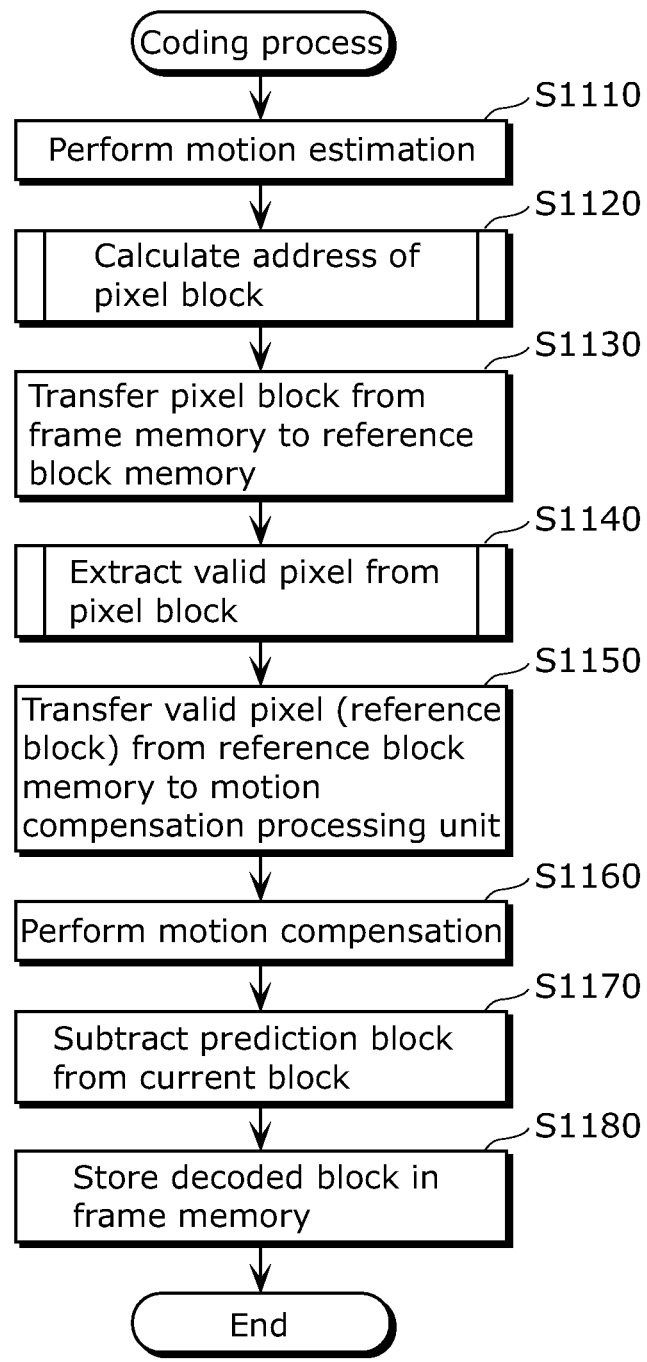
FIG. 2B is an example of a flowchart illustrating an operation of the image coding apparatus, focusing on the process performed by the motion compensation unit.

The following describes, with referenced to FIG. 2B, an operation of the image coding apparatus 1000 and the motion compensation unit 1170 shown in FIG. 1 and FIG. 2A. FIG. 2B is an example of a flowchart illustrating an operation of the image coding apparatus 1000, centering on the process performed by the motion compensation unit 1170.

First, the motion estimation unit 1160 performs motion estimation on a current block, and outputs a motion vector, block partition information, and reference image identifying information, to the motion compensation unit 1170 (Step S1110). Here, when the current block is rectangular, the block partition information can be omitted.

Next, the frame-memory-transfer control unit 1172 executes the process of calculating an address of a pixel block that is a target for transfer, in the reference image stored in the frame memory 1140, based on the motion vector, the block partition information, and the reference image identifying information which are obtained from the motion estimation unit 1160 (Step S1120).

Figure 9:
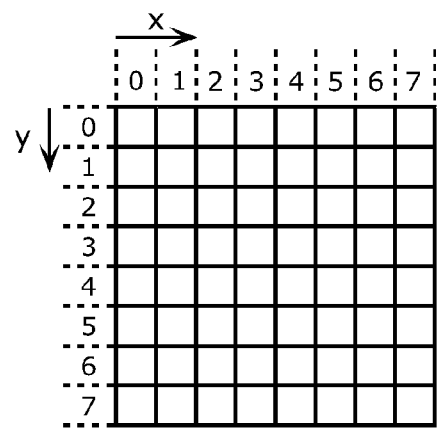
FIG. 9 is a diagram illustrating an example of an intra reference block coordinate.
Figure 10:
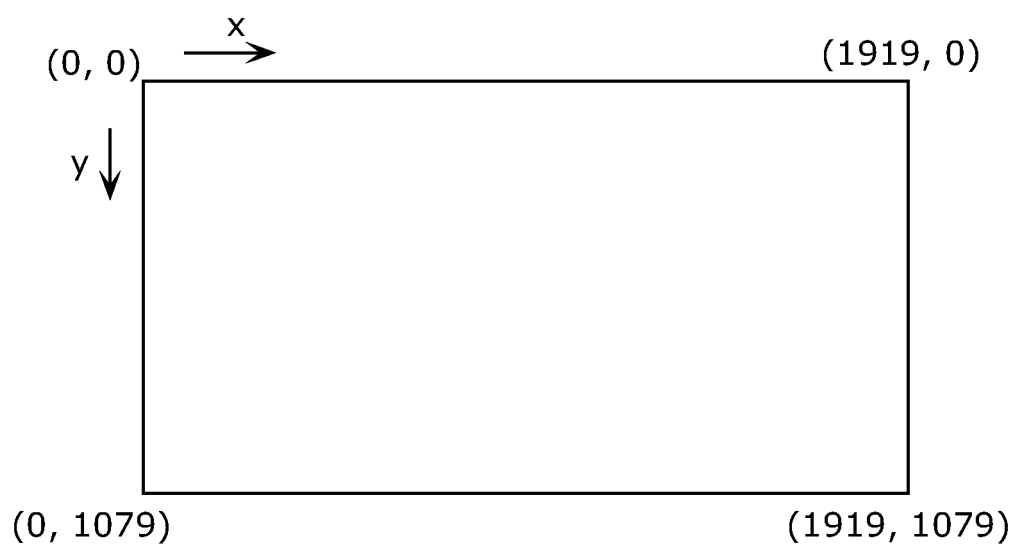
FIG. 10 is a diagram illustrating an example of an intra reference block coordinate.

FIG. 9 shows an example of a coordinate in a pixel block (intra pixel block coordinate). It is assumed that the origin is positioned at the upper-left-most point in the pixel block, the rightward direction indicates a positive direction in the horizontal direction (x coordinate), and the downward direction indicates a positive direction in the vertical direction (y coordinate). FIG. 10 shows an example of a coordinate in a reference image (intra reference image coordinate). It is assumed that the origin is positioned at the upper-left-most point in the reference image, the rightward direction indicates a positive direction in the horizontal direction (x coordinate), and the downward direction indicates a positive direction in the vertical direction (y coordinate).

The frame-memory-transfer control unit 1172, first, calculates an address of a pixel block in a coordinate system in which the upper-left-most point of the pixel block indicates (0, 0), and converts the calculated address into an coordinate system in which the upper-left-most point of the reference image indicates (0, 0). The details of the address calculating process will be described later. Then, the frame-memory-transfer control unit 1172 transfers pixel data of an identified pixel block, from the frame memory 1140 to the reference block memory 1171 (Step S1130).

Next, the reference-block-memory-transfer control unit 1173 executes the process of extracting a reference block that is the target for transfer, from the pixel blocks stored in the reference block memory 1171 (Step S1140). Hereinafter, a pixel which is the target for transfer among pixels in a pixel block; that is, a pixel included in a reference block, is referred to as an "valid pixel", and a pixel that is not a target for transfer is referred to as an "invalid pixel". The reference-block-memory-transfer control unit 1173 transfers pixel data of the extracted reference block, from the reference block memory 1171 to the motion compensation processing unit 1174 (Step S1150).

Next, the motion compensation processing unit 1174 performs motion compensation on the current block, using the motion vector obtained from the motion estimation unit 1160 and the reference block transferred by the reference-block-memory-transfer control unit 1173 (Step S1160). Then, the motion compensation processing unit 1174 outputs the pixel data of a prediction block generated by the motion compensation, to the subtractor 1110.

The subtractor 1110 subtracts the pixel data of the prediction block obtained from the motion compensation processing unit 1174 from the pixel data of a corresponding current block, thereby generating a residual block (Step S1170). Then, the subtractor 1110 outputs pixel data of the generated residual block to the coding unit 1120.

The coding unit 1120 codes the pixel data of the residual block obtained from the subtractor 1110 and outputs as a coded stream, while storing a decoded block resulting from local encoding, in the frame memory 1140 (Step S1180).

More specifically, the orthogonal transformation unit 1121 performs orthogonal transformation on the residual block, and the quantization unit 1122 quantizes the orthogonally transformed residual block. Then, the entropy coding unit 1123 performs entropy coding on the quantized coefficient generated by the quantization unit 1122 to generate a coded stream. In addition, in parallel with the process performed by the entropy coding unit 1123, the inverse quantization unit 1124 performs inverse quantization on the quantized coefficient generated by the quantization unit 1122, the inverse orthogonal transformation unit 1125 performs inverse orthogonal transformation, the adder 1126 adds the prediction block, the deblocking filter 1130 performs filtering, and a resulting decoded block is stored in the frame memory 1140.

Figure 3A:
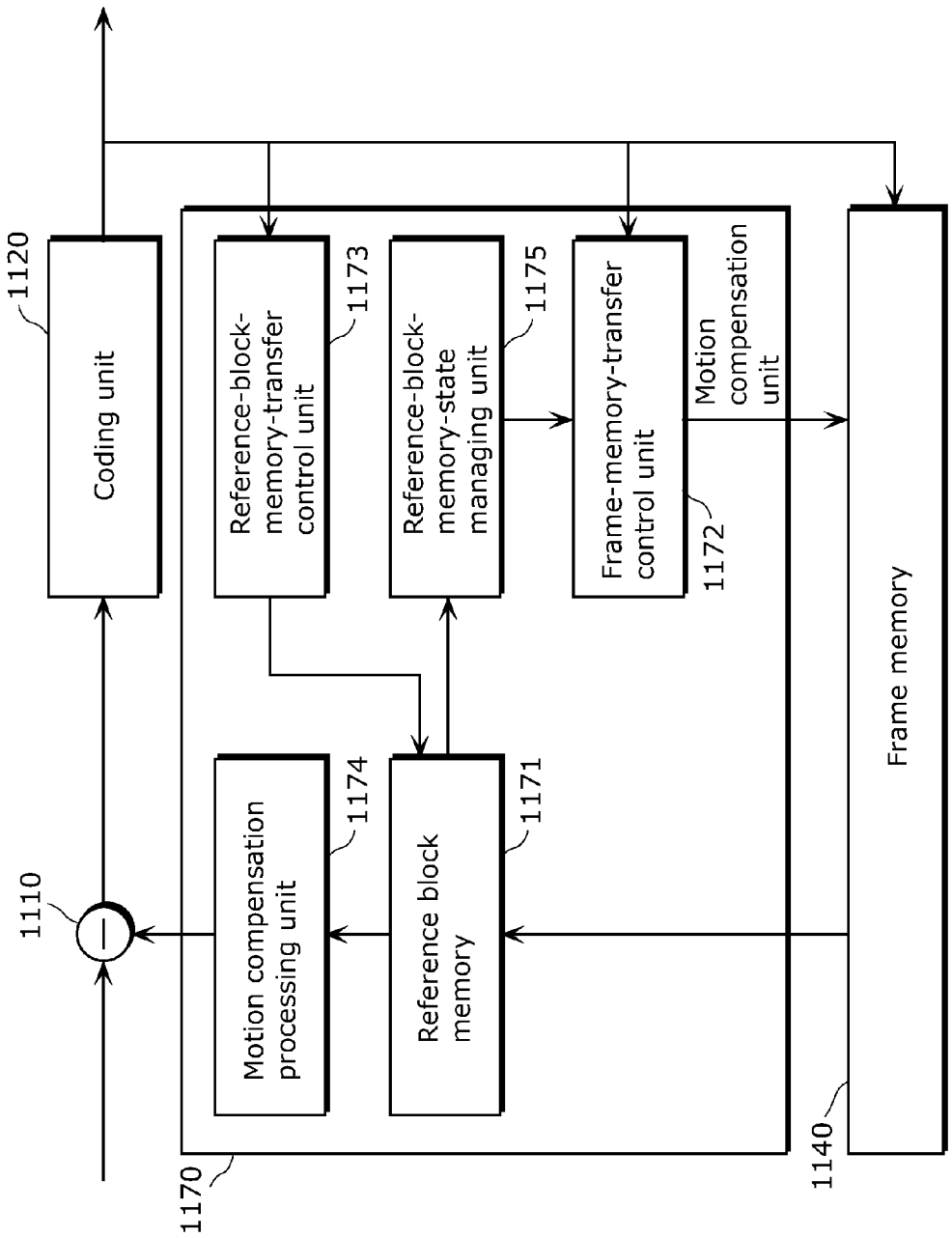
FIG. 3A is another example of a block diagram of the motion compensation unit.
Figure 3B:
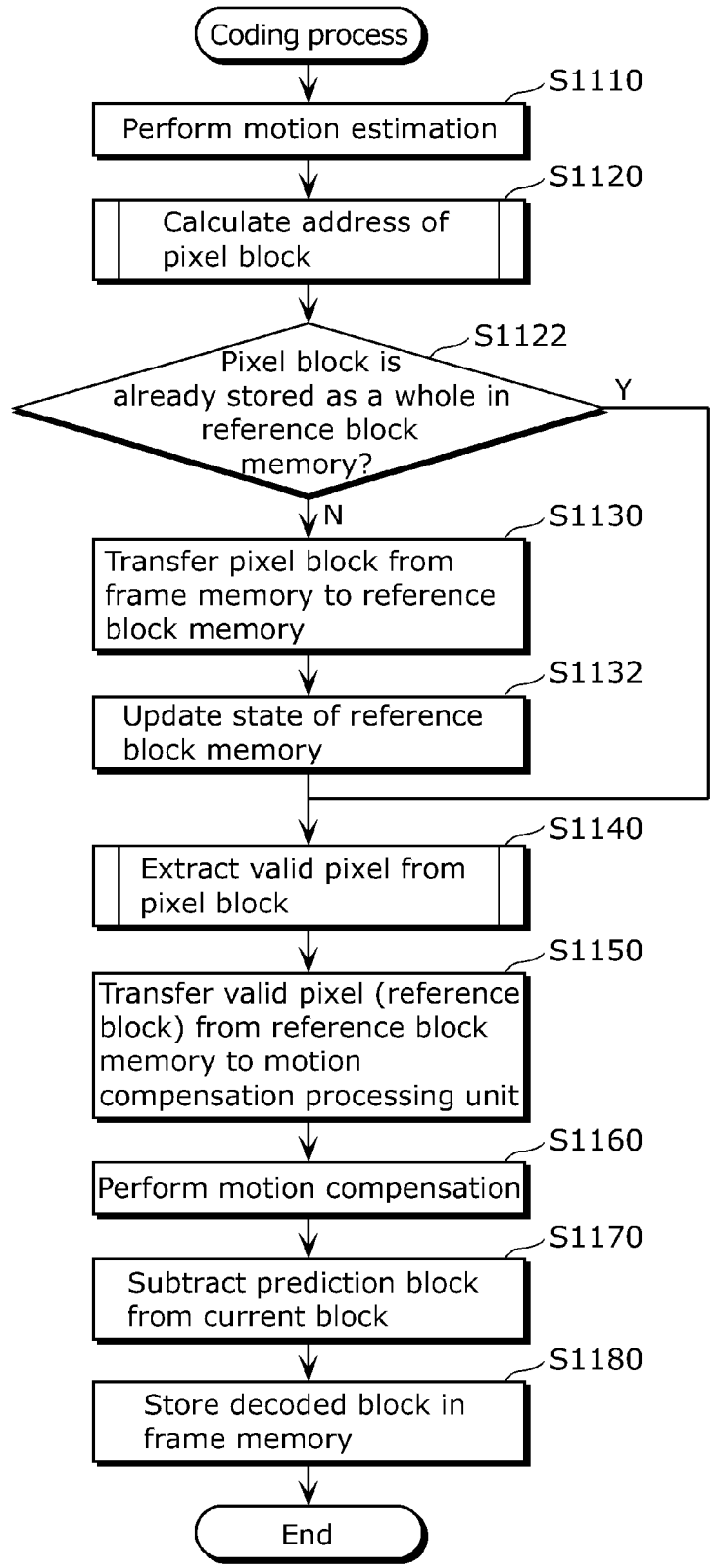
FIG. 3B is another example of a flowchart illustrating an operation of the image coding apparatus, focusing on the process performed by the motion compensation unit.

Next, with reference to FIGS. 3A and 3B, another examples of the configuration and the operation of the motion compensation unit 1170 will be explained. FIG. 3A is another example of a block diagram of the motion compensation unit 1170. FIG. 3B is another example of a flowchart illustrating an operation of the image coding apparatus 1000, centering on the process performed by the motion compensation unit 1170. It is to be noted that the same reference numerals are added to the elements common between FIG. 2A and FIG. 2B, and a detailed description for them will be omitted.

The motion compensation unit 1170 illustrated in FIG. 3A includes, in addition to the configuration shown in FIG. 2A, a reference-block-memory-state managing unit 1175. The reference-block-memory-state managing unit 1175 manages whether or not the pixel data of a reference image is stored in the reference block memory 1171, per transfer block of a predetermined size. Then, the frame-memory-transfer control unit 1172 selectively transfers pixel data of the identified pixel block which is not stored in the reference block memory 1171, per transfer block managed by the reference-block-memory-state managing unit 1175.

Figure 11:
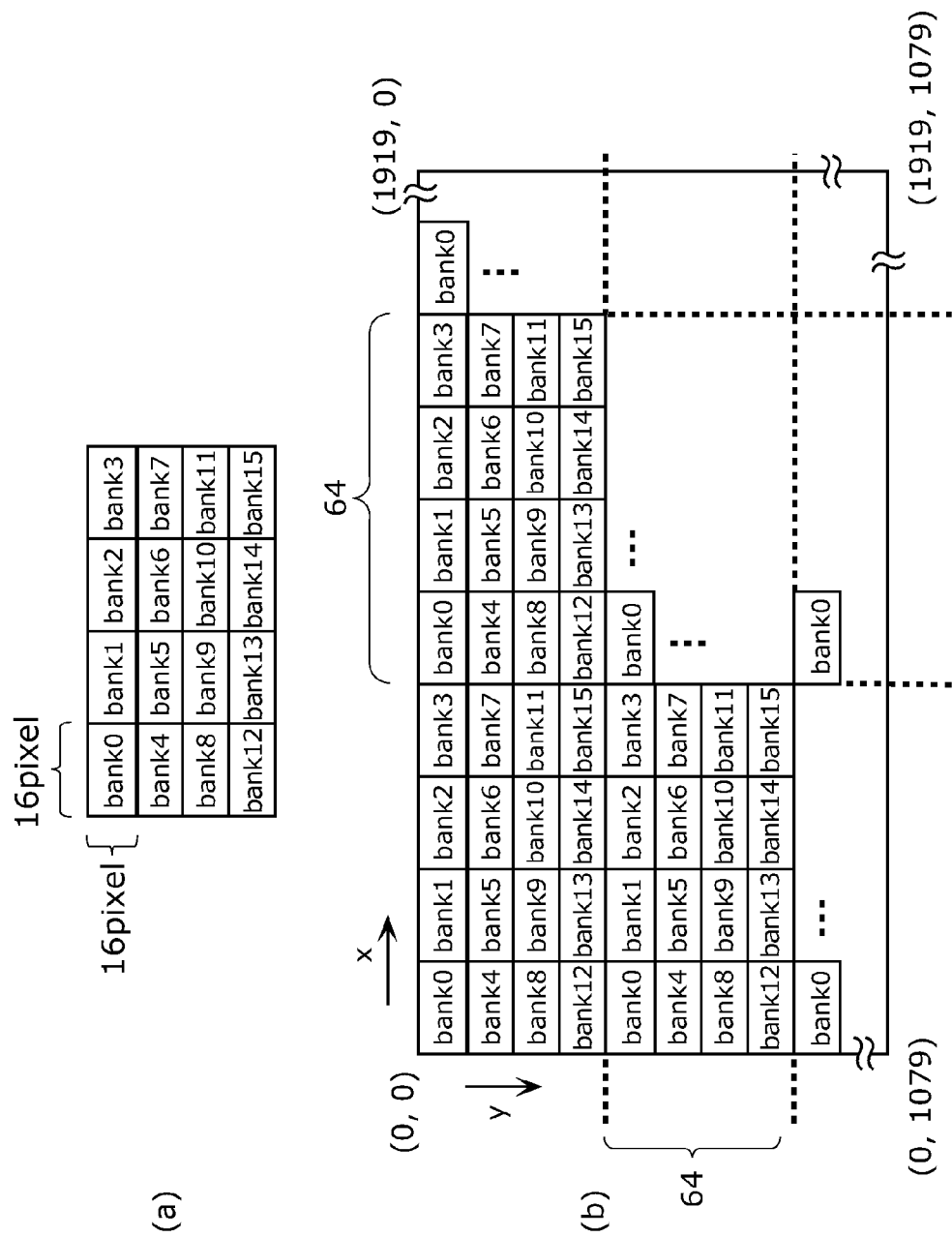
FIG. 11 is a diagram illustrating an example of the relationship between a coordinate of a reference image and a bank of a reference block memory.

FIG. 11 shows, in (a), a configuration example of the reference block memory 1171. FIG. 11 shows, in (b), an example of relation between the coordinates of the reference image and banks of the reference block memory 1171 (when the resolution is 1920×1080 pixels). FIG. 12 is an example of information held in the reference-block-memory-state managing unit 1175.

First, a storage region of the reference block memory 1171 is partitioned into banks each of which has a predetermined size (16×16 pixels, in this example) as shown in (a) in FIG. 11. Writing of pixel data on the reference block memory 1171 is performed on a bank-by-bank basis.

The reference-block-memory-state managing unit 1175 manages, on a bank-by-bank basis, (i) information for identifying a horizontal coordinate in the intra reference image coordinate of the pixel data held in the reference block memory 1171 (x_offset), (ii) information for identifying a vertical coordinate in the intra reference image coordinate of the pixel data held in the reference block memory 1171 (y_offset), (iii) information for identifying a reference image held in the reference block memory 1171 (refidx), and (iv) information representing the state of whether or not pixel data that is valid for motion compensated prediction is held (state).

It is to be noted that "x_offset" corresponds to the most significant four bits in the horizontal coordinate in the intra reference image coordinate at the vertex (the upper-left-most point) of a pixel block, for example. "y_offset" corresponds to the most significant four bits in the vertical coordinate in the intra reference image coordinate at the vertex (he upper-left-most point) of a pixel block, for example, "refidx" indicates the picture number (reference image identifying information) of the reference image, for example. In "state", for example, "valid" is set when a valid pixel is held in the bank, and "invalid" is set when a valid pixel is not held in the bank.

More specifically, x_offset, y_offset, refidx, and state of the pixel data held in the reference block memory 1171 are updated based on the coordinate information of the pixel block in the intra reference image coordinate calculated by the frame-memory-transfer control unit 1172. Then the held information is outputted to the frame-memory-transfer control unit 1172 and the reference-block-memory-transfer control unit 1173.

The information stored in the reference-block-memory-state managing unit 1175 is, for example, information as shown in FIG. 12 when the reference block memory 1171 has the configuration shown in (a) in FIG. 11 and stores part of the reference image shown in (b) in FIG. 11.

The frame-memory-transfer control unit 1172 writes, as a reference image, the decoded image outputted from the adder 1126, into the frame memory 1140. In addition, the frame-memory-transfer control unit 1172 identifies the reference image necessary for motion compensation, based on the block partition information, the reference image identifying information, and the motion vector which are obtained from the motion estimation unit 1160, and calculates a horizontal coordinate and a vertical coordinate in the intra reference image coordinate of the pixel block including the reference block.

Then, the frame-memory-transfer control unit 1172 compares the calculated horizontal coordinate and the vertical coordinate with x_offset, y_offset, refidx, and state of the pixel data held in the reference block memory 1171, which are obtained from the reference-block-memory-state managing unit 1175, and when necessary pixel data is not stored in the reference block memory 1171, reads the bank including the pixel data from the frame memory 1140 and writes the bank into the reference block memory 1171.

The reference-block-memory-state managing unit 1175 updates the x_offset, y_offset, refidx, and state of the pixel data which are read and written into the reference block memory 1171 by the frame-memory-transfer control unit 1172. On the other hand, when the necessary pixel data is stored in the reference block memory 1171, a bank is not read from the frame memory 1140.

The flowchart shown in FIG. 3B is different from the flowchart shown in FIG. 2B in that Step S1122 and Step S1132 are added. More specifically, the frame-memory-transfer control unit 1172, after the process of calculating the pixel block (Step S1120) as shown in FIG. 3B, checks whether the identified pixel block is already stored as a whole in the reference block memory 1171 (Step S1122).

When the identified pixel block as a whole is not stored in the reference block memory 1171 (N in Step S1122), the frame-memory-transfer control unit 1172 selectively transfers pixel data of the identified pixel block which is not stored in the reference block memory 1171, per transfer block managed by the reference-block-memory-state managing unit 1175 (Step S1130). Then, the reference-block-memory-state managing unit 1175 updates the state of the reference block memory according to the result of the transfer performed by the frame-memory-transfer control unit 1172 (Step S1132).

Figure 4:
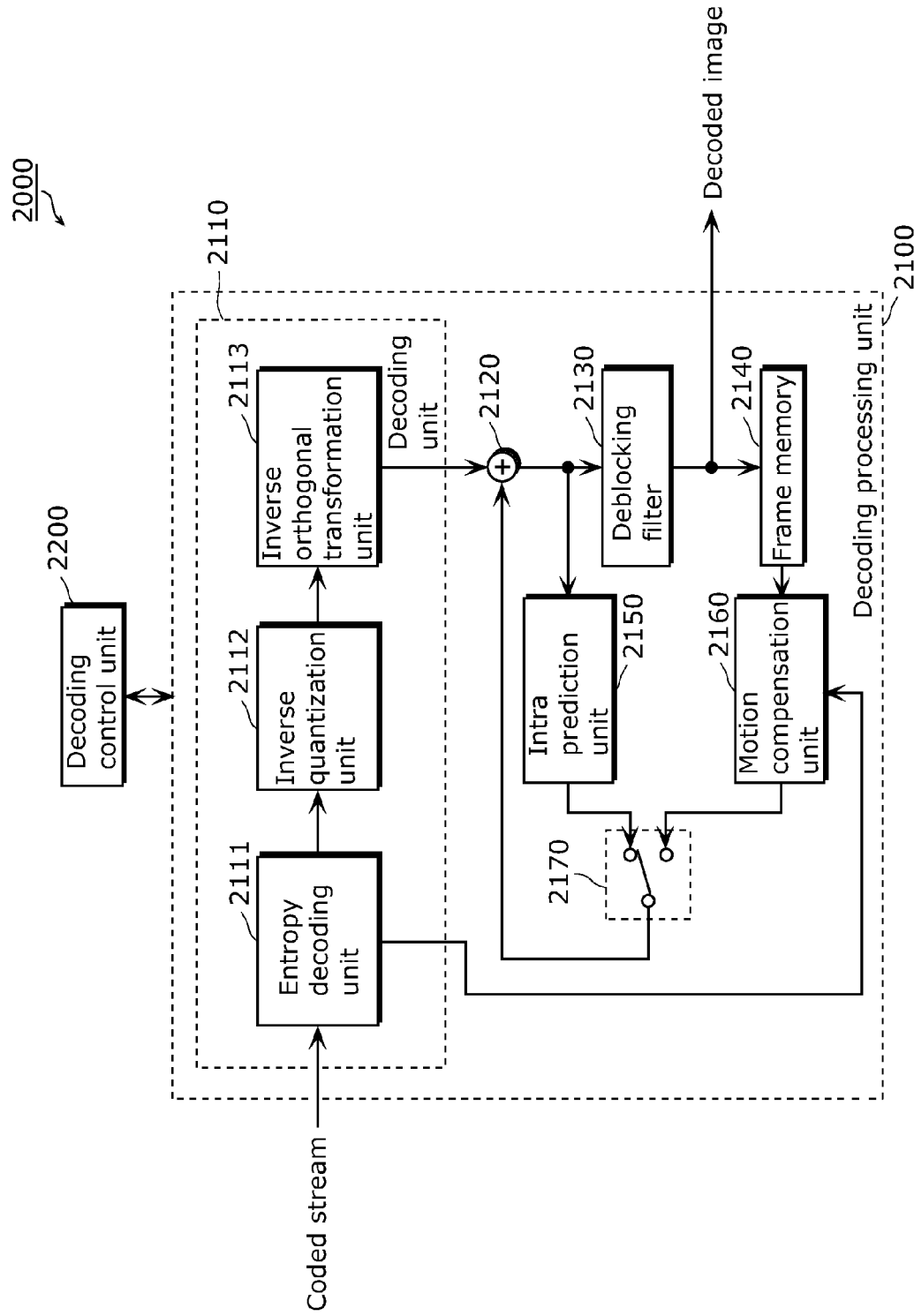
FIG. 4 is a block diagram illustrating an image decoding apparatus according to Embodiment 1.

FIG. 4 is a block diagram illustrating a configuration of an image decoding apparatus according to Embodiment 1. An image decoding apparatus 2000 includes a decoding processing unit 2100 and a decoding control unit 2200 that controls an operation of the decoding processing unit 2100.

The decoding processing unit 2100 generates a decoded image by decoding a coded stream on a block-by-block basis. The decoding processing unit 2100 as described above includes: an entropy decoding unit 2111; an inverse quantization unit 2112; an inverse orthogonal transformation unit 2113; an adder 2120; a deblocking filter 2130; a frame memory 2140; an intra prediction unit 2150; a motion compensation unit 2160; and a switch 2170.

The entropy decoding unit 2111 obtains a coded stream and performs entropy decoding (variable length decoding) on the coded stream, to generate a quantized coefficient block, a motion vector, block partition information, and reference image identifying information.

The inverse quantization unit 2112 performs inverse quantization on the quantized coefficient block resulting from the entropy decoding performed by the entropy decoding unit 2111. The inverse orthogonal transformation unit 2113 performs inverse orthogonal transformation such as inverse discrete cosine transformation on each of the frequency coefficients included in the coefficient block on which the inverse quantization is performed, thereby generating a decoded residual image (decoded residual block).

It is to be noted that, the decoding unit 2110 includes the above-described entropy decoding unit 2111, the inverse quantization unit 2112, and the inverse orthogonal transformation unit 2113 in the present embodiment; however, the elements included in the decoding unit 2110 are not limited to those units.

The adder 2120 adds the prediction image (prediction block) obtained from the switch 2170 and the decoded residual image generated by the inverse orthogonal transformation unit 2113, thereby generating a decoded image (decoded block).

The deblocking filter 2130 removes blocking effects of the decoded image generated by the adder 2120, stores the decoded image in the frame memory 2140, and outputs the decoded image.

The intra prediction unit 2150 performs intra prediction on a target block to be decoded (current block), using the decoded image generated by the adder 2120, thereby generating a prediction image (prediction block).

The motion compensation unit 2160 performs the motion compensation on the current block using the reference image that is an image stored in the frame memory 2140 and the motion vector resulting from entropy decoding performed by the entropy decoding unit 2111. The motion compensation unit 2160 generates a prediction image (prediction block) for the current block, by performing the motion compensation described above.

The switch 2170, when the intra prediction coding is performed on the current block, outputs the prediction image generated by the intra prediction unit 2150 to the adder 2120. On the other hand, the switch 2170, when the inter-picture prediction coding is performed on the current block, outputs the prediction image generated by the motion compensation unit 2160 to the adder 2120.

Figure 5A:
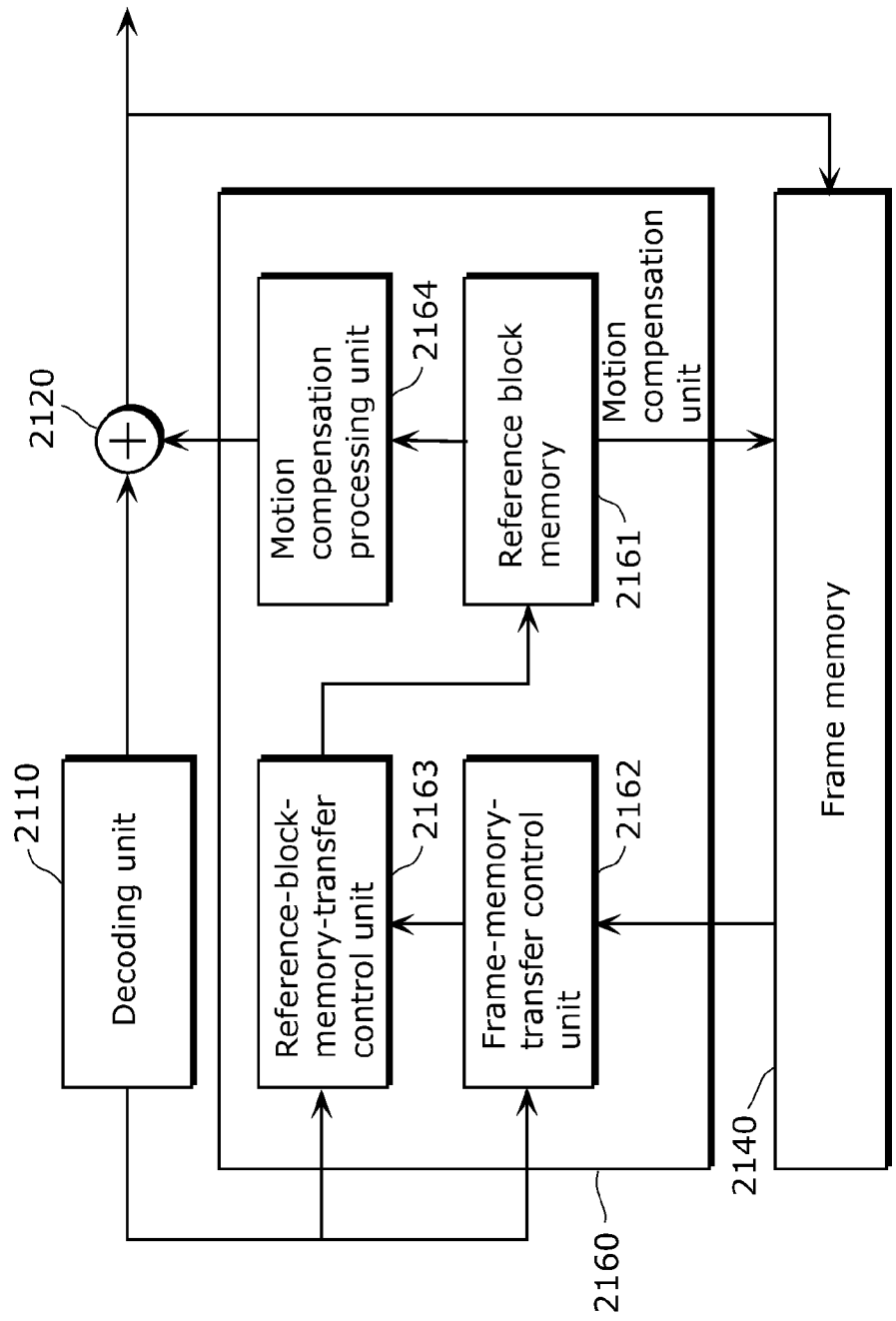
FIG. 5A is an example of a block diagram of a motion compensation unit.

Next, with reference to FIG. 5A, an example of a configuration of the motion compensation unit (motion compensation apparatus) 2160 will be explained. FIG. 5A is an example of a block diagram of the motion compensation unit 2160. The motion compensation unit 2160 shown in FIG. 5A includes a reference block memory 2161, a frame-memory-transfer control unit 2162, a reference-block-memory-transfer control unit 2163, and a motion compensation processing unit 2164. It is to be noted that each of the functional blocks of the motion compensation unit 2160 shown in FIG. 5A corresponds to a corresponding one of the functional blocks, which has the same name shown in FIG. 2A.

It is to be noted that the frame-memory-transfer control unit 2162 is different from the frame-memory-transfer control unit 1172 shown in FIG. 2A in that the motion vector, the block partition information, and the reference image identifying information are obtained from the entropy decoding unit 2111. In addition, the reference-block-memory-transfer control unit 2163 is different from the reference-block-memory-transfer control unit 1173 shown in FIG. 2A in that the block partition information is obtained from the entropy decoding unit 2111. In addition, the motion compensation processing unit 2164 is different from the motion compensation processing unit 1174 shown in FIG. 2A in that the generated prediction block is outputted to the adder 2120.

Figure 5B:
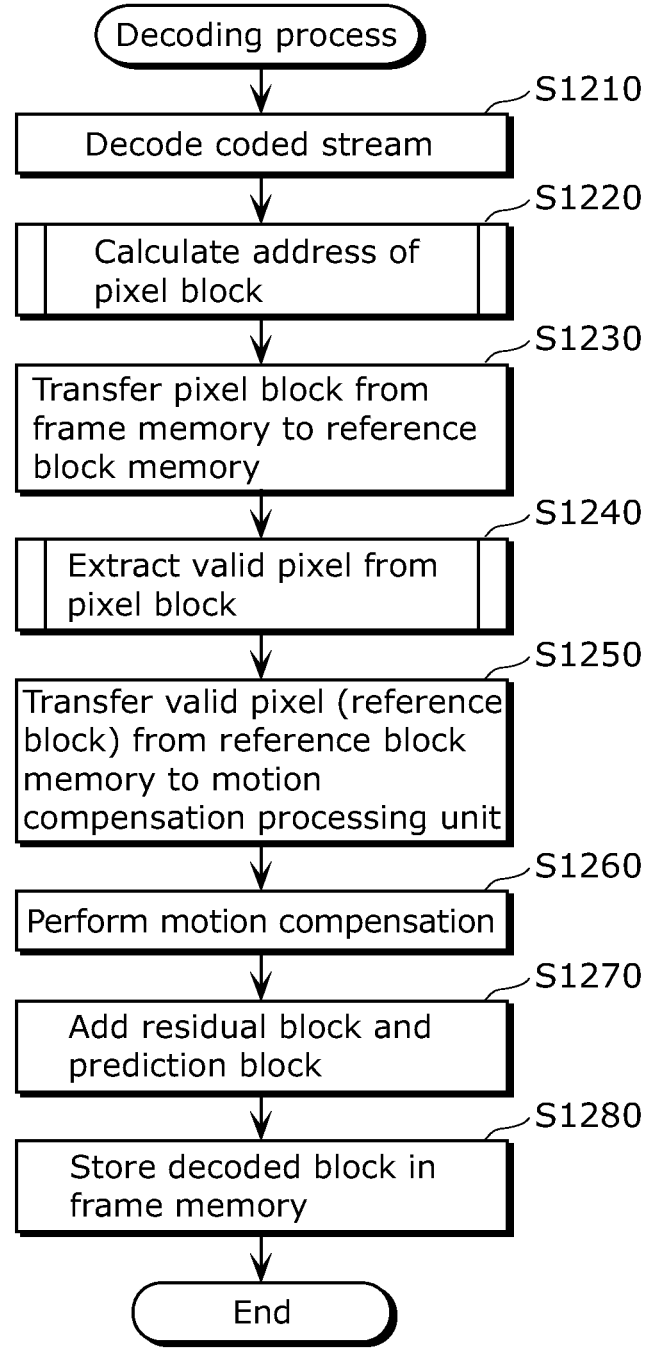
FIG. 5B is an example of a flowchart illustrating an operation of the image decoding apparatus, focusing on the process performed by the motion compensation unit.

The following describes, with referenced to FIG. 5B, an operation of the image decoding apparatus 2000 and the motion compensation unit 2160 shown in FIG. 4 and FIG. 5A. FIG. 5B is an example of a flowchart illustrating an operation of the image decoding apparatus 2000, centering on the process performed by the motion compensation unit 2160. First, the entropy decoding unit 2111 performs entropy decoding on a coded stream, to generate a quantized coefficient block, a motion vector, block partition information, and reference image identifying information (Step S1210).

Next, the frame-memory-transfer control unit 2162 executes the process of calculating an address of a pixel block that is a target for transfer, based on the motion vector, the block partition information, and the reference image identifying information which are obtained from the entropy decoding unit 2111 (Step S1220). It is to be noted that this process is the same as the process of Step S1120 shown in FIG. 2B, and the details will be described later. Then, the frame-memory-transfer control unit 2162 transfers pixel data of an identified pixel block, from the frame memory 2140 to the reference block memory 2161 (Step S1230).

Next, the reference-block-memory-transfer control unit 2163 executes the process of extracting a reference block that is the target for transfer (Step S1240). It is to be noted that this process is the same as the process of Step S1140 shown in FIG. 2B, and the details will be described later. Then, the reference-block-memory-transfer control unit 2163 transfers pixel data of the extracted reference block from the reference block memory 2161 to the motion compensation processing unit 2164 (Step S1250).

Next, the motion compensation processing unit 2164 performs motion compensation on the current block, using the motion vector obtained from the entropy decoding unit 2111 and the reference block transferred by the reference-block-memory-transfer control unit 2163 (Step S1260). Then, the motion compensation processing unit 2164 outputs the pixel data of a prediction block generated by the motion compensation, to the adder 2120.

The adder 2120 adds the pixel data of the decoded residual block obtained from the inverse orthogonal transformation unit 2113 to the pixel data corresponding to the prediction block obtained from the motion compensation processing unit 2164, to generate a decoded block (decoded image) (Step S1270). It is to be noted that the decoded residual block is obtained by performing, on the quantized coefficient block generated by the entropy decoding unit 2111, inverse quantization by the inverse quantization unit 2112 and inverse orthogonal transformation by the inverse orthogonal transformation unit 2113.

Then, the filtering processing is performed by the deblocking filter 2130 on the decoded image generated by the adder 2120 to be output as a decoded image and stored in the frame memory 2140 as a reference image (Step S1280).

Figure 6A:
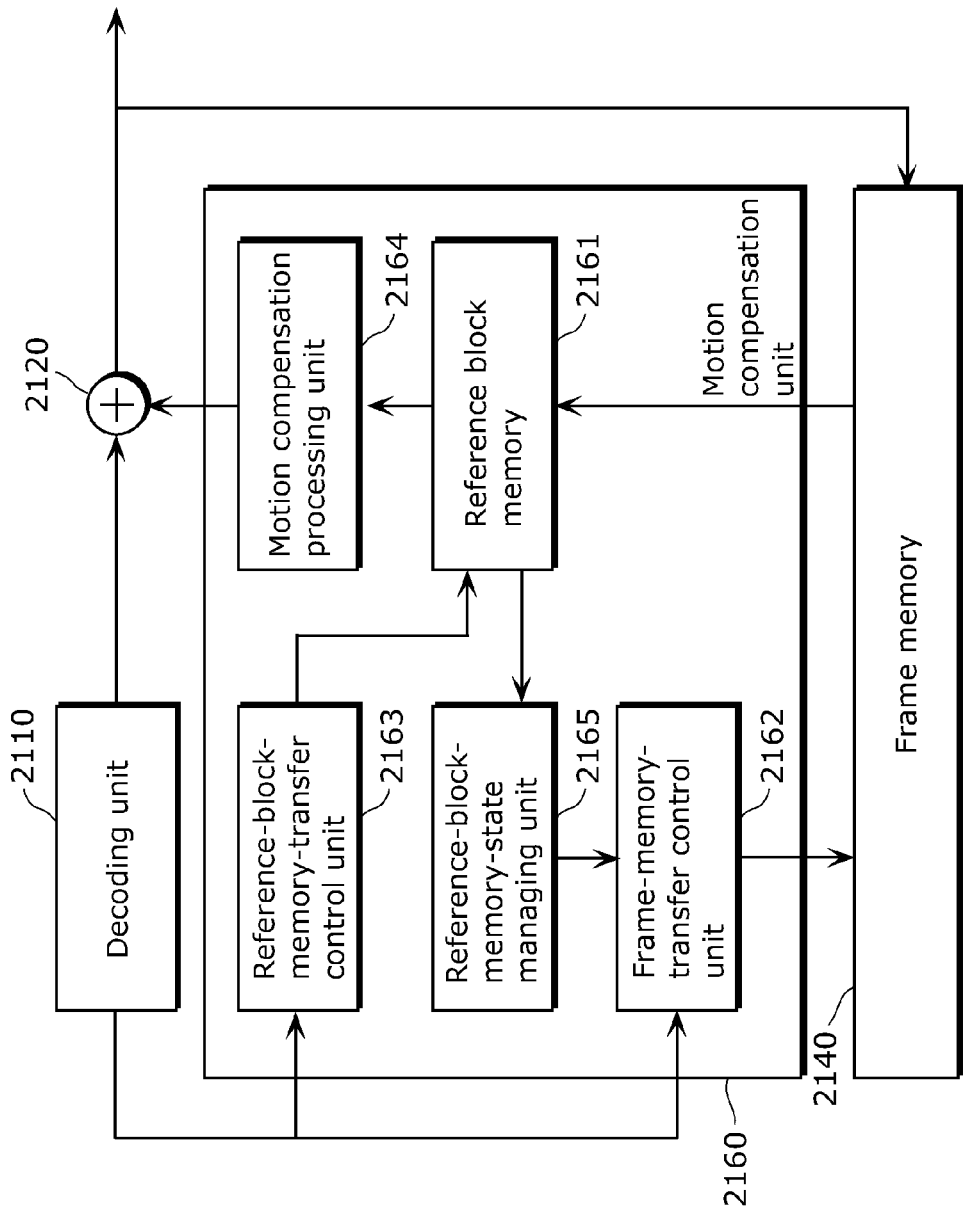
FIG. 6A is another example of a block diagram of the motion compensation unit.
Figure 6B:
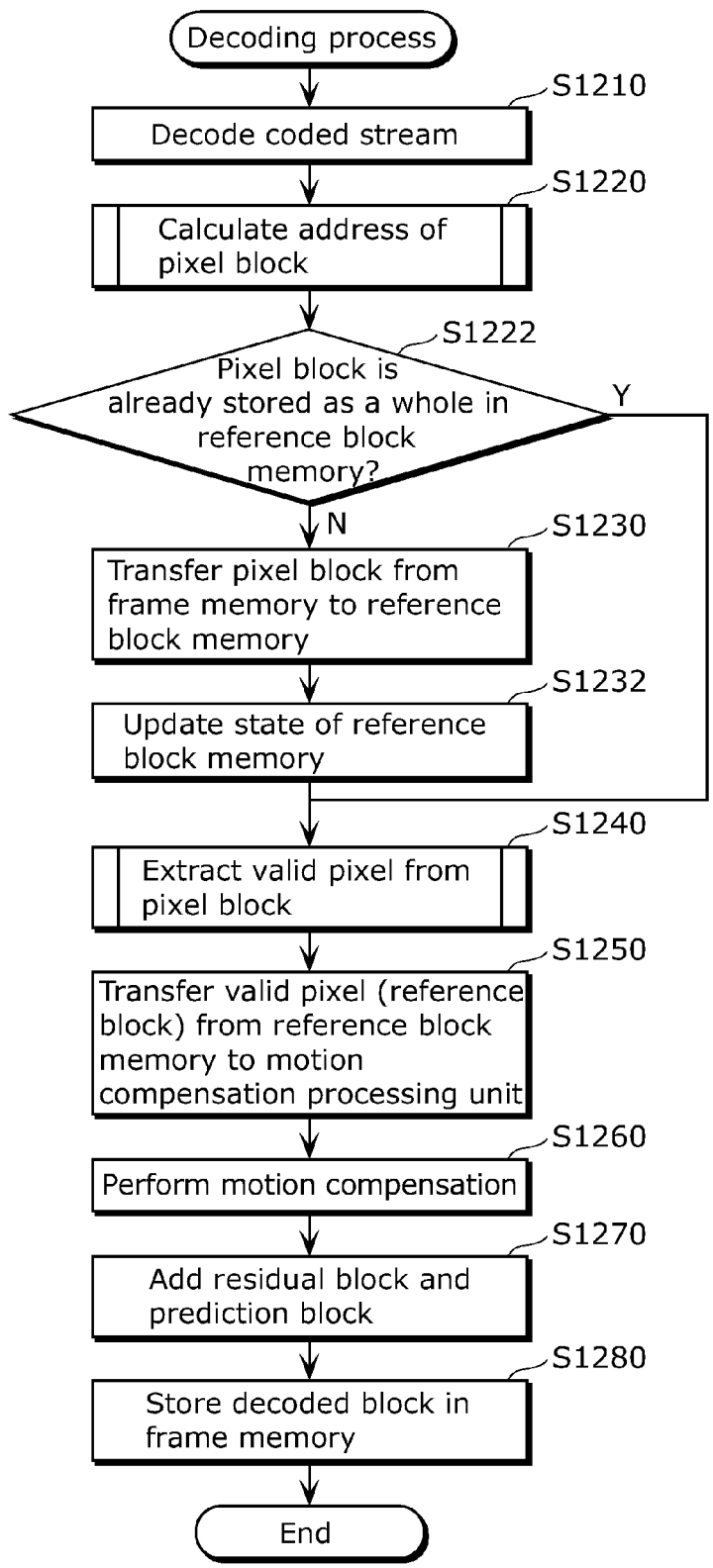
FIG. 6B is another example of a flowchart illustrating an operation of the image decoding apparatus, focusing on the process performed by the motion compensation unit.

Next, with reference to FIGS. 6A and 6B, another examples of the configuration and the operation of the motion compensation unit 2160 will be explained. FIG. 6A is another example of the block diagram of the motion compensation unit 2160. FIG. 6B is another example of the flowchart illustrating an operation of the image decoding apparatus 2000, centering on the process performed by the motion compensation unit 2160. It is to be noted that the same reference numerals are added to the elements common between FIG. 5A and FIG. 5B, and a detailed description for them will be omitted.

The motion compensation unit 2160 illustrated in FIG. 6A includes, in addition to the configuration shown in FIG. 5A, a reference-block-memory-state managing unit 2165. The function is common between the reference-block-memory-state managing unit 2165 and the reference-block-memory-state managing unit 1175 shown in FIG. 3A, and thus the description will be omitted.

As shown in FIG. 6B, the frame-memory-transfer control unit 2162, when an identified pixel block is not already stored as a whole in the reference block memory 2161 after the address calculating process (Step S1220) for the pixel block (N in Step S1222), selectively transfers pixel data of the identified pixel blocks which is not stored in the reference block memory 2161, per transfer block managed by the reference-block-memory-state managing unit 2165 (Step S1230). Then, the reference-block-memory-state managing unit 2165 updates the state of the reference block memory according to the result of the transfer performed by the frame-memory-transfer control unit 2162 (Step S1232).

Figure 13:
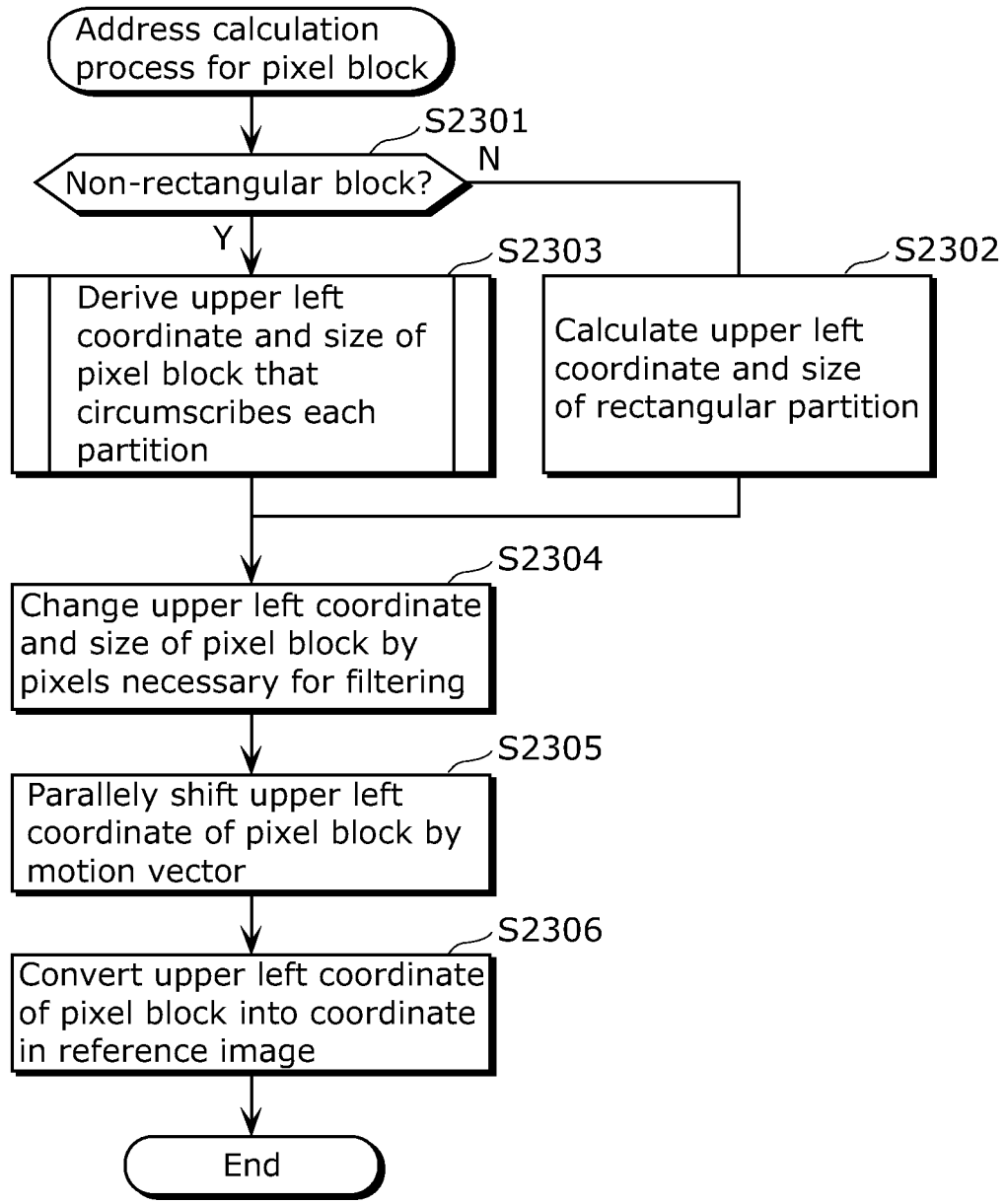
FIG. 13 is a flowchart which shows the overall flow of a process of calculating an address of a pixel block.

With reference to FIG. 13 to FIG. 19, the following describes a detailed operation of an address calculation for a rectangular pixel block including the reference block, performed by the frame-memory-transfer control unit 1172. FIG. 13 is a flowchart which shows the flow of the entire address calculation process for the pixel block performed by the frame-memory-transfer control unit 1172. It is to be noted that the description below applies to the frame-memory-transfer control unit 2162 as well.

First, the frame-memory-transfer control unit 1172 determines whether or not the reference block necessary for motion compensation processing is non-rectangular, using the block partition information obtained from the motion estimation unit 1160 (Step S2301).

According to the result of the determination in Step S2301, when the reference block is rectangular (Y in Step S2301), an upper left pixel and a size of the pixel block that matches the rectangular reference block are calculated (Step S2302).

On the other hand, according to the result of the determination in Step S2301, when the reference block is non-rectangular (N in Step S2301), an upper left coordinate and a size of each of the rectangular pixel blocks that circumscribes a corresponding one of the non-rectangular partitions are derived (Step S2303).

Next, in order to add, to the pixel block, a pixel necessary for a filtering process performed by the motion compensation processing unit 1174, a process of correcting the upper left pixel and the size of the pixel block calculated in Step S2302 or Step S2303 is performed (Step S2304).

When performing decimal pixel generation in the horizontal direction using a six-tap filter used for motion compensation according to H.264, for example, the horizontal coordinate of the upper left pixel in the pixel block is corrected by 2 decrement, and the horizontal size is corrected by 5 increment as shown in FIG. 8. In the same manner as above, when performing decimal pixel generation in the vertical direction using a six-tap filter used for motion compensation according to H.264, the vertical coordinate of the upper left pixel in the pixel block is corrected by 2 decrement, and the vertical size is corrected by 5 increment. It is to be noted that, although the six-tap filter process used for motion compensation according to H.264 is used as an example, the filter process is not limited to this and any filter processes are applicable.

Next, the frame-memory-transfer control unit 1172 parallely shifts, by an amount indicated by the motion vector, the upper left coordinate of the pixel block that circumscribes each partition, which is derived in Step S2304, using the motion vector information and the coordinate information of the pixel block which are obtained from the motion estimation unit 1160, to calculate the upper left coordinate of the rectangular pixel block in the reference image (Step S2305).

More specifically, in Step S2302 and Step S2303, the upper left coordinate of the pixel block at the position of the current block is once calculated, and it is possible to obtain the upper left coordinate of the pixel block at an original position of the reference block by parallely shifting the temporary upper left coordinate by an amount indicated by the motion vector in Step S2305.

Next, the frame-memory-transfer control unit 1172 transform the upper left coordinate in the reference image of each of the rectangular pixel blocks into an address in the frame memory 1140 of the reference image, and thereby calculates an address of pixel data included in the rectangular pixel block to be read from the frame memory 1140 (Step S2306).

Figure 14:
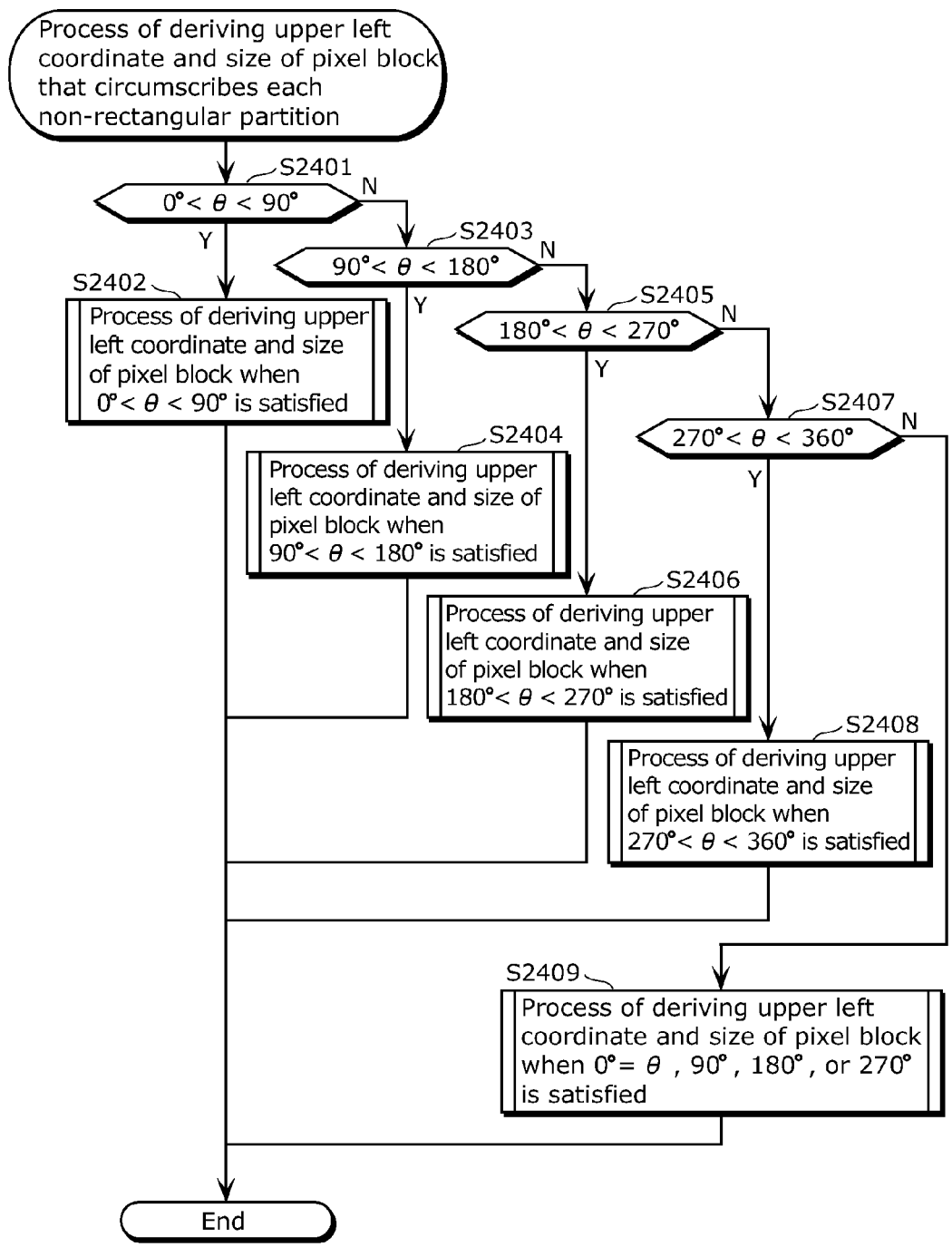
FIG. 14 is a flowchart which shows a processing flow of deriving an upper left coordinate and a size of each of the rectangular pixel blocks that circumscribes a corresponding one of the non-rectangular partition.

FIG. 14 is a flowchart which shows a processing flow of deriving an upper left coordinate and a size of each of the rectangular pixel blocks that circumscribes a corresponding one of the non-rectangular partitions. It is to be noted that, in the flowchart shown in FIG. 14 to FIG. 19, a horizontal size H_SIZE of a reference block, a vertical size V_SIZE of the reference block, and $\rho$ and $\theta$ described in the conventional examples (PTL 1, PTL 2, NPL 1, and NPL 2) are used as the block partition information for explanation.

In Step S2401, whether or not the partition information 8 obtained from the motion estimation unit 1160 satisfies $0° < \theta < 90°$ is determined. More specifically, whether or not the line segment defined by $\rho$ and $\theta$ is positioned at a first quadrant (an upper right region) in FIG. 7 is determined. When it is determined that $0° < \theta < 90°$ is satisfied, the process in Step S2402 is performed. In Step S2402, the process of deriving the upper left coordinate and the size of a pixel block that circumscribes a reference block when $0° < \theta < 90°$ is satisfied is performed (Step S2402). On the other hand, when it is determined that $0° < \theta < 90°$ is not satisfied, the process in Step S2403 is performed (Step S2401).

In Step S2403, whether or not the block partition information $\theta$ obtained from the motion estimation unit 1160 satisfies $90° < \theta < 180°$ is determined. More specifically, whether or not the line segment defined by $\rho$ and $\theta$ is positioned at a second quadrant (an upper left region) in FIG. 7 is determined. When it is determined that $90° < \theta < 180°$ is satisfied, the process in Step S2404 is performed. In Step S2404, the process of deriving the upper left coordinate and the size of a pixel block that circumscribes a reference block when $90° < \theta < 180°$ is satisfied is performed (Step S2404). On the other hand, when it is determined that $90° < \theta < 180°$ is not satisfied, the process in Step S2405 is performed (Step S2403).

In Step S2405, whether or not the partition information 6 obtained from the motion estimation unit 1160 satisfies $180° < \theta < 270°$ is determined. More specifically, whether or not the line segment defined by $\rho$ and $\theta$ is positioned at a third quadrant (an lower left region) in FIG. 7 is determined. When it is determined that $180° < \theta < 270°$ is satisfied, the process in Step S2406 is performed. In Step S2406, the process of deriving the upper left coordinate and the size of a pixel block that circumscribes a reference block when $180° < \theta < 270°$ is satisfied is performed (Step S2406). On the other hand, when it is determined that 180°<θ<270° is not satisfied, the process in Step S2407 is performed (Step S2405).

In Step S2407, whether or not the partition information 8 obtained from the motion estimation unit 1160 satisfies 270°<θ<360° is determined. More specifically, whether or not the line segment defined by ρ and θ is positioned at a fourth quadrant (an lower right region) in FIG. 7 is determined. When it is determined that 270°<θ<360° is satisfied, the process in Step S2408 is performed. In Step S2408, the process of deriving the upper left coordinate and the size of a pixel block that circumscribes a reference block when 270°<θ<360° is satisfied is performed (Step S2408). On the other hand, when it is determined that 270°<θ<360° is not satisfied, the process in Step S2409 is performed (Step S2407).

In Step S2409, the process of deriving the upper left coordinate and the size of a pixel block that circumscribes a reference block when θ=90°, 180°, 270°, or 360° is satisfied is performed (Step S2409).

Figure 15:
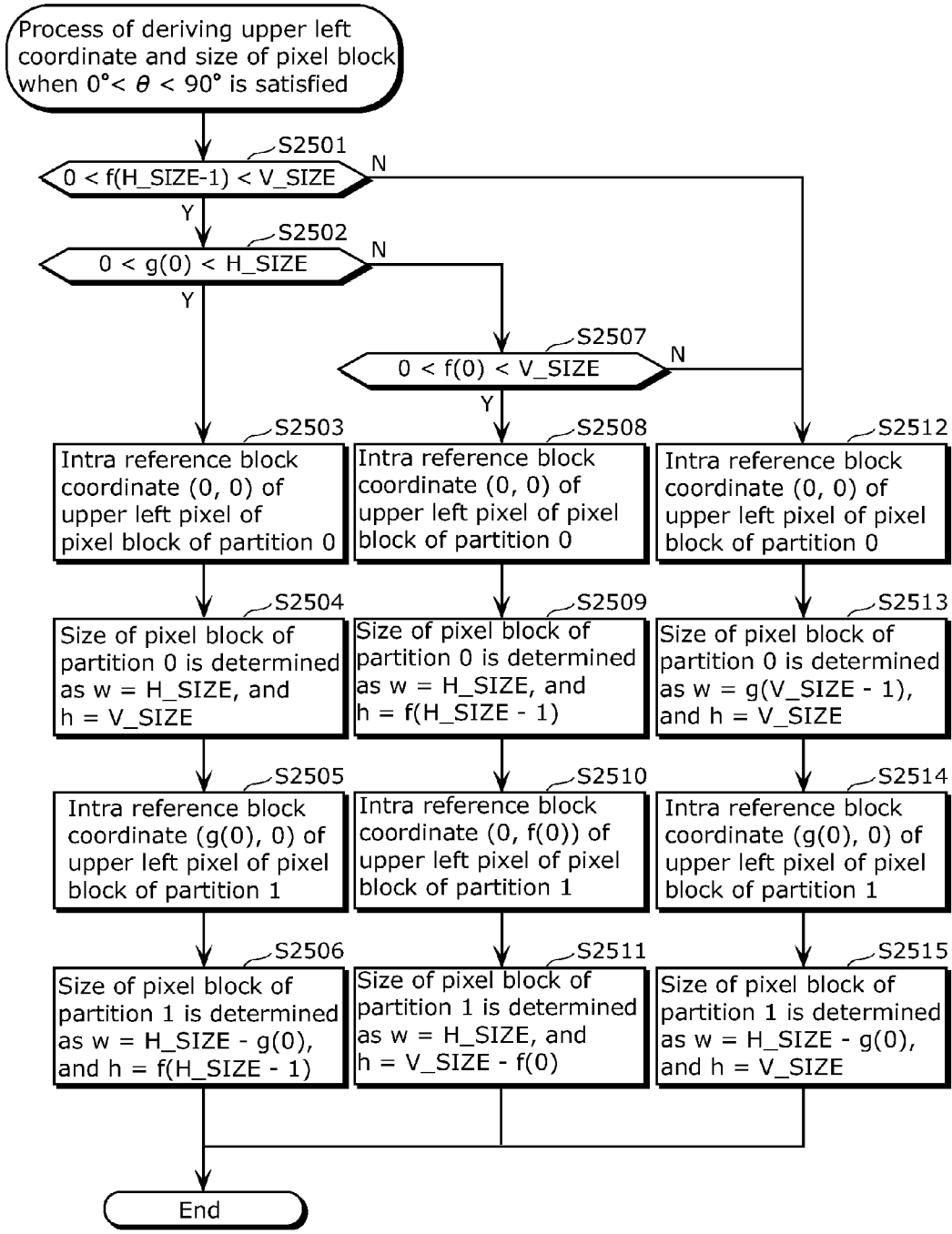
FIG. 15 is a flowchart which shows a processing flow of deriving an upper left coordinate and a size of a pixel block that circumscribes a partition when 0°<θ<90° is satisfied.

FIG. 15 is a flowchart which shows a processing flow of deriving an upper left coordinate and a size of each of the pixel blocks that circumscribes a corresponding one of the partitions when 0°<θ<90° is satisfied. It is to be noted that, a function f(x) that derives a vertical coordinate at the partition segment boundary from the block partition information and the horizontal coordinate information and a function g(x) that derives a horizontal coordinate at the partition segment boundary from the block partition information and the vertical coordinate information are used in the flowcharts shown in FIG. 15 to FIG. 19. These functions are described in Expression 1 and Expression 2 shown below.

[Math. 1]

$$y=f(x)=Int(1/\tan\theta(x-H\_SIZE/2)-\rho/\sin\theta+V\_SIZE/2) \quad \text{Expression 1}$$

[Math. 2]

$$x=g(y)=Int(\tan\theta(y+\rho/\sin\theta-V\_SIZE/2)+H\_SIZE/2) \quad \text{Expression 2}$$

In Step S2501, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S2502 is performed. On the other hand, when it is determined that 0<f(H_SIZE−1)<V_SIZE is not satisfied, the process in Step S2512 is performed (Step S2501).

In Step S2502, whether or not 0<g(0)<H_SIZE is satisfied is determined based on H_SIZE and V_SIZE which are the block partition information obtained from the motion estimation unit 1160. When it is determined that 0<g(0)<H_SIZE is satisfied, the process in Step S2503 is performed. On the other hand, when it is determined that 0<g(0)<H_SIZE is not satisfied, the process in Step S2507 is performed (Step S2502).

In Step S2507, whether or not 0<f(0)<V_SIZE is satisfied is determined based on H_SIZE and V_SIZE which are the block partition information obtained from the motion estimation unit 1160. When it is determined that 0<f(0)<V_SIZE is satisfied, the process in Step S2508 is performed. On the other hand, when it is not determined that 0<f(0)<V_SIZE is satisfied, the process in Step S2512 is performed (Step S2507), and the process of deriving the upper left coordinate and the size of each of the pixel blocks that circumscribes a corresponding one of the partitions when 0°<θ<90° is satisfied is ended.

In Step S2503, the intra reference block coordinate of the upper left pixel of the pixel block that circumscribes the partition 0 is determined as (0, 0) (Step S2503), and the process in Step S2504 is performed. In Step S2504, the horizontal size of the pixel block that circumscribes the partition 0 is determined as w=H_SIZE, and the vertical size is determined as h=V_SIZE (Step S2504), and the process in Step S2505 is performed.

In Step S2505, the intra reference block coordinate of the upper left pixel of the pixel block that circumscribes the partition 1 is determined as (g(0), 0) (Step S2505), and the process in Step S2506 is performed. In Step S2506, the horizontal size of the pixel block that circumscribes the partition 1 is determined as w=H_SIZE−g(0), and the vertical size is determined as h=f(H_SIZE−1) (Step S2506), and the process of deriving the upper left coordinate and the size of each of the pixel blocks that circumscribes a corresponding one of the partitions when 0°<θ<90° is satisfied is ended.

More specifically, in Step S2503 to Step S2506, the upper left coordinate and the size of a pixel block that circumscribes the partition 0 and the partition 1 when the partition segment boundary intersects with the upper side and the right side of the pixel block are derived as shown in FIG. 7.

It is to be noted that, although the upper left coordinate and the size of both of the two partitions 0 and 1 in contact with the partition segment boundary are derived in this example, which one of the partitions 0 and 1 is the reference block may be identified to derive the upper left coordinate and the size of the identified partition. This applies to each of the processes in FIG. 15 to FIG. 19.

In Step S2508, the intra reference block coordinate of the upper left pixel of the pixel block that circumscribes the partition 0 is determined as (0, 0) (Step S2508), and the process in Step S2509 is performed. In Step S2509, the horizontal size of the pixel block that circumscribes the partition 0 is determined as w=H_SIZE, and the vertical size is determined as h=f(H_SIZE−1) (Step S2509), and the process in Step S2510 is performed.

In Step S2510, the intra reference block coordinate of the upper left pixel of the pixel block that circumscribes the partition 1 is determined as (0, f(0)) (Step S2510), and the process in Step S2511 is performed. In Step S2511, the horizontal size of the pixel block that circumscribes the partition 1 is determined as w=H_SIZE, and the vertical size is determined as h=V_SIZE−f(0) (Step S2511), and the process of deriving the upper left coordinate and the size of each of the pixel blocks that circumscribes a corresponding one of the partitions when 0°<θ<90° is satisfied is ended.

More specifically, in Step S2508 to Step S2511, the upper left coordinate and the size of a pixel block that circumscribes the partition 0 and the partition 1 when the partition segment boundary intersects with the left side and the right side of the pixel block are derived.

In Step S2512, the intra reference block coordinate of the upper left pixel of the pixel block that circumscribes the partition 0 is determined as (0, 0) (Step S2512), and the process in Step S2513 is performed. In Step S2513, the horizontal size of the pixel block that circumscribes the partition 0 is determined as w=g(V_SIZE−1), and the vertical size is determined as h=V_SIZE (Step S2513), and the process in Step S2514 is performed.

In Step S2514, the intra reference block coordinate of the upper left pixel of the pixel block that circumscribes the partition 1 is determined as (g(0), 0) (Step S2514), and the process in Step S2515 is performed. In Step S2515, the horizontal size of the pixel block that circumscribes the partition 1 is determined as w=H_SIZE−g(0), and the vertical size is determined as h=V_SIZE (Step S2515), and the process of deriving the upper left coordinate and the size of each of the pixel blocks that circumscribes a corresponding one of the partitions when 0°<θ<90° is satisfied is ended.

More specifically, in Step S2512 to Step S2515, the upper left coordinate and the size of a pixel block that circumscribes the partition 0 and the partition 1 when the partition segment boundary intersects with the upper side and the lower side of the pixel block are derived.

Figure 16:
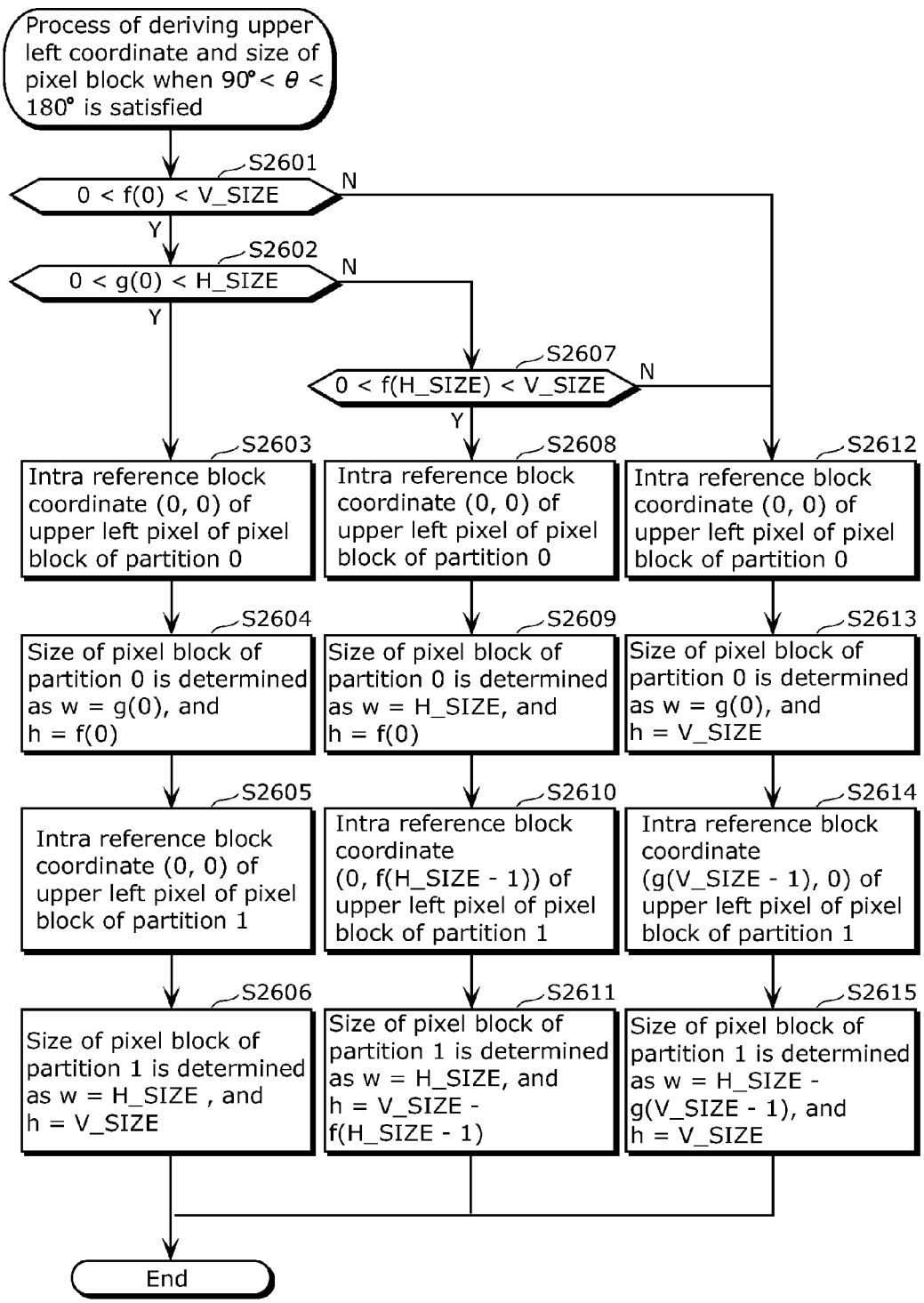
FIG. 16 is a flowchart which shows a processing flow of deriving an upper left coordinate and a size of a pixel block that circumscribes a partition when 90°<θ<180° is satisfied.
Figure 17:
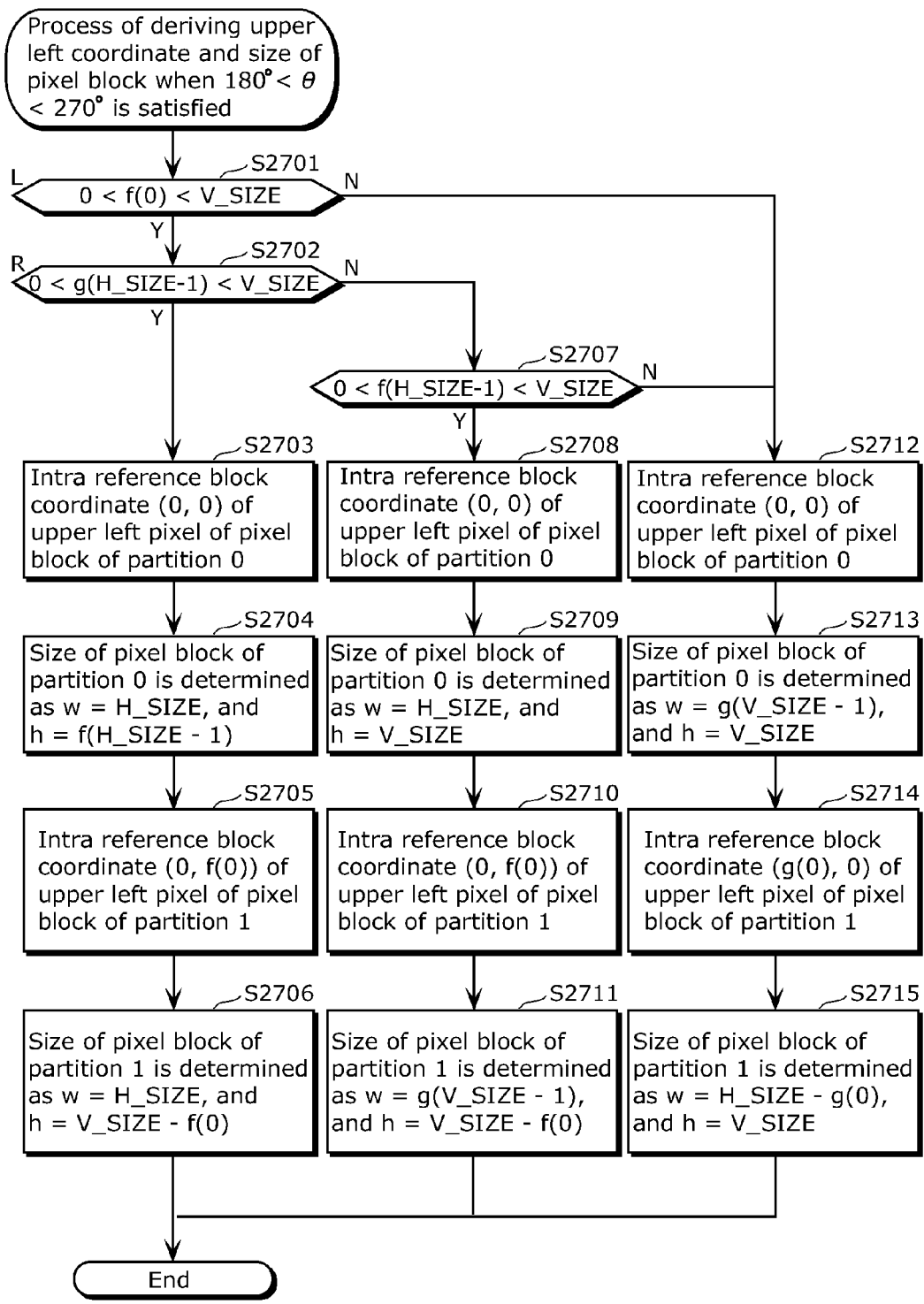
FIG. 17 is a flowchart which shows a processing flow of deriving an upper left coordinate and a size of a pixel block that circumscribes a partition when 180°<θ<270° is satisfied.
Figure 18:
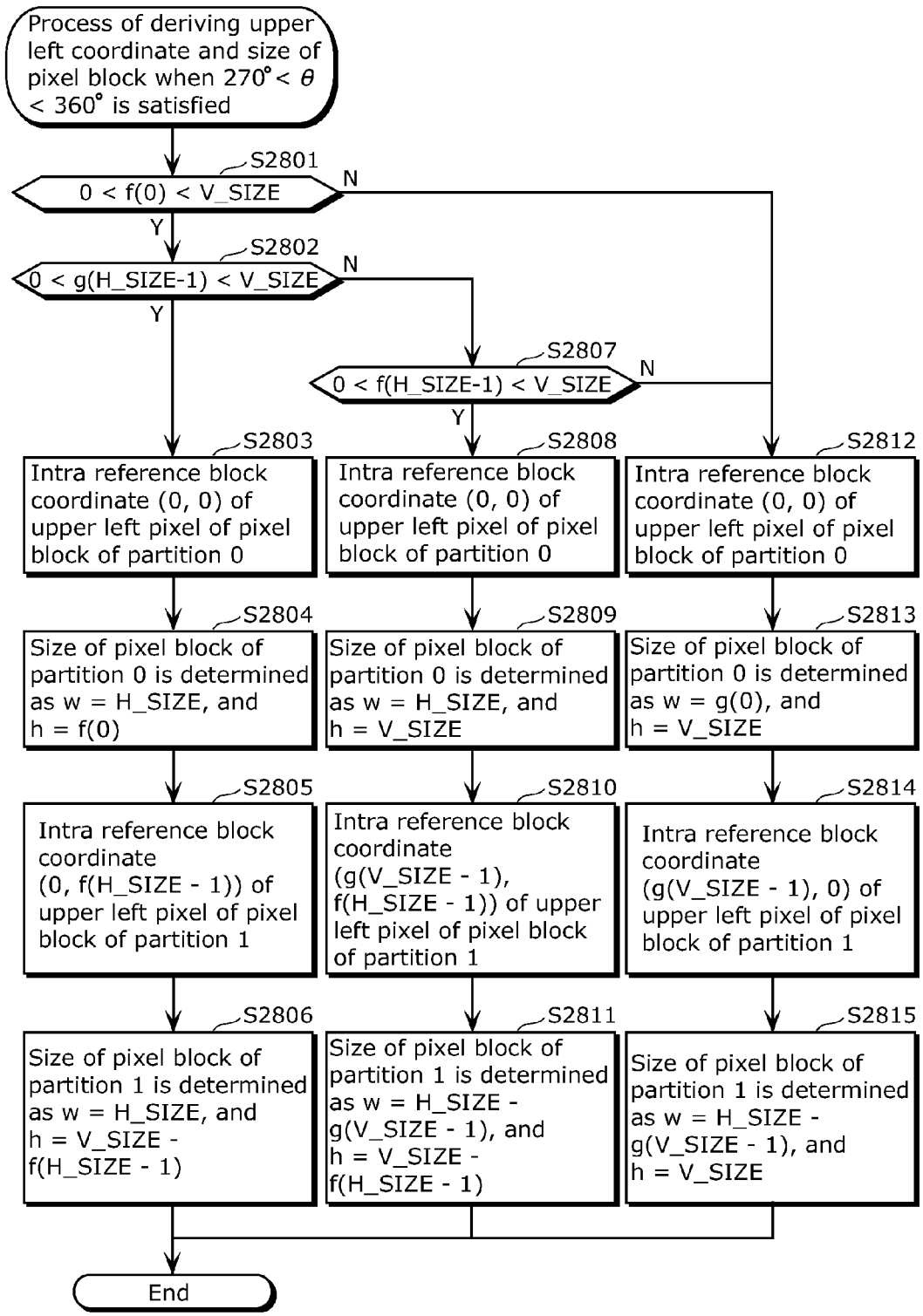
FIG. 18 is a flowchart which shows a processing flow of deriving an upper left coordinate and a size of a pixel block that circumscribes a partition when 270°<θ<360° is satisfied.

In the same manner as above, the upper left coordinate and the size of each of the pixel blocks that circumscribes a corresponding one of the partitions are calculated, depending on with which side of the pixel block the partition segment boundary intersects, in FIG. 16 to FIG. 18.

FIG. 16 is a flowchart which shows a processing flow of deriving an upper left coordinate and a size of each of the pixel blocks that circumscribes a corresponding one of the partitions when $90°<\theta<180°$ is satisfied.

In Step S2601, whether or not $0<f(0)<V\_SIZE$ is satisfied is determined based on H_SIZE and V_SIZE which are the block partition information obtained from the motion estimation unit 1160. When it is determined that $0<f(0)<V\_SIZE$ is satisfied, the process in Step S2602 is performed. On the other hand, when it is determined that $0<f(0)<V\_SIZE$ is not satisfied, the process in Step S2612 is performed (Step S2601).

In Step S2602, whether or not $0<g(0)<H\_SIZE$ is satisfied is determined based on H_SIZE and V_SIZE which are the block partition information obtained from the motion estimation unit 1160. When it is determined that $0<g(0)<H\_SIZE$ is satisfied, the process in Step S2603 is performed. On the other hand, when it is determined that $0<g(0)<H\_SIZE$ is not satisfied, the process in Step S2607 is performed (Step S2602).

In Step S2607, whether or not $0<f(H\_SIZE-1)<V\_SIZE$ is satisfied is determined based on H_SIZE and V_SIZE which are the block partition information obtained from the motion estimation unit 1160. When it is determined that $0<f(H\_SIZE-1)<V\_SIZE$ is satisfied, the process in Step S2608 is performed. On the other hand, when it is determined that $0<f(H\_SIZE-1)<V\_SIZE$ is not satisfied, the process in Step S2612 is performed (Step S2607), and the process of deriving the upper left coordinate and the size of each of the pixel blocks that circumscribes a corresponding one of the partitions when $90°<\theta<180°$ is satisfied is ended.

In Step S2603, the intra reference block coordinate of the upper left pixel of the pixel block that circumscribes the partition 0 is determined as (0, 0) (Step S2603), and the process in Step S2604 is performed. In Step S2604, the horizontal size of the pixel block that circumscribes the partition 0 is determined as w=g(0), and the vertical size is h=f(0) (Step S2604), and the process in Step S2605 is performed.

In Step S2605, the intra reference block coordinate of the upper left pixel of the pixel block that circumscribes the partition 1 is determined as (0, 0) (Step S2605), and the process in Step S2606 is performed. In Step S2606, the horizontal size of the pixel block that circumscribes the partition 1 is determined as w=H_SIZE, and the vertical size is determined as h=V_SIZE (Step S2606), and the process of deriving the upper left coordinate and the size of each of the pixel blocks that circumscribes a corresponding one of the partitions when $90°<\theta<180°$ is satisfied is ended.

In Step S2608, the intra reference block coordinate of the upper left pixel of the pixel block that circumscribes the partition 0 is determined as (0, 0) (Step S2608), and the process in Step S2609 is performed. In Step S2609, the horizontal size of the pixel block that circumscribes the partition 0 is determined as w=H_SIZE, and the vertical size is determined as h=f(0) (Step S2609), and the process in Step S2610 is performed.

In Step S2610, the intra reference block coordinate of the upper left pixel of the pixel block that circumscribes the partition 1 is determined as (0, f(H_SIZE-1) (Step S2610), and the process in Step S2611 is performed. In Step S2611, the horizontal size of the pixel block that circumscribes the partition 1 is determined as w=H_SIZE, and the vertical size is determined as h=V_SIZE-f(H_SIZE-1) (Step S2611), and the process of deriving the upper left coordinate and the size of each of the pixel blocks that circumscribes a corresponding one of the partitions when $90°<\theta<180°$ is satisfied is ended.

In Step S2612, the intra reference block coordinate of the upper left pixel of the pixel block that circumscribes the partition 0 is determined as (0, 0) (Step S2612), and the process in Step S2613 is performed. In Step S2613, the horizontal size of the pixel block that circumscribes the partition 0 is determined as w=g(0), and the vertical size is determined as h=V_SIZE (Step S2613), and the process in Step S2614 is performed.

In Step S2614, the intra reference block coordinate of the upper left pixel of the pixel block that circumscribes the partition 1 is determined as (g(V_SIZE-1), 0) (Step S2614), and the process in Step S2615 is performed. In Step S2615, the horizontal size and the vertical size of a circumscribing rectangular of the partition 1 are determined as w=H_SIZE-g(V_SIZE-1), and h=V_SIZE, respectively (Step S2615), and the process of deriving the upper left coordinate and the size of each of the pixel blocks that circumscribes a corresponding one of the partitions when $90°<\theta<180°$ is satisfied is ended.

FIG. 17 is a flowchart which shows a processing flow of deriving the upper left coordinate and the size of each of the pixel blocks that circumscribes a corresponding one of the partitions when $180°<\theta<270°$ is satisfied.

In Step S2701, whether or not $0<f(0)<V\_SIZE$ is satisfied is determined based on H_SIZE and V_SIZE which are the block partition information obtained from the motion estimation unit 1160. When it is determined that $0<f(0)<V\_SIZE$ is satisfied, the process in Step S2702 is performed. On the other hand, when it is determined that $0<f(0)<V\_SIZE$ is not satisfied, the process in Step S2712 is performed (Step S2701).

In Step S2702, whether or not $0<f(H\_SIZE-1)<V\_SIZE$ is satisfied is determined based on H_SIZE and V_SIZE which are the block partition information obtained from the motion estimation unit 1160. When it is determined that $0<f(H\_SIZE-1)<V\_SIZE$ is satisfied, the process in Step S2703 is performed. On the other hand, when it is determined that $0<f(H\_SIZE-1)<V\_SIZE$ is not satisfied, the process in Step S2707 is performed (Step S2702).

In Step S2707, whether or not $0<f(H\_SIZE-1)<V\_SIZE$ is satisfied is determined based on H_SIZE and V_SIZE which are the block partition information obtained from the motion estimation unit 1160. When it is determined that $0<f(H\_SIZE-1)<V\_SIZE$ is satisfied, the process in Step S2708 is performed. On the other hand, when it is determined that $0<f(H\_SIZE-1)<V\_SIZE$ is not satisfied, the process in Step S2712 is performed (Step S2707), and the process of deriving the upper left coordinate and the size of each of the pixel blocks that circumscribes a corresponding one of the partitions when $180°<\theta<270°$ is satisfied is ended.

In Step S2703, the intra reference block coordinate of the upper left pixel of the pixel block that circumscribes the partition 0 is determined as (0, 0) (Step S2703), and the process in Step S2704 is performed. In Step S2704, the horizontal size of the pixel block that circumscribes the partition 0 is determined as w=H_SIZE, and the vertical size is determined as h=f(H_SIZE-1) (Step S2704), and the process in Step S2705 is performed.

In Step S2705, the intra reference block coordinate of the upper left pixel of the pixel block that circumscribes the partition 1 is determined as (0, f(0)) (Step S2705), and the process in Step S2706 is performed. In Step S2706, the horizontal size of the pixel block that circumscribes the partition 1 is determined as w=H_SIZE, and the vertical size is determined as h=V_SIZE−f(0) (Step S2706), and the process of deriving the upper left coordinate and the size of each of the pixel blocks that circumscribes a corresponding one of the partitions when 180°<θ<270° is satisfied is ended.

In Step S2708, the intra reference block coordinate of the upper left pixel of the pixel block that circumscribes the partition 0 is determined as (0, 0) (Step S2708), and the process in Step S2709 is performed. In Step S2709, the horizontal size of the pixel block that circumscribes the partition 0 is determined as w=H_SIZE, and the vertical size is determined as h=V_SIZE (Step S2709), and the process in Step S2710 is performed.

In Step S2710, the intra reference block coordinate of the upper left pixel of the pixel block that circumscribes the partition 1 is determined as (0, f(0)) (Step S2710), and the process in Step S2711 is performed. In Step S2711, the horizontal size of the pixel block that circumscribes the partition 1 is determined as w=g(V_SIZE−1), and the vertical size is determined as h=V_SIZE−f(0) (Step S2711), and the process of deriving the upper left coordinate and the size of each of the pixel blocks that circumscribes a corresponding one of the partitions when 180°<θ<270° is satisfied is ended.

In Step S2712, the intra reference block coordinate of the upper left pixel of the pixel block that circumscribes the partition 0 is determined as (0, 0) (Step S2712), and the process in Step S2713 is performed. In Step S2713, the horizontal size of the pixel block that circumscribes the partition 0 is determined as w=g(V_SIZE−1), and the vertical size is determined as h=V_SIZE (Step S2713), and the process in Step S2714 is performed.

In Step S2714, the intra reference block coordinate of the upper left pixel of the pixel block that circumscribes the partition 1 is determined as (g(0), 0) (Step S2714), and the process in Step S2715 is performed. In Step S2715, the horizontal size and the vertical size of the circumscribing rectangular of the partition 1 are determined as w=H_SIZE−g(0), and h=V_SIZE, respectively (Step S2715), and the process of deriving the upper left coordinate and the size of each of the pixel blocks that circumscribes a corresponding one of the partitions when 180°<θ<270° is satisfied is ended.

FIG. 18 is a flowchart which shows a processing flow of deriving the upper left coordinate and the size of each of the pixel blocks that circumscribes a corresponding one of the partitions when 270°<θ<360° is satisfied.

In Step S2801, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S2802 is performed. On the other hand, when it is determined that 0<f(H_SIZE−1)<V_SIZE) is not satisfied, the process in Step S2812 is performed (Step S2801).

In Step S2802, whether or not 0<f(0)<V_SIZE is satisfied is determined based on H_SIZE and V_SIZE which are the block partition information obtained from the motion estimation unit 1160. When it is determined that 0<f(0)<V_SIZE is satisfied, the process in Step S2803 is performed. On the other hand, when it is determined that 0<f(0)<V_SIZE) is not satisfied, the process in Step S2807 is performed (Step S2802).

In Step S2807, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S2808 is performed. On the other hand, when it is determined that 0<f(H_SIZE−1)<V_SIZE is not satisfied, the process in Step S2812 is performed (Step S2807), and the process of deriving the upper left coordinate and the size of each of the pixel blocks that circumscribes a corresponding one of the partitions when 270°<θ<360° is satisfied is ended.

In Step S2803, the intra reference block coordinate of the upper left pixel of the pixel block that circumscribes the partition 0 is determined as (0, 0) (Step S2803), and the process in Step S2804 is performed. In Step S2804, the horizontal size and the vertical size of the circumscribing rectangular of the partition 0 are determined as w=H_SIZE and h=f(0), respectively (Step S2804), and the process in Step S2805 is performed.

In Step S2805, the intra reference block coordinate of the upper left pixel of the pixel block that circumscribes the partition 1 is determined as (0, f(H_SIZE−1) (Step S2805), and the process in Step S2806 is performed. In Step S2806, the horizontal size of the pixel block that circumscribes the partition 1 is determined as w=H_SIZE, and the vertical size is determined as h=V_SIZE−f(H_SIZE−1) (Step S2806), and the process of deriving the upper left coordinate and the size of each of the pixel blocks that circumscribes a corresponding one of the partitions when 270°<θ<360° is satisfied is ended.

In Step S2808, the intra reference block coordinate of the upper left pixel of the pixel block that circumscribes the partition 0 is determined as (0, 0) (Step S2808), and the process in Step S2809 is performed. In Step S2809, the horizontal size of the pixel block that circumscribes the partition 0 is determined as w=H_SIZE, and the vertical size is determined as h=V_SIZE (Step S2809), and the process in Step S2810 is performed.

In Step S2810, the intra reference block coordinate of the upper left pixel of the pixel block that circumscribes the partition 1 is determined as (g(V_SIZE−1), f(H_SIZE−1)) (Step S2810), and the process in Step S2811 is performed. In Step S2811, the horizontal size of the pixel block that circumscribes the partition 1 is determined as w=H_SIZE−g (V_SIZE−1), and the vertical size is determined as h=V_SIZE−f(H_SIZE−1) (Step S2811), and the process of deriving the upper left coordinate and the size of each of the pixel blocks that circumscribes a corresponding one of the partitions when 270°<θ<360° is satisfied is ended.

In Step S2812, the intra reference block coordinate of the upper left pixel of the pixel block that circumscribes the partition 0 is determined as (0, 0) (Step S2812), and the process in Step S2813 is performed. In Step S2813, the horizontal size of the pixel block that circumscribes the partition 0 is determined as w=g(0), and the vertical size is determined as h=V_SIZE (Step S2813), and the process in Step S2814 is performed.

In Step S2814, the intra reference block coordinate of the upper left pixel of the pixel block that circumscribes the partition 1 is determined as (g(V_SIZE−1), 0) (Step S2814), and the process in Step S2815 is performed. In Step S2815, the horizontal size and the vertical size of a pixel block that circumscribes the partition 1 are determined as w=H_SIZE−g(V_SIZE−1) and h=V_SIZE, respectively (Step S2815), and the process of deriving the upper left coordinate and the size of each of the pixel blocks that circumscribes a corresponding one of the partitions when 270°<θ<360° is satisfied is ended.

Figure 19:
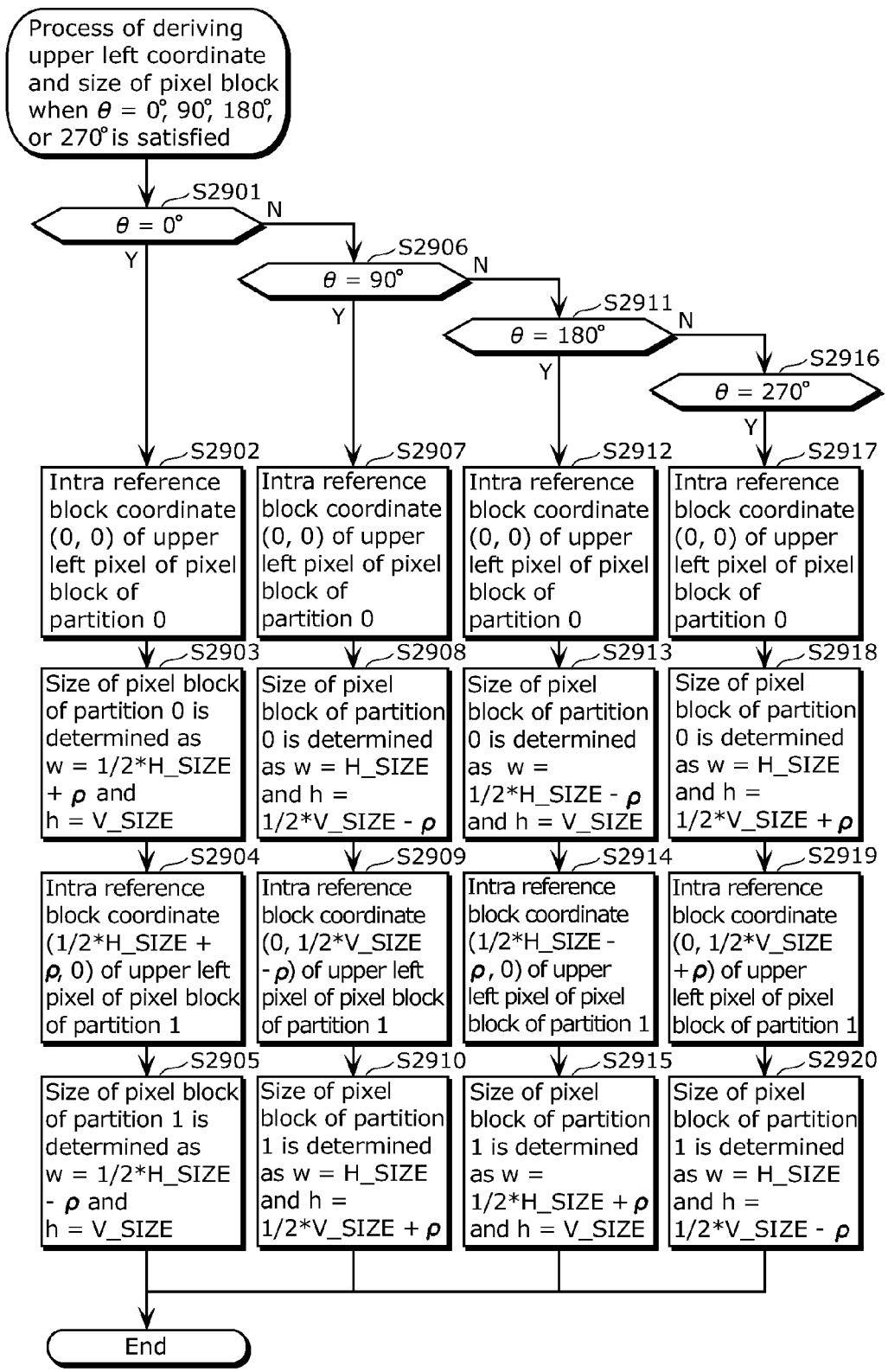
FIG. 19 is a flowchart which shows a processing flow of deriving an upper left coordinate and a size of a pixel block that circumscribes a partition of a corresponding one of the cases where θ=0°, 90°, 180°, and 270° are satisfied.

FIG. 19 is a flowchart which shows a processing flow of deriving an upper left coordinate and a size of each of the pixel blocks that circumscribes a corresponding one of the partitions when θ=0°, 90°, 180°, or 270° is satisfied.

In Step S2901, whether or not θ=0° is satisfied is determined based on θ of the block partition information obtained from the motion estimation unit 1160. When it is determined that θ=0° is satisfied, the process in Step S2902 is performed. On the other hand, when it is determined that θ=0° is not satisfied, the process in Step S2906 is performed (Step S2901).

In Step S2906, whether or not θ=90° is satisfied is determined based on θ of the block partition information obtained from the motion estimation unit 1160. When it is determined that θ=90° is satisfied, the process in Step S2907 is performed. On the other hand, when it is determined that θ=90° is not satisfied, the process in Step S2911 is performed (Step S2906).

In Step S2911, whether or not θ=180° is satisfied is determined based on θ of the block partition information obtained from the motion estimation unit 1160. When it is determined that θ=180° is satisfied, the process in Step S2912 is performed. On the other hand, when it is determined that θ=180° is not satisfied, the process in Step S2916 is performed (Step S2911).

In Step S2916, whether or not θ=270° is satisfied is determined based on θ of the block partition information obtained from the motion estimation unit 1160. When it is determined that θ=270° is satisfied, the process in Step S2917 is performed (Step S2916).

In Step S2902, the intra reference block coordinate of the upper left pixel of the pixel block that circumscribes the partition 0 is determined as (0, 0) (Step S2902), and the process in Step S2903 is performed. In Step S2903, the horizontal size and the vertical size of the pixel block that circumscribes the partition 0 are determined as w=½* H_SIZE+ρ, and h=V_SIZE, respectively (Step S2903), and the process in Step S2904 is performed.

In Step S2904, the intra reference block coordinate of the upper left pixel of the pixel block that circumscribes the partition 1 is determined as (½* H_SIZE+ρ, 0) (Step S2904), and the process in Step S2905 is performed. In Step S2905, the horizontal size and the vertical size of the pixel block that circumscribes the partition 1 are determined as w=½* H_SIZE−ρ and h=V_SIZE, respectively (Step S2905), and the process of deriving the upper left coordinate and the size of each of the pixel blocks that circumscribes a corresponding one of the partitions when θ=0° is satisfied is ended.

In Step S2907, the intra reference block coordinate of the upper left pixel of the pixel block that circumscribes the partition 0 is determined as (0, 0) (Step S2907), and the process in Step S2908 is performed. In Step S2908, the horizontal size and the vertical size of the pixel block that circumscribes the partition 0 are determined as w=H_SIZE and h=½* V_SIZE−ρ, respectively (Step S2908), and the process in Step S2909 is performed.

In Step S2909, the intra reference block coordinate of the upper left pixel of the pixel block that circumscribes the partition 1 is determined as (0, ½* V_SIZE−ρ) (Step S2909), and the process in Step S2910 is performed. In Step S2910, the horizontal size and the vertical size of the pixel block that circumscribes the partition 1 are determined as w=H_SIZE and h=½* V_SIZE+ρ, respectively (Step S2910), and the process of deriving the upper left coordinate and the size of each of the pixel blocks that circumscribes a corresponding one of the partitions when θ=90° is satisfied is ended.

In Step S2912, the intra reference block coordinate of the upper left pixel of the pixel block that circumscribes the partition 0 is determined as (0, 0) (Step S2912), and the process in Step S2913 is performed. In Step S2913, the horizontal size and the vertical size of the pixel block that circumscribes the partition 0 are determined as w=½* H_SIZE−ρ and h=V_SIZE, respectively (Step S2913), and the process in Step S2914 is performed.

In Step S2914, the intra reference block coordinate of the upper left pixel of the pixel block that circumscribes the partition 1 is determined as (½* H_SIZE−ρ, 0) (Step S2914), and the process in Step S2915 is performed. In Step S2915, the horizontal size and the vertical size of the pixel block that circumscribes the partition 1 are determined as w=½* H_SIZE+ρ, and h=V_SIZE, respectively (Step S2915), and the process of deriving the upper left coordinate and the size of each of the pixel blocks that circumscribes a corresponding one of the partitions when θ=180° is satisfied is ended.

In Step S2917, the intra reference block coordinate of the upper left pixel of the pixel block that circumscribes the partition 0 is determined as (0, 0) (Step S2917), and the process in Step S2918 is performed. In Step S2918, the horizontal size and the vertical size of the pixel block that circumscribes the partition 0 are determined as w=H_SIZE, and h=½* V_SIZE+ρ, respectively (Step S2918), and the process in Step S2919 is performed.

In Step S2919, the intra reference block coordinate of the upper left pixel of the pixel block that circumscribes the partition 1 is determined as (0, ½* V_SIZE+ρ) (Step S2919), and the process in Step S2920 is performed. In Step S2920, the horizontal size and the vertical size of the pixel block that circumscribes the partition 1 is determined as w=H_SIZE, and h=½* V_SIZE−ρ, respectively (Step S2920), and the process of deriving the upper left coordinate and the size of each of the pixel blocks that circumscribes a corresponding one of the partitions when θ=270° is satisfied is ended.

Figure 20:
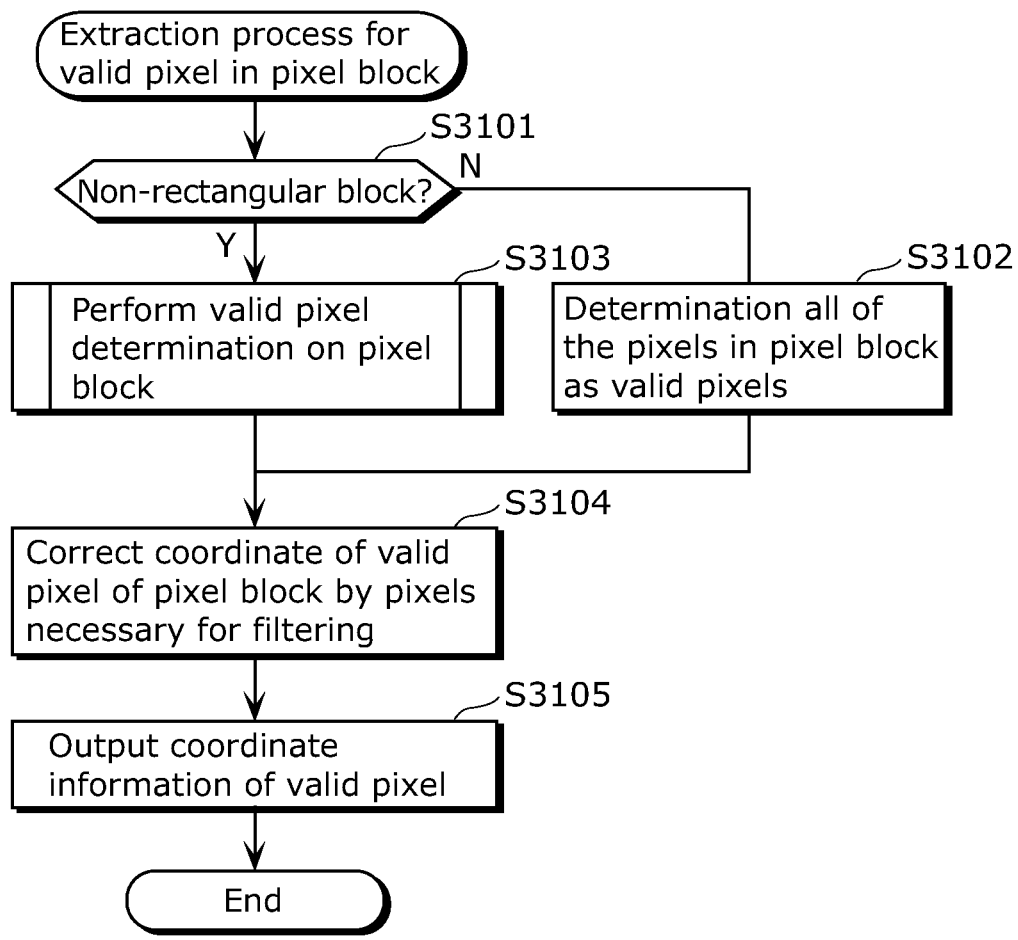
FIG. 20 is a flowchart which shows the overall flow of a process of extracting a valid pixel in a pixel block.

The upper left coordinate and the size of a pixel block that circumscribes each of the non-rectangular partitions can be derived by performing the processes in the flowcharts shown in FIG. 14 to FIG. 19 as described above, The following describes, with reference to FIG. 20 to FIG. 32, a detailed operation of extracting a valid pixel in a pixel block performed by the reference-block-memory-transfer control unit 1173 FIG. 20 is a flowchart which shows the flow of the entire extraction process for the valid pixel in a pixel block performed by the reference-block-memory-transfer control unit 1173. It is to be noted that the description below applies to the reference-block-memory-transfer control unit 2163 as well.

First, reference-block-memory-transfer control unit 1173 determines whether or not the reference block necessary for motion compensation processing is non-rectangular, using the block partition information obtained from the motion estimation unit 1160 (Step S3101). When the reference block is rectangular according to the result of determination in Step S3301, all of the pixels in the pixel block are determined as the valid pixels (Step S3102). On the other hand, when the reference block is non-rectangular according to the result of determination in Step S3301, valid pixel determination is performed for the pixels in the pixel block (Step S3103).

Next, a coordinate of the valid pixel is corrected in order to add, to the reference block, a pixel which is necessary for a filtering process and used by the motion compensation unit 1170 (Step S3104). When performing a decimal pixel generation in the horizontal direction using a six-tap filter used for motion compensation according to H.264, for example, the horizontal coordinate of the upper left pixel in the pixel block is corrected by 2 decrement, and the horizontal size is corrected by 5 increment. When performing the decimal pixel generation in the vertical direction using the six-tap filter used for motion compensation according to H.264, for example, the vertical coordinate of the upper left pixel in the pixel block is corrected by 2 decrement, and the horizontal size is corrected by 5 increment. Although the six-tap filtering process used in motion compensation according to H.264 is used as an example, the six-tap filtering process is not necessarily used and any filtering process may be used.

Next, the reference block memory transfer controlling unit 1173 obtains information on the valid pixel coordinate of the reference block in the reference block memory 1171, and outputs, to the motion compensation unit 1170, pixel data of the reference block identified by the information (Step S3105).

Figure 21:
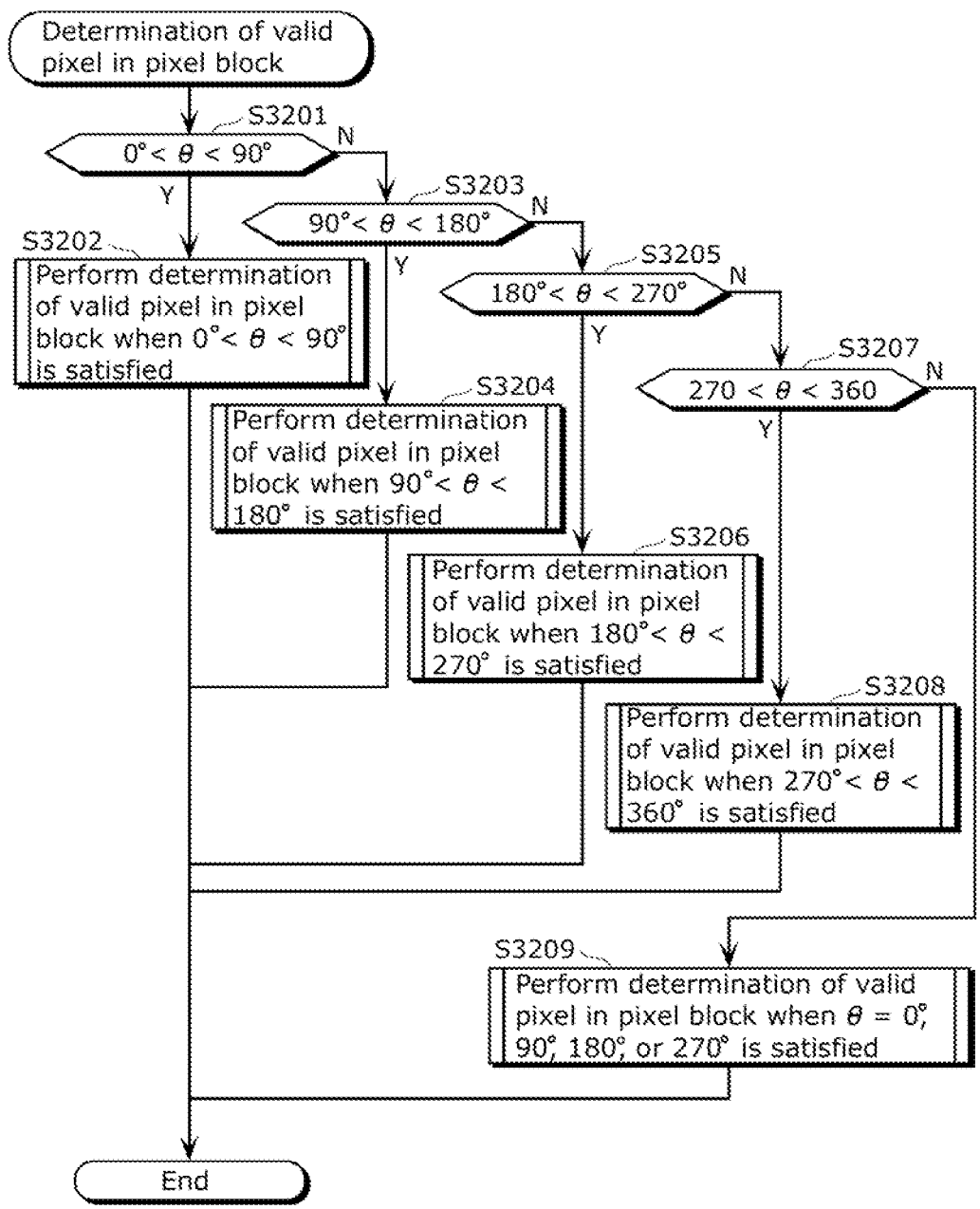
FIG. 21 is a flowchart which shows the flow of determination of a valid pixel in a pixel block.

FIG. 21 is a flowchart which shows the flow of determination of a valid pixel in the pixel block. In the flowcharts shown in FIG. 21 to FIG. 32, a horizontal size H_SIZE of an image block, a vertical size V_SIZE of the image block, and $\rho$ and $\theta$ described in the conventional examples (PTL 1, PTL 2, NPL 1, and NPL 2) are used as block partition information for explanation.

In Step S3201, whether or not the block partition information $\theta$ obtained from the motion estimation unit 1160 satisfies $0°<\theta<90°$ is determined. When it is determined that $0°<\theta<90°$ is satisfied, the process in Step S3202 is performed. In Step S3202, the determination of a valid pixel in the pixel block when $0°<\theta<90°$ is satisfied is performed (Step S3202). On the other hand, when it is determined that $0°<\theta<90°$ is not satisfied, the process in Step S3203 is performed (Step S3201).

In Step S3203, whether or not the block partition information $\theta$ obtained from the motion estimation unit 1160 satisfies $90°<\theta<180°$ is determined. When it is determined that $90°<\theta<180°$ is satisfied, the process in Step S3204 is performed. In Step S3204, determination of a valid pixel in the pixel block when $90°<\theta<180°$ is satisfied is performed (Step S3204). On the other hand, when it is determined that $90°<\theta<180°$ is not satisfied, the process in Step S3205 is performed (Step S3203).

In Step S3205, whether or not the block partition information $\theta$ obtained from the motion estimation unit 1160 satisfies $180°<\theta<270°$ is determined. When it is determined that $180°<\theta<270°$ is satisfied, the process in Step S3206 is performed. In Step S3206, determination of a valid pixel in the pixel block when $180°<\theta<270°$ is satisfied is performed (Step S3206). On the other hand, when it is determined that $180°<\theta<270°$ is not satisfied, the process in Step S3207 is performed (Step S3205).

In Step S3207, whether or not the block partition information $\theta$ obtained from the motion estimation unit 1160 satisfies $270°<\theta<360°$ is determined. When it is determined that $270°<\theta<360°$ is satisfied, the process in Step S3208 is performed. In Step S3208, determination of a valid pixel in the pixel block when $270°<\theta<360°$ is satisfied is performed (Step S3208). On the other hand, when it is determined that $270°<\theta<360°$ is not satisfied, the process in Step S3209 is performed (Step S3207).

In Step S3209, determination of a valid pixel in the pixel block when $\theta=90°, 180°, 270°,$ or $360°$ is satisfied is performed (Step S3209).

Figure 22:
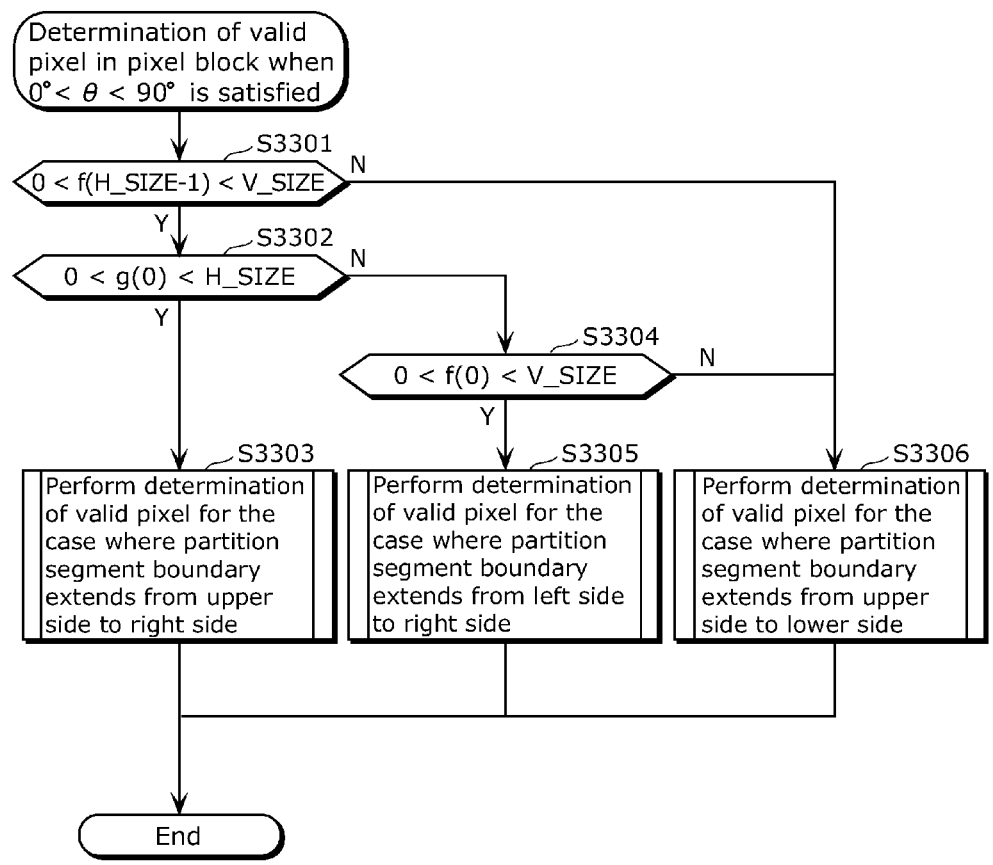
FIG. 22 is a flowchart which shows the flow of determination of a valid pixel in a pixel block when 0°<θ<90° is satisfied.

FIG. 22 is a flowchart which shows the flow of determination of a valid pixel in the pixel block when $0°<\theta<90°$ is satisfied.

In Step S3301, whether or not $0<f(H\_SIZE-1)<V\_SIZE$ is satisfied is determined based on H_SIZE and V_SIZE which are the block partition information obtained from the motion estimation unit 1160. When it is determined that $0<f(H\_SIZE-1)<V\_SIZE$ is satisfied, the process in Step S3302 is performed. On the other hand, when it is determined that $0<f(H\_SIZE-1)<V\_SIZE$ is not satisfied, the process in Step S3306 is performed (Step S3301).

In Step S3302, whether or not $0<g(0)<H\_SIZE$ is satisfied is determined based on H_SIZE and V_SIZE which are the block partition information obtained from the motion estimation unit 1160. When it is determined that $0<g(0)<H\_SIZE$ is satisfied, the process in Step S3303 is performed. In Step S3303, the valid pixel determination is performed for the case where the partition segment boundary extends from the upper side to the right side of the pixel block, and the determination of a valid pixel in the pixel block when $0°<\theta<90°$ is satisfied is ended (Step S3303). On the other hand, when it is determined that $0<g(0)<H\_SIZE$ is not satisfied, the process in Step S3304 is performed (Step S3302).

In Step S3304, whether or not $0<f(0)<V\_SIZE$ is satisfied is determined based on H_SIZE and V_SIZE which are the block partition information obtained from the motion estimation unit 1160. When it is determined that $0<f(0)<V\_SIZE$ is satisfied, the process in Step S3305 is performed. In Step S3305, the valid pixel determination is performed for the case where the partition segment boundary extends from the left side to the right side of the pixel block, and the determination of a valid pixel in the pixel block when $0°<\theta<90°$ is satisfied is ended (Step S3305). On the other hand, when it is determined that $0<f(0)<V\_SIZE$ is not satisfied, the process in Step S3306 is performed (Step S3306).

In Step S3306, the valid pixel determination is performed for the case where the partition segment boundary extends from the upper side to the lower side of the pixel block, and the determination of a valid pixel in the pixel block when $0°<\theta<90°$ is satisfied is ended (Step S3306).

Figure 23:
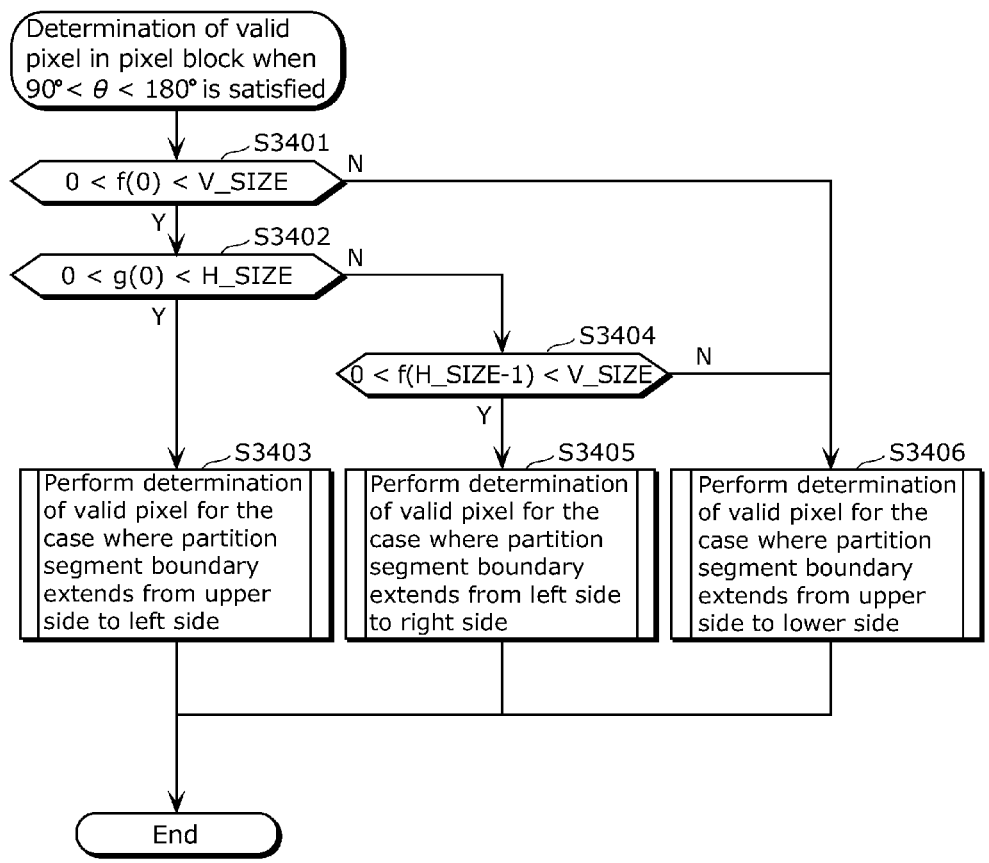
FIG. 23 is a flowchart which shows the flow of determination of a valid pixel in a pixel block when 90°<θ<180° is satisfied.

FIG. 23 is a flowchart which shows the flow of determination of a valid pixel in the pixel block when $90°<\theta<180°$ is satisfied.

In Step S3401, whether or not $0<f(0)<V\_SIZE$ is satisfied is determined based on H_SIZE and V_SIZE which are the block partition information obtained from the motion estimation unit 1160. When it is determined that $0<f(0)<V\_SIZE$ is satisfied, the process in Step S3402 is performed. On the other hand, when it is determined that $0<f(0)<V\_SIZE$ is not satisfied, the process in Step S3406 is performed (Step S3401).

In Step S3402, whether or not $0<g(0)<H\_SIZE$ is satisfied is determined based on H_SIZE and V_SIZE which are the block partition information obtained from the motion estimation unit 1160. When it is determined that $0<g(0)<H\_SIZE$ is satisfied, the process in Step S3403 is performed. In Step S3403, the valid pixel determination is performed for the case where the partition segment boundary extends from the upper side to the left side of the pixel block, and the determination of a valid pixel in the pixel block when $90°<\theta<180°$ is satisfied is ended (Step S3403). On the other hand, when it is determined that $0<g(0)<H\_SIZE$ is not satisfied, the process in Step S3404 is performed (Step S3402).

In Step S3404, whether or not $0<f(H\_SIZE-1)<V\_SIZE$ is satisfied is determined based on H_SIZE and V_SIZE which are the block partition information obtained from the motion estimation unit 1160. When it is determined that $0<f(H\_SIZE-1)<V\_SIZE$ is satisfied, the process in Step S3405 is performed. In Step S3405, the valid pixel determination is performed for the case where the partition segment boundary extends from the left side to the right side of the pixel block, and the determination of a valid pixel in the pixel block when $90°<\theta<180°$ is satisfied is ended (Step S3405). On the other hand, when it is determined that $0<f(H\_SIZE-1)<V\_SIZE$ is not satisfied, the process in Step S3406 is performed (Step S3406).

In Step S3406, the valid pixel determination is performed for the case where the partition segment boundary extends from the upper side to the lower side of the pixel block, and the determination of a valid pixel in the pixel block when 90°<θ<180° is satisfied is ended (Step S3406).

Figure 24:
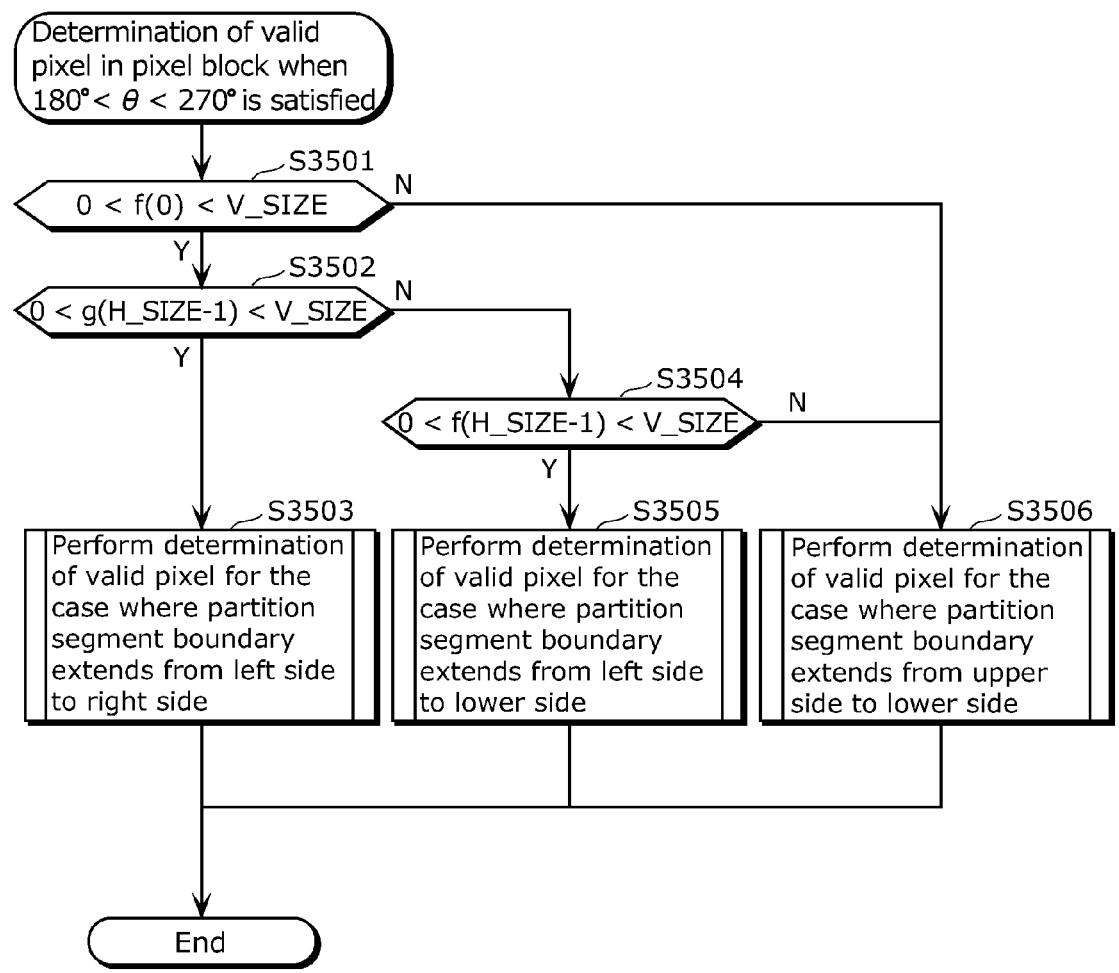
FIG. 24 is a flowchart which shows the flow of determination of a valid pixel in a pixel block when 180°<θ<270° is satisfied.

FIG. 24 is a flowchart which shows the flow of determination of a valid pixel in the pixel block when 180°<θ<270° is satisfied.

In Step S3501, whether or not 0<f(0)<V_SIZE is satisfied is determined based on H_SIZE and V_SIZE which are the block partition information obtained from the motion estimation unit 1160. When it is determined that 0<f(0)<V_SIZE is satisfied, the process in Step S3502 is performed. On the other hand, when it is determined that 0<f(0)<V_SIZE is not satisfied, the process in Step S3506 is performed (Step S3501).

In Step S3502, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S3503 is performed. In Step S3503, the valid pixel determination is performed for the case where the partition segment boundary extends from the left side to the right side of the pixel block, and the determination of a valid pixel in the pixel block when 180°<θ<270° is satisfied is ended (Step S3503). On the other hand, when it is determined that 0<f(H_SIZE−1)<V_SIZE is not satisfied, the process in Step S3504 is performed (Step S3502).

In Step S3504, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S3505 is performed. In Step S3505, the valid pixel determination is performed for the case where the partition segment boundary extends from the left side to the lower side of the pixel block, and the determination of a valid pixel in the pixel block when 180°<θ<270° is satisfied is ended (Step S3505). On the other hand, when it is determined that 0<f(H_SIZE−1)<V_SIZE is not satisfied, the process in Step S3506 is performed (Step S3506).

In Step S3506, the valid pixel determination is performed for the case where the partition segment boundary extends from the upper side to the lower side of the pixel block, and the determination of a valid pixel in the pixel block when 180°<θ<270° is satisfied is ended (Step S3506).

Figure 25:
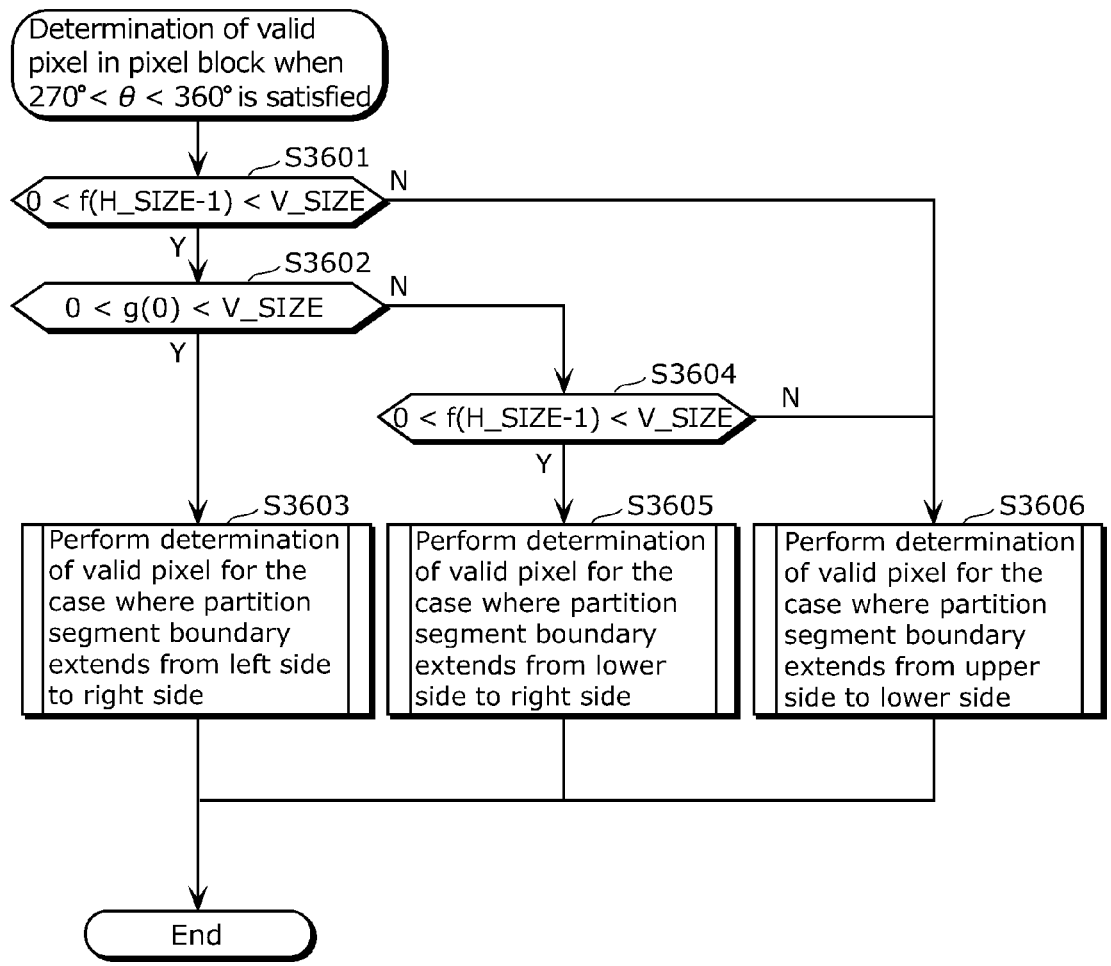
FIG. 25 is a flowchart which shows the flow of determination of a valid pixel in a pixel block when 270°<θ<360° is satisfied.

FIG. 25 is a flowchart which shows the flow of determination of a valid pixel in the pixel block when 270°<θ<360° is satisfied.

In Step S3601, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S3602 is performed. On the other hand, when it is determined that 0<f(H_SIZE−1)<V_SIZE is not satisfied, the process in Step S3606 is performed (Step S3601).

In Step S3602, whether or not 0<f(0)<V_SIZE is satisfied is determined based on H_SIZE and V_SIZE which are the block partition information obtained from the motion estimation unit 1160. When it is determined that 0<f(0)<V_SIZE is satisfied, the process in Step S3603 is performed. In Step S3603, the valid pixel determination is performed for the case where the partition segment boundary extends from the left side to the right side of the pixel block, and the determination of a valid pixel in the pixel block when 270°<θ<360° is satisfied is ended (Step S3603). On the other hand, when it is determined that 0<f(0)<V_SIZE is not satisfied, the process in Step S3604 is performed (Step S3602).

In Step S3604, whether or not 0<f(H_SIZE−1)<V_SIZE is satisfied is determined based on H_SIZE and V_SIZE which are the block partition information obtained from the motion estimation unit 1160. When it is determined that 0<f(H_SIZE−1)<V_SIZE is satisfied, the process in Step S3605 is performed. In Step S3605, the valid pixel determination is performed for the case where the partition segment boundary extends from the lower side to the right side of the pixel block, and the determination of a valid pixel in the pixel block when 270°<θ<360° is satisfied is ended (Step S3605). On the other hand, when it is determined that 0<f(H_SIZE−1)<V_SIZE is not satisfied, the process in Step S3606 is performed (Step S3606).

In Step S3606, the valid pixel determination is performed for the case where the partition segment boundary extends from the upper side to the lower side of the pixel block, and the determination of a valid pixel in the pixel block when 270°<θ<360° is satisfied is ended (Step S3606).

Figure 26:
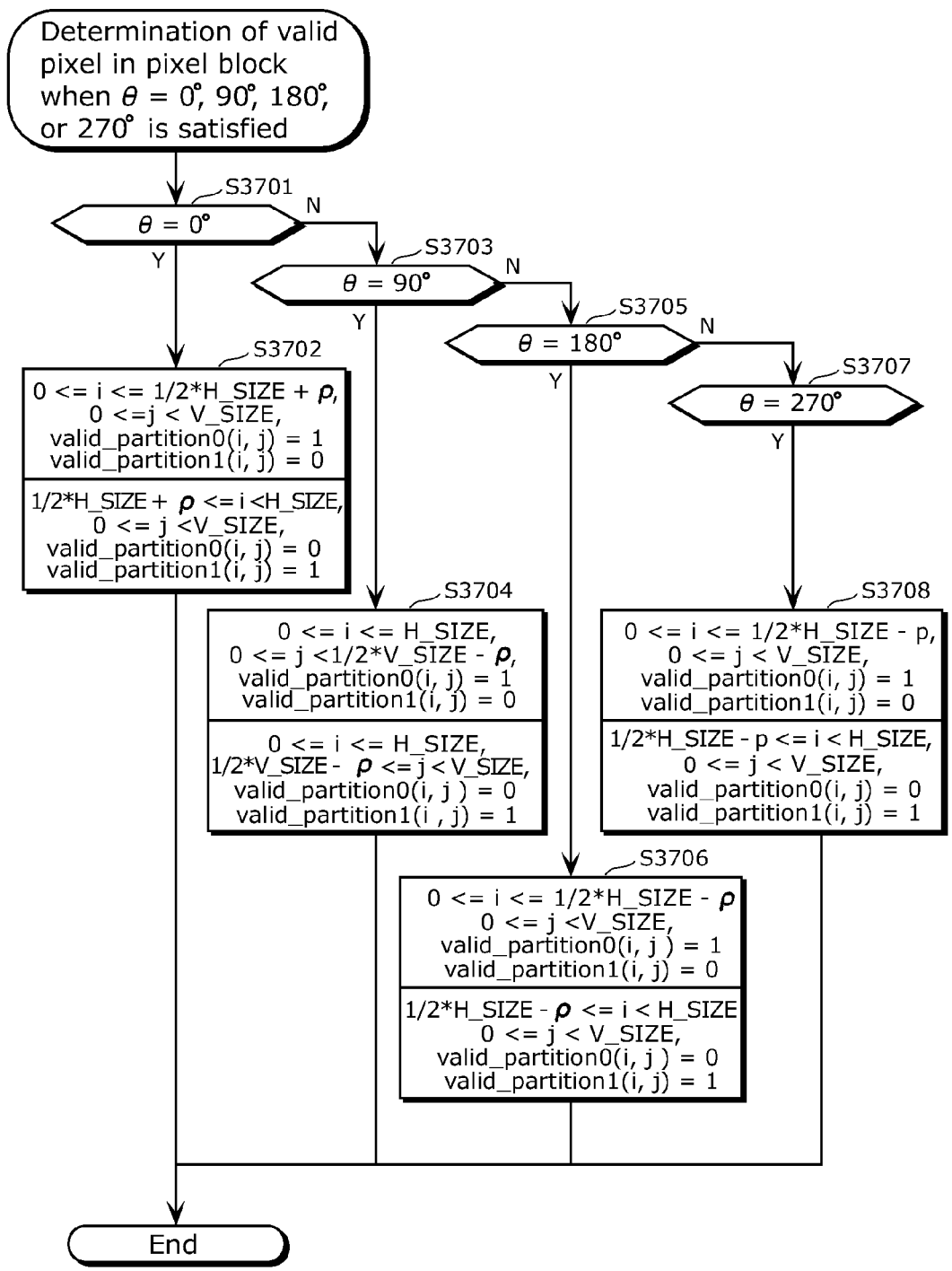
FIG. 26 is a flowchart which shows the flow of determination of a valid pixel in the pixel block for the cases where θ=0°, 90°, 180°, and 270° are respectively satisfied.

FIG. 26 is a flowchart which shows the flow of determination of a valid pixel in the pixel block when θ=0°, 90°, 180°, or 270° is satisfied.

In Step S3701, whether or not θ=0° is satisfied is determined based on θ of the block partition information obtained from the motion estimation unit 1160. When it is determined that θ=0° is satisfied, the process in Step S3702 is performed. On the other hand, when it is determined that θ=0° is not satisfied, the process in Step S3703 is performed (Step S3701).

In Step S3703, whether or not θ=90° is satisfied is determined based on θ of the block partition information obtained from the motion estimation unit 1160. When it is determined that θ=90° is satisfied, the process in Step S3704 is performed. On the other hand, when it is determined that θ=90° is not satisfied, the process in Step S3705 is performed (Step S3705).

In Step S3705, whether or not θ=180° is satisfied is determined based on θ of the block partition information obtained from the motion estimation unit 1160. When it is determined that θ=180° is satisfied, the process in Step S3706 is performed. On the other hand, when it is determined that θ=180° is not satisfied, the process in Step S3707 is performed (Step S3705).

In Step S3707, whether or not θ=270° is satisfied is determined based on θ of the block partition information obtained from the motion estimation unit 1160. When it is determined that θ=270° is satisfied, the process in Step S3708 is performed (Step S3707).

FIG. 26 shows valid_partition0(i, j) and valid_partition1(i, j) each of which is two-dimensional matrix data having the same size as the size of a pixel block and is information indicating whether or not a pixel included in block partitions resulting from division into two blocks is valid at each of the coordinates in the pixel blocks. The pixel is valid when the information indicates 1 and the pixel is invalid when the information indicates 0.

In Step S3702, valid_partition0(i, j)=1 and valid_partition1(i, j)=0 are determined for the pixels of 0<=i<=½* H_SIZE+ρ, and 0<=j<V_SIZE, and valid_partition0(i, j)=0 and valid_partition1(i, j)=1 are determined for the pixels of ½* H_SIZE+ρ<=i<H_SIZE, and 0<=j<V_SIZE (Step S3702).

In Step S3704, valid_partition0(i, j)=1 and valid_partition1(i, j)=0 are determined for the pixels of 0<=i<=H_SIZE, and 0<=j<½ * V_SIZE−ρ, and valid_partition0(i, j)=0 and valid_partition1(i, j)=1 are determined for the pixels of $0<=i<=H\_SIZE$, and $\frac{1}{2}*V\_SIZE-\rho<=j<V\_SIZE$ (Step S3704).

In Step S3706, valid_partition0(i, j)=1 and valid_partition1(i, j)=0 are determined for the pixels of $0<=i<=\frac{1}{2}*H\_SIZE-\rho$, and $0<=j<V\_SIZE$, and valid_partition0(i, j)=0 and valid_partition1(i, j)=1 are determined for the pixels of $\frac{1}{2}*H\_SIZE-\rho<=i<H\_SIZE$, and $0<=j<V\_SIZE$ (Step S3706).

In Step S3708, valid_partition0(i, j)=1 and valid_partition1(i, j)=0 are determined for the pixels of $0<=i<=H\_SIZE$, and $0<=j<\frac{1}{2}V\_SIZE+\rho$, and valid_partition0 (i, j)=0 and valid_partition1(i, j)=1 are determined for pixel of $0<=i<=H\_SIZE$, and $\frac{1}{2}*V\_SIZE+p<=j<V\_SIZE$ (Step S3708).

Figure 27:
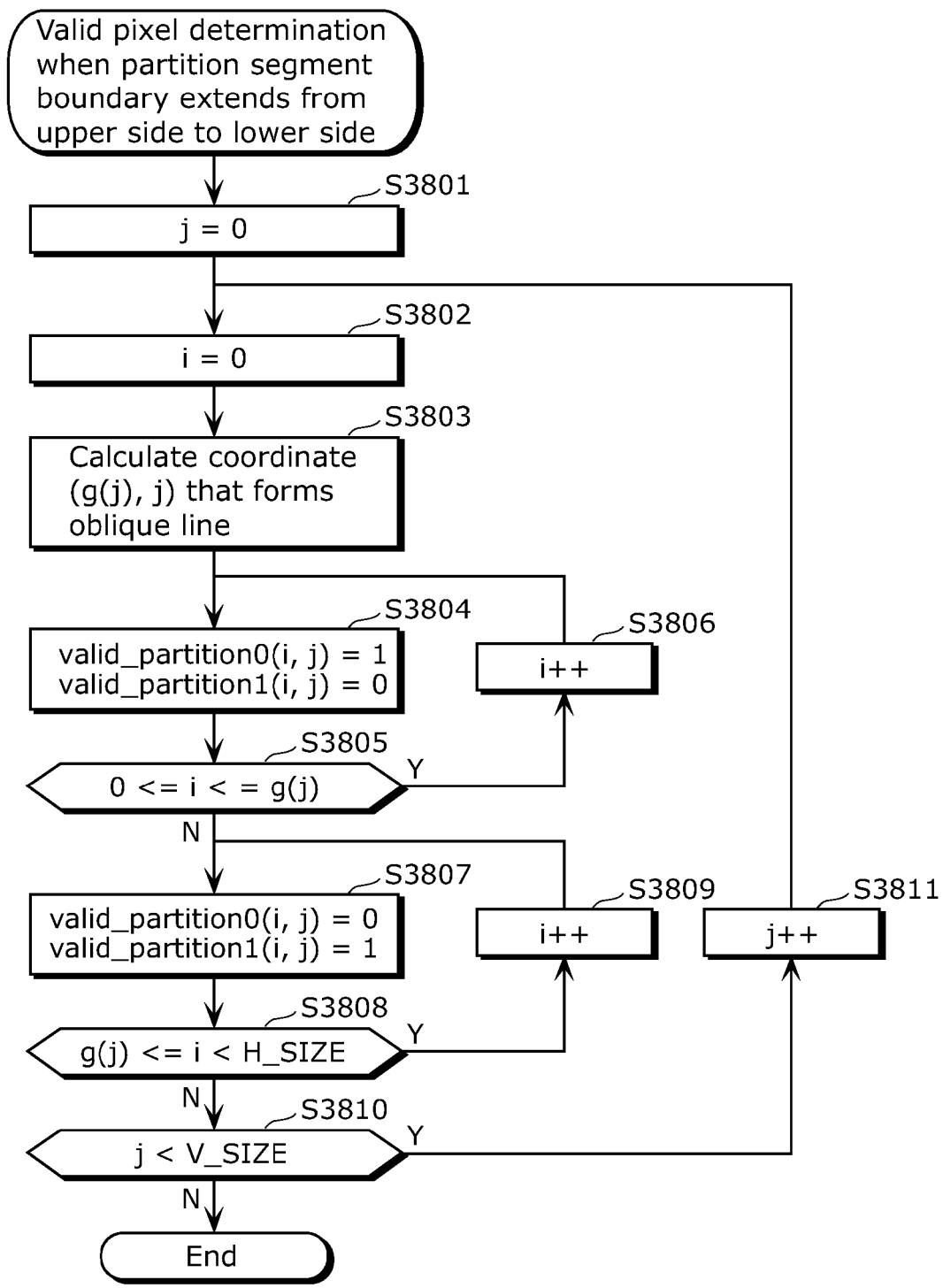
FIG. 27 is a flowchart which shows a flow of the valid pixel determination when the partition segment boundary extends from the upper side to the lower side of a pixel block.

FIG. 27 is a flowchart which shows a flow of the valid pixel determination when the partition segment boundary extends from the upper side to the lower side of the pixel block.

It is determined that j=0 is satisfied in Step S3801, and the process in Step S3802 is performed (Step S3801). It is determined that i=0 is satisfied in Step S3802, and the process in Step S3803 is performed (Step S3802). A coordinate (g(j), j) that forms an oblique line (partition segment boundary) is calculated in Step S3803, and the process in Step S3804 is performed (Step S3803).

It is determined that valid_partition0(i, j)=1 and valid_partition1(i, j)=0 are satisfied in Step S3804, and the process in Step S3805 is performed (Step S3804). In Step S3805, whether or not $0<=i<=g(j)$ is satisfied is determined. When it is determined that $0<=i<=g(j)$ is satisfied, the process in Step S3806 is performed. In Step S3806, i++ is determined, and the process in Step S3804 is performed (Step S3806). More specifically, the processes performed in Step S3804 to Step S3806 are processes for determining that the pixel which is positioned left with respect to the partition segment boundary is a pixel that belongs to the partition 0.

On the other hand, when it is determined that $0<=i<=g(j)$ is not satisfied, the process in Step S3807 is performed (Step S3805).

It is determined that valid_partition0 (i, j)=0 and valid_partition1(i, j)=1 are satisfied in Step S3807, and the process in Step S3808 is performed (Step S3807). In Step S3808, whether or not $g(j)<=i<H\_SIZE$ is satisfied is determined. When it is determined that $g(j)<=i<H\_SIZE$ is satisfied, the process in Step S3809 is performed. In Step S3809, i++ is determined, and the process in Step S3807 is performed (Step S3809). More specifically, the processes performed in Step S3807 to Step S3809 are processes for determining that the pixel which is positioned right with respect to the partition segment boundary is a pixel that belongs to the partition 1.

On the other hand, when it is determined that $g(j)<=i<H\_SIZE$ is not satisfied, the process in Step S3810 is performed (Step S3808). In Step S3810, whether or not $j<V\_SIZE$ is satisfied is determined. When it is determined that $j<V\_SIZE$ is satisfied, the process in Step S3811 is performed. In Step S3811, j++ is determined, and the process in Step S3802 is performed (Step S3811). On the other hand, when it is determined that $j<V\_SIZE$ is not satisfied, the valid pixel determination for the case where the partition segment boundary extends from the upper side to the lower side of the pixel block is ended (Step S3810).

Figure 28:
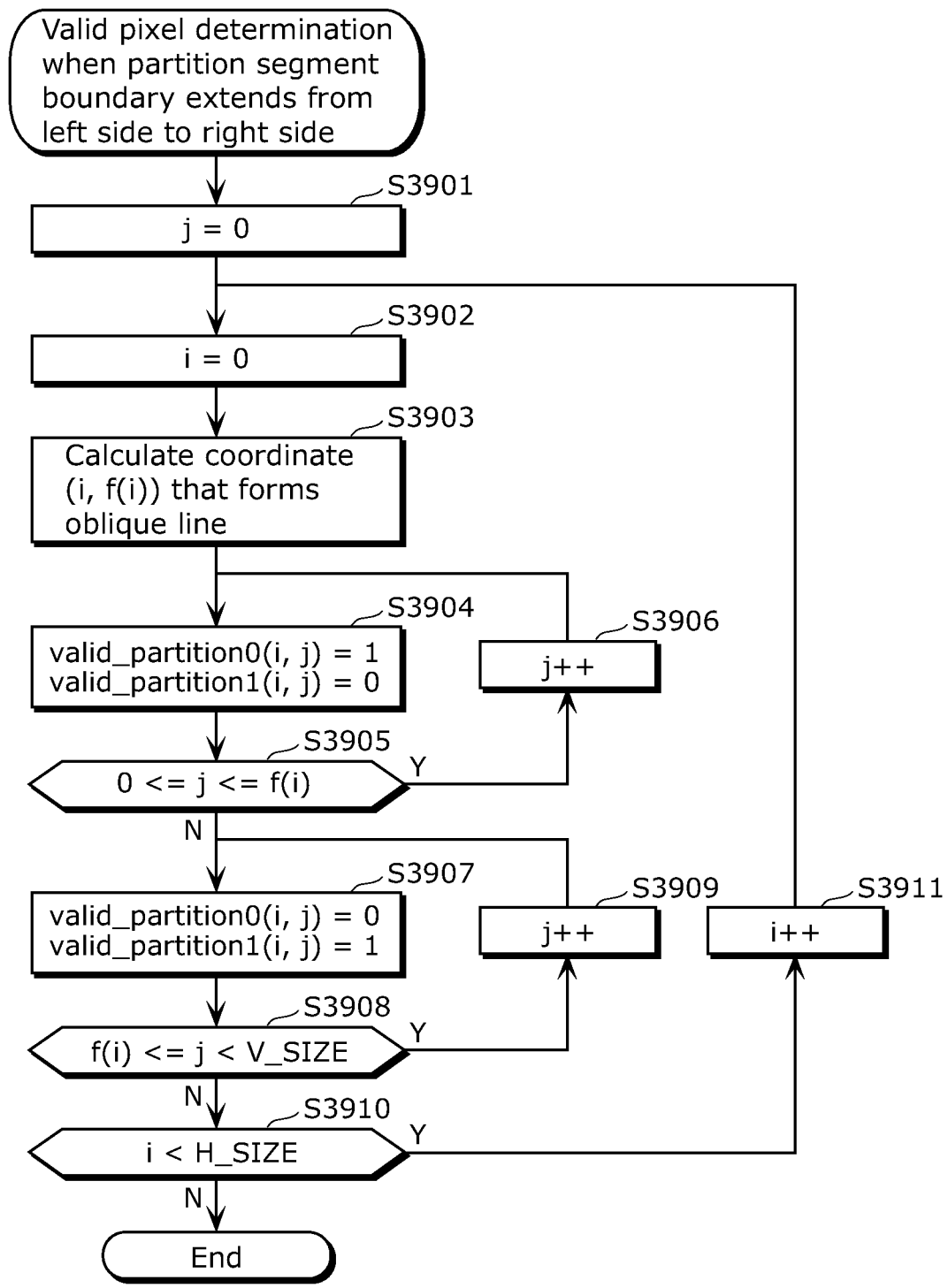
FIG. 28 is a flowchart which shows a flow of the valid pixel determination when the partition segment boundary extends from the left side to the right side of the pixel block.

FIG. 28 is a flowchart which shows a flow of the valid pixel determination when the partition segment boundary extends from the left side to the right side of the pixel block. Processes shown in FIG. 28, which are similar to the processes shown in FIG. 27, are processes for determining that a pixel which is positioned above the partition segment boundary is a pixel that belongs to the partition 0, and a pixel which is positioned below the partition segment boundary is a pixel that belongs to the partition 1.

It is determined that j=0 is satisfied in Step S3901, and the process in Step S3902 is performed (Step S3901). It is determined that i=0 is satisfied in Step S3902, and the process in Step S3903 is performed (Step S3902). A coordinate (i, f(i)) that forms an oblique line (partition segment boundary) is calculated in Step S3903, and the process in Step S3904 is performed (Step S3903).

It is determined that valid_partition0(i, j)=1 and valid_partition1(i, j)=0 are satisfied in Step S3904, and the process in Step S3905 is performed (Step S3904). In Step S3905, whether or not $0<=j<=f(i)$ is satisfied is determined. When it is determined that $0<=j<=f(i)$ is satisfied, the process in Step S3906 is performed. It is determined that j++ is satisfied in Step S3906, and the process in Step S3904 is performed (Step S3906). On the other hand, when it is determined that $0<=j<=f(i)$ is not satisfied, the process in Step S3907 is performed (Step S3905).

It is determined that valid_partition0(i, j)=0 and valid_partition1(i, j)=1 are satisfied in Step S3907, and the process in Step S3908 is performed (Step S3907). In Step S3908, whether or not $f(i)<=j<V\_SIZE$ is satisfied is determined. When it is determined that $f(i)<=j<V\_SIZE$ is satisfied, the process in Step S3909 is performed. It is determined that j++ is satisfied in Step S3909, and the process in Step S3907 is performed (Step S3909). On the other hand, when it is determined that $f(i)<=j<V\_SIZE$ is not satisfied, the process in Step S3910 is performed (Step S3908).

In Step S3910, whether or not $i<H\_SIZE$ is satisfied is determined. When it is determined that $i<H\_SIZE$ is satisfied, the process in Step S3911 is performed. In Step S3911, i++ is determined, and the process in Step S3902 is performed (Step S3911). On the other hand, when it is determined that $i<H\_SIZE$ is not satisfied, the valid pixel determination for the case where the partition segment boundary extends from the left side to the right side of the pixel block is ended (Step S3910).

Figure 29:
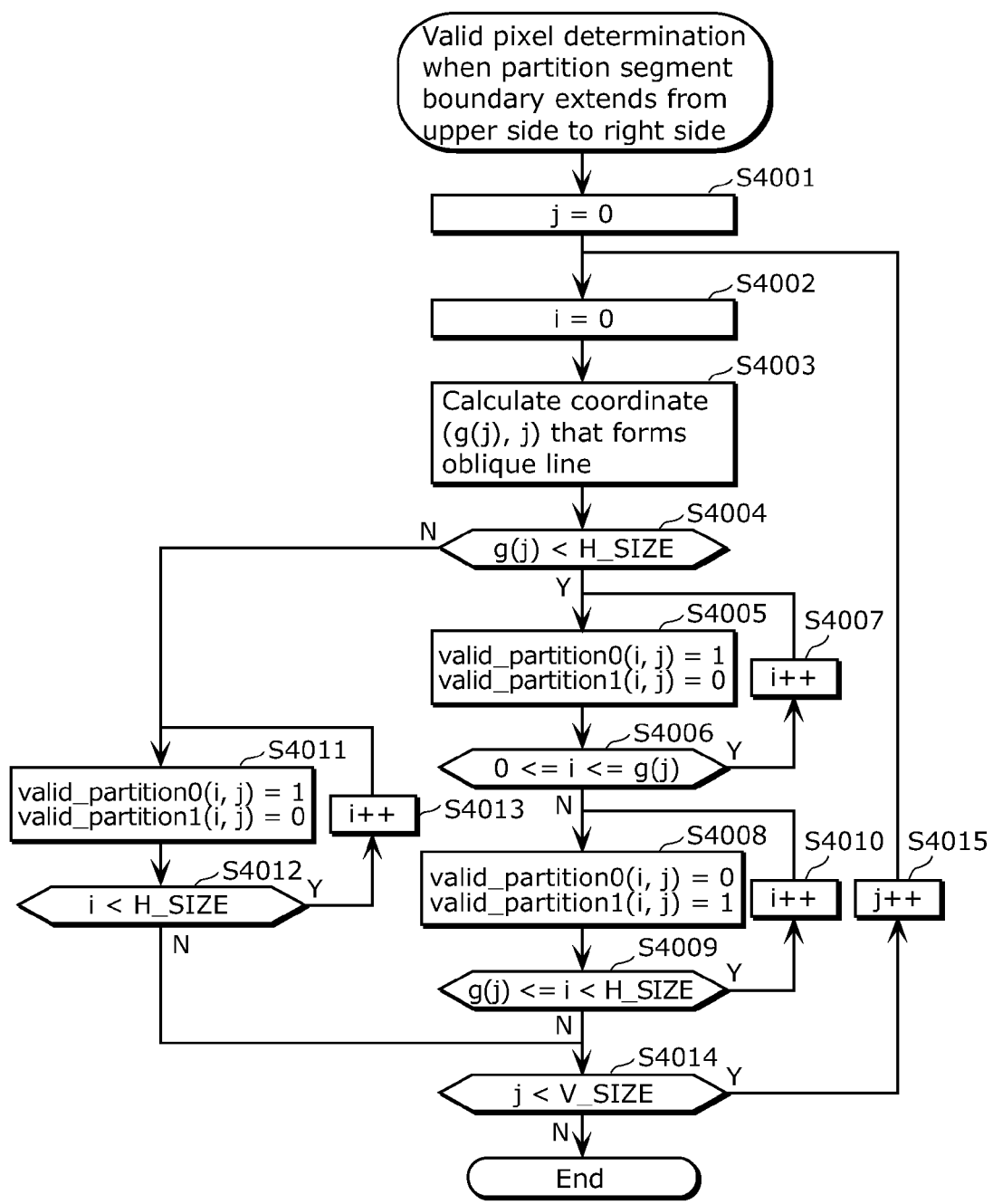
FIG. 29 is a flowchart which shows a flow of the valid pixel determination when the partition segment boundary extends from the upper side to the right side of the pixel block.

FIG. 29 is a flowchart which shows a flow of the valid pixel determination when the partition segment boundary extends from the upper side to the right side of the pixel block.

It is determined that j=0 is satisfied in Step S4001, and the process in Step S4002 is performed (Step S4001). It is determined that i=0 is satisfied in Step S4002, and the process in Step S4003 is performed (Step S4002). In Step S4003, a coordinate (g(j), j) that forms an oblique line (partition segment boundary) is calculated, and the process in Step S4004 is performed (Step S4003).

In Step S4004, whether or not $g(j)<H\_SIZE$ is satisfied is determined. When it is determined that $g(j)<H\_SIZE$ is satisfied, the process in Step S4005 is performed. On the other hand, when it is determined that $g(j)<H\_SIZE$ is not satisfied, the process in Step S4011 is performed (Step S4004).

It is determined that valid_partition0(i, j)=1 and valid_partition1(i, j)=0 are satisfied in Step S4005, and the process in Step S4006 is performed (Step S4005). In Step S4006, whether or not $0<=i<=g(j)$ is satisfied is determined. When it is determined that $0<=i<=g(j)$ is satisfied, the process in Step S4007 is performed. In Step S4007, i++ is determined, and the process in Step S4005 is performed (Step S4007). On the other hand, when it is determined that $0<=i<=g(j)$ is not satisfied, the process in Step S4008 is performed (Step S4006). More specifically, the processes performed in Step S4005 to Step S4007 are processes for determining that a pixel which is positioned left with respect to the partition segment boundary is a pixel that belongs to the partition 0.

It is determined that valid_partition0(i, j)=0 and valid_partition1(i, j)=1 are satisfied in Step S4008, and the process in Step S4009 is performed (Step S4008). In Step S4009, whether or not g(j)<=i<H_SIZE is satisfied is determined. When it is determined that g(j)<=i<H_SIZE is satisfied, the process in Step S4010 is performed. In Step S4010, i++ is determined, and the process in Step S4008 is performed (Step S4010). On the other hand, when it is determined that g(j)<=i<H_SIZE is not satisfied, the process in Step S4014 is performed (Step S4009). More specifically, the processes performed in Step S4008 to Step S4010 are processes for determining that a pixel which is positioned right with respect to the partition segment boundary is a pixel that belongs to the partition 1.

It is determined that valid_partition0(i, j)=1 and valid_partition1(i, j)=0 are satisfied in Step S4011, and the process in Step S4012 is performed (Step S4011). In Step S4012, whether or not i<H_SIZE is satisfied is determined. When it is determined that i<H_SIZE is satisfied, the process in Step S4013 is performed. In Step S4013, i++ is determined, and the process in Step S4011 is performed (Step S4013). On the other hand, when it is determined that i<H_SIZE is not satisfied, the process in Step S4014 is performed (Step S4012). More specifically, the processes performed in Step S4011 to Step S4013 are processes for determining that all of the pixels positioned below the intersection between the partition segment boundary and the right side of the pixel block are pixels that belong to the partition 0.

In Step S4014, whether or not j<V_SIZE is satisfied is determined. When it is determined that j<V_SIZE is satisfied, the process in Step S4015 is performed. In Step S4015, j++ is determined, and the process in Step S4002 is performed (Step S4015). On the other hand, when it is determined that j<V_SIZE is not satisfied, the valid pixel determination for the case where the partition segment boundary extends from the upper side to the right side of a decoded block is ended (Step S4014).

Figure 30:
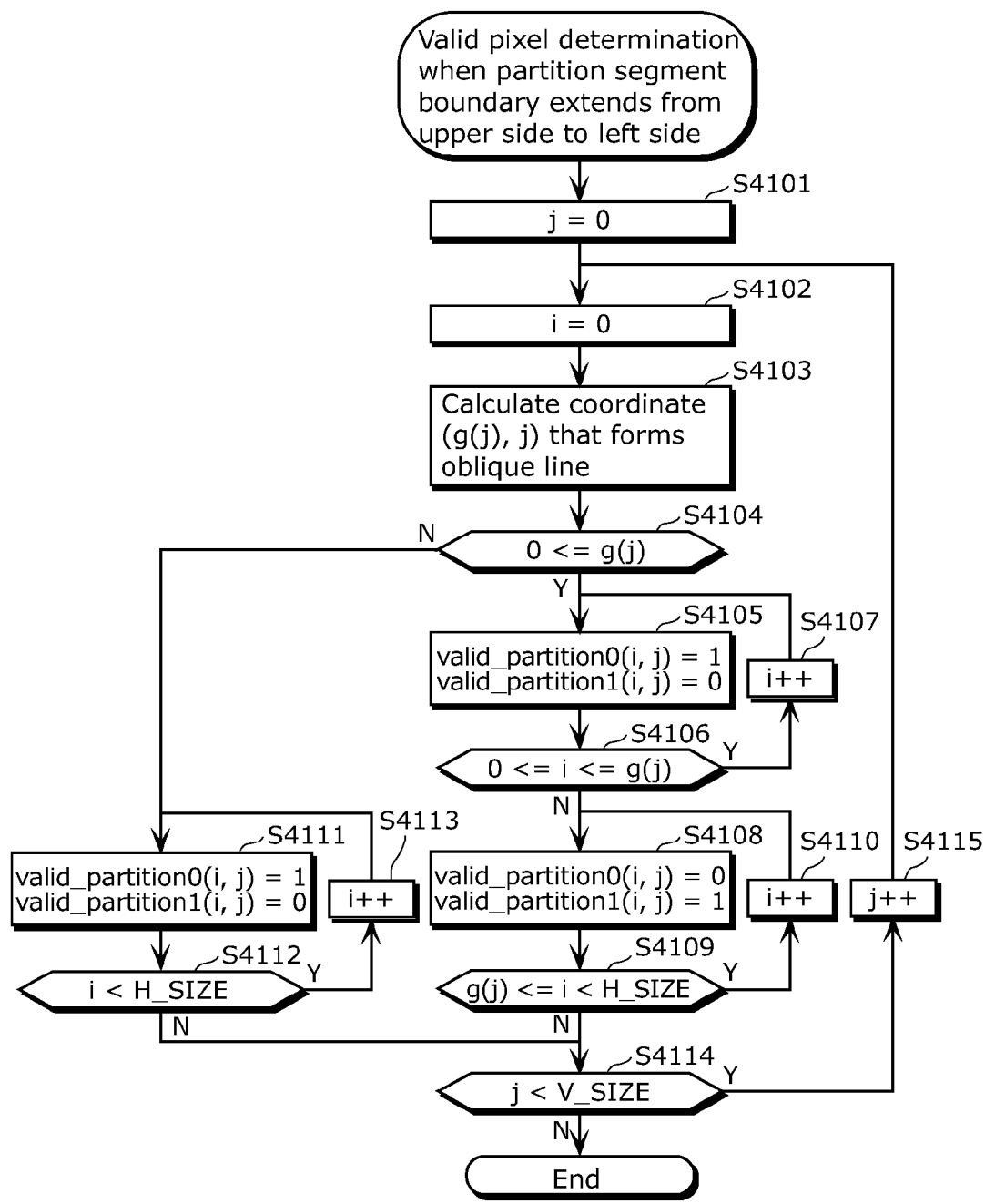
FIG. 30 is a flowchart which shows a flow of the valid pixel determination when the partition segment boundary extends from the upper side to the left side of the pixel block.

FIG. 30 is a flowchart which shows a flow of the valid pixel determination when the partition segment boundary extends from the upper side to the left side of the pixel block. Processes shown in FIG. 30, which are similar to the processes shown in FIG. 29, are processes for determining that: a pixel which is positioned left with respect to the partition segment boundary is a pixel that belongs to the partition 0; a pixel which is positioned right is a pixel that belongs to the partition 1; and all of the pixels which are positioned below the intersection between the partition segment boundary and the left side of the pixel block are pixels that belong to the partition 1.

It is determined that j=0 is satisfied in Step S4101, and the process in Step S4102 is performed (Step S4101). It is determined that i=0 is satisfied in Step S4102, and the process in Step S4103 is performed (Step S4102). In Step S4103, a coordinate (g(j), j) that forms an oblique line (partition segment boundary) is calculated, and the process in Step S4104 is performed (Step S4103).

In Step S4104, whether or not 0<=g(j) is satisfied is determined. When it is determined that 0<=g(j) is satisfied, the process in Step S4105 is performed. On the other hand, when it is determined that 0<=g(j) is not satisfied, the process in Step S4111 is performed (Step S4104).

It is determined that valid_partition0(i, j)=1 and valid_partition1(i, j)=0 are satisfied in Step S4105, and the process in Step S4106 is performed (Step S4105). In Step S4106, whether or not 0<=i<=g(j) is satisfied is determined. When it is determined that 0<=i<=g(j) is satisfied, the process in Step S4107 is performed. In Step S4107, i++ is determined, and the process in Step S4105 is performed (Step S4107). On the other hand, when it is determined that 0<=i<=g(j) is not satisfied, the process in Step S4108 is performed (Step S4106).

It is determined that valid_partition0(i, j)=0 and valid_partition1(i, j)=1 are satisfied in Step S4108, and the process in Step S4109 is performed (Step S4108). In Step S4109, whether or not g(j)<=i<H_SIZE is satisfied is determined. When it is determined that g(j)<=i<H_SIZE is satisfied, the process in Step S4110 is performed. In Step S4110, i++ is determined, and the process in Step S4108 is performed (Step S4110). On the other hand, when it is determined that g(j)<=i<H_SIZE is not satisfied, the process in Step S4114 is performed (Step S4109).

It is determined that valid_partition1(i, j)=0 and valid_partition1(i, j)=1 are satisfied in Step S4111, and the process in Step S4112 is performed (Step S4111). In Step S4112, whether or not i<H_SIZE is satisfied is determined. When it is determined that i<H_SIZE is satisfied, the process in Step S4113 is performed. In Step S4113, i++ is determined, and the process in Step S4111 is performed (Step S4113). On the other hand, when it is determined that i<H_SIZE is not satisfied, the process in Step S4114 is performed (Step S4112).

In Step S4114, whether or not j<V_SIZE is satisfied is determined. When it is determined that j<V_SIZE is satisfied, the process in Step S4115 is performed. In Step S4115, j++ is determined, and the process in Step S4102 is performed (Step S4115). On the other hand, when it is determined that j<V_SIZE is not satisfied, the valid pixel determination for the case where the partition segment boundary extends from the upper side to the left side of the pixel block is ended (Step S4114).

Figure 31:
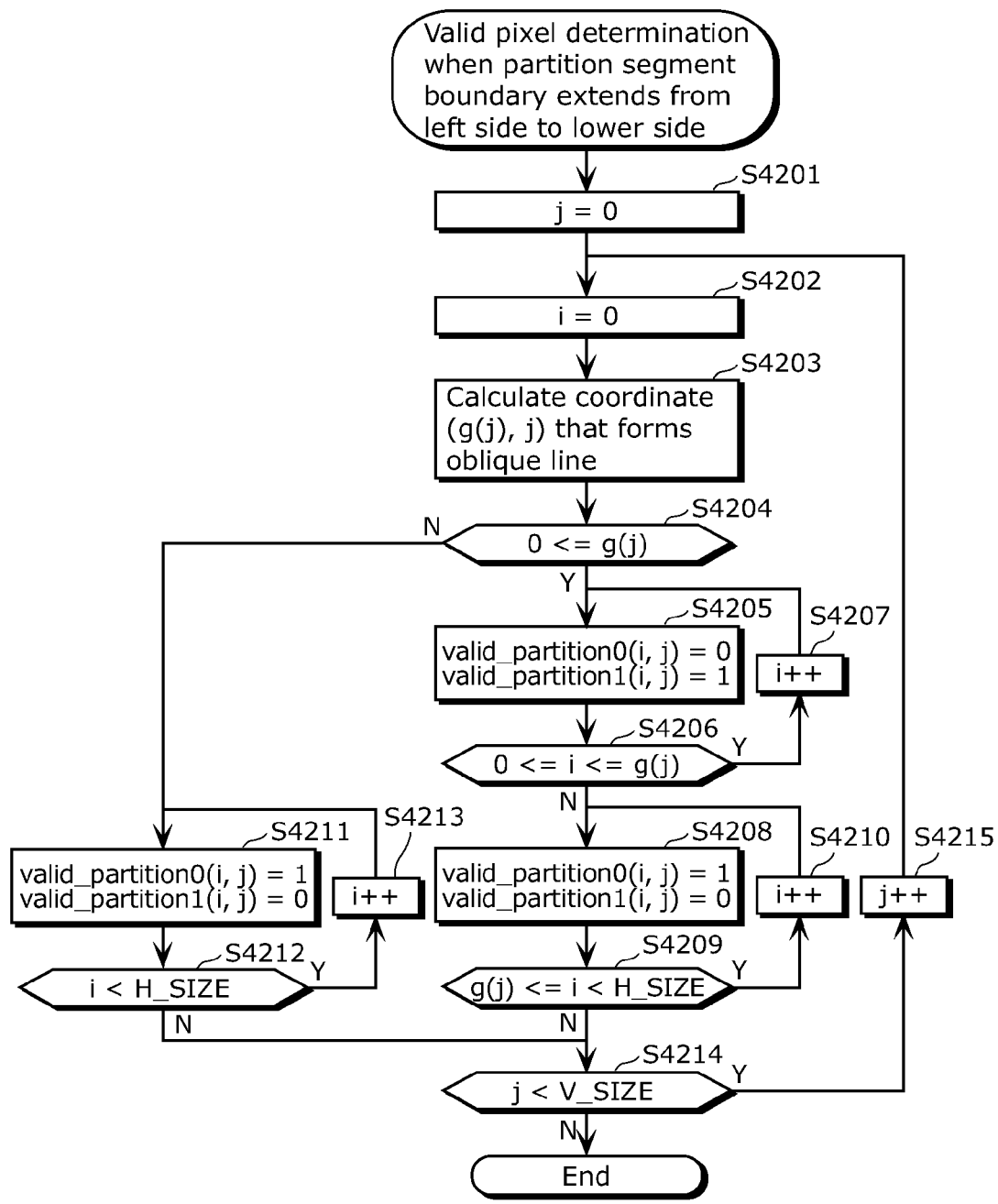
FIG. 31 is a flowchart which shows a flow of the valid pixel determination when the partition segment boundary extends from the left side to the lower side of the pixel block.

FIG. 31 is a flowchart which shows a flow of the valid pixel determination when the partition segment boundary extends from the left side to the lower side of the pixel block. Processes shown in FIG. 31, which are similar to the processes shown in FIG. 29, are processes for determining that: all of the pixels which are positioned above the intersection between the partition segment boundary and the left side of the pixel block are pixels that belong to the partition 1; a pixel which is positioned left with respect to the partition segment boundary is a pixel that belongs to the partition 0; and a pixel which is positioned right with respect to the partition segment boundary is a pixel that belongs to the partition 1.

It is determined that j=0 is satisfied in Step S4201, and the process in Step S4202 is performed (Step S4201). It is determined that i=0 is satisfied in Step S4202, and the process in Step S4203 is performed (Step S4202). In Step S4203, a coordinate (g(j), j) that forms an oblique line (partition segment boundary) is calculated, and the process in Step S4204 is performed (Step S4203).

In Step S4204, whether or not 0<=g(j) is satisfied is determined. When it is determined that 0<=g(j) is satisfied, the process in Step S4205 is performed. On the other hand, when it is determined that 0<=g(j) is not satisfied, the process in Step S4211 is performed (Step S4204).

It is determined that valid_partition0(i, j)=0 and valid_partition1(i, j)=1 are satisfied in Step S4205, and the process in Step S4206 is performed (Step S4205). In Step S4206, whether or not 0<=i<=g(j) is satisfied is determined. When it is determined that 0<=i<=g(j) is satisfied, the process in Step S4207 is performed. In Step S4207, i++ is determined, and the process in Step S4205 is performed (Step S4207). On the other hand, when it is determined that 0<=i<=g(j) is not satisfied, the process in Step S4208 is performed (Step S4206).

It is determined that valid_partition0(i, j)=1 and valid_partition1(i, j)=0 are satisfied in Step S4208, and the process in Step S4209 is performed (Step S4208). In Step S4209, whether or not g(j)<=i<H_SIZE is satisfied is determined. When it is determined that g(j)<=i<H_SIZE is satisfied, the process in Step S4210 is performed. In Step S4210, i++ is determined, and the process in Step S4208 is performed (Step S4210). On the other hand, when it is determined that g(j)<=i<H_SIZE is not satisfied, the process in Step S4214 is performed (Step S4209).

It is determined that valid_partition0(i, j)=1 and valid_partition1(i, j)=0 are satisfied in Step S4211, and the process in Step S4212 is performed (Step S4211). In Step S4212, whether or not i<H_SIZE is satisfied is determined. When it is determined that i<H_SIZE is satisfied, the process in Step S4213 is performed. In Step S4213, i++ is determined, and the process in Step S4211 is performed (Step S4213). On the other hand, when it is determined that i<H_SIZE is not satisfied, the process in Step S4214 is performed (Step S4212).

In Step S4214, whether or not j<V_SIZE is satisfied is determined. When it is determined that j<V_SIZE is satisfied, the process in Step S4215 is performed. In Step S4215, j++ is determined, and the process in Step S4202 is performed (Step S4215). On the other hand, when it is determined that j<V_SIZE is not satisfied, the valid pixel determination for the case where the partition segment boundary extends from the left side to the lower side of the pixel block is ended (Step S4214).

Figure 32:
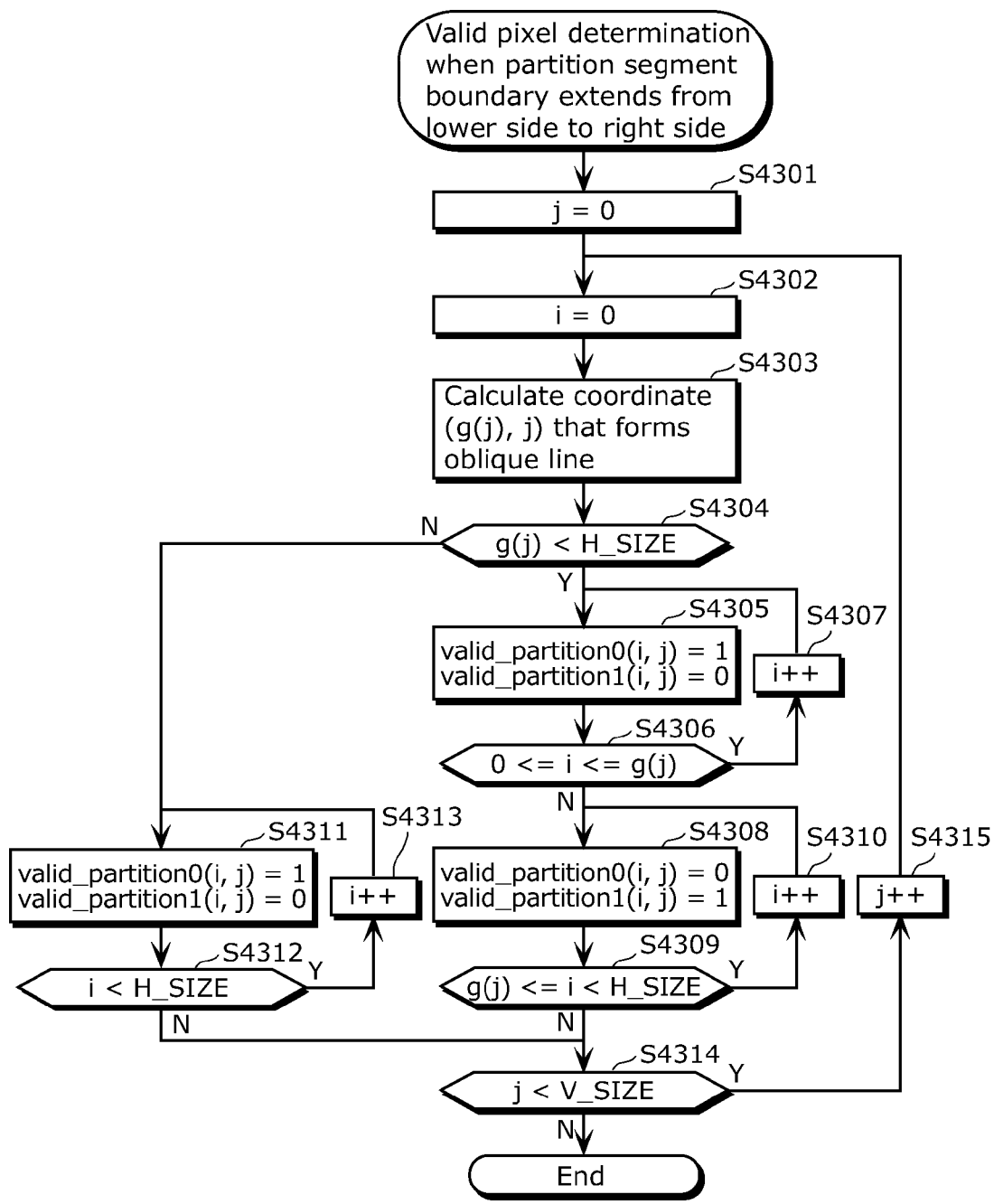
FIG. 32 is a flowchart which shows a flow of the valid pixel determination when the partition segment boundary extends from the lower side to the right side of the pixel block.

FIG. 32 is a flowchart which shows a flow of the valid pixel determination when the partition segment boundary extends from the lower side to the right side of the pixel block. Processes shown in FIG. 32, which are similar to the processes shown in FIG. 29, are processes for determining that: all of the pixels which are positioned above the intersection between the partition segment boundary and the right side of the pixel block are pixels that belong to the partition 0; a pixel which is positioned left with respect to the partition segment boundary is a pixel that belongs to the partition 0; and a pixel which is positioned right with respect to the partition segment boundary is a pixel that belongs to the partition 1.

It is determined that j=0 is satisfied in Step S4301, and the process in Step S4302 is performed (Step S4301). It is determined that i=0 is satisfied in Step S4302, and the process in Step S4303 is performed (Step S4302). In Step S4303, a coordinate (g(j), j) that forms an oblique line (partition segment boundary) is calculated, and the process in Step S4304 is performed (Step S4303).

In Step S4304, whether or not g(j)<H_SIZE is satisfied is determined. When it is determined that g(j)<H_SIZE is satisfied, the process in Step S4305 is performed. On the other hand, when it is determined that g(j)<H_SIZE is not satisfied, the process in Step S4311 is performed (Step S4304).

It is determined that valid_partition0(i, j)=1 and valid_partition1(i, j)=0 are satisfied in Step S4305, and the process in Step S4306 is performed (Step S4305). In Step S4306, whether or not 0<=i<=g(j) is satisfied is determined. When it is determined that 0<=i<=g(j) is satisfied, the process in Step S4307 is performed. In Step S4307, i++ is determined, and the process in Step S4305 is performed (Step S4307). On the other hand, when it is determined that 0<=i<=g(j) is not satisfied, the process in Step S4308 is performed (Step S4306).

It is determined that valid_partition0(i, j)=0 and valid_partition1(i, j)=1 are satisfied in Step S4308, and the process in Step S4309 is performed (Step S4308). In Step S4309, whether or not g(j)<=i<H_SIZE is satisfied is determined. When it is determined that g(j)<=i<H_SIZE is satisfied, the process in Step S4310 is performed. In Step S4310, i++ is determined, and the process in Step S4308 is performed (Step S4310). On the other hand, when it is determined that g(j)<=i<H_SIZE is not satisfied, the process in Step S4314 is performed (Step S4309).

It is determined that valid_partition0(i, j)=1 and valid_partition1(i, j)=0 are satisfied in Step S4311, and the process in Step S4312 is performed (Step S4311). In Step S4312, whether or not i<H_SIZE is satisfied is determined. When it is determined that i<H_SIZE is satisfied, the process in Step S4313 is performed. In Step S4313, i++ is determined, and the process in Step S4311 is performed (Step S4313). On the other hand, when it is determined that i<H_SIZE is not satisfied, the process in Step S4314 is performed (Step S4312).

In Step S4314, whether or not j<V_SIZE is satisfied is determined. When it is determined that j<V_SIZE is satisfied, the process in Step S4315 is performed. In Step S4315, j++ is determined, and the process in Step S4302 is performed (Step S4315). On the other hand, when it is determined that j<V_SIZE is not satisfied, the valid pixel determination for the case where the partition segment boundary extends from the lower side to the right side of the pixel block is ended (Step S4314).

The valid pixel in a pixel block, that is, a reference block can be extracted in the reference block memory 1171 by performing the processes in the flowcharts shown in FIG. 20 to FIG. 32 as described above.

According to the configuration described above, it is possible to reduce the time taken for determining, from the frame memory 1140, an address of the reference block for performing the non-rectangular motion compensation. It is, therefore, possible to reduce the time from the point when the motion estimation unit 1160 calculates header information (motion vector, block partition information, reference image identifying information, and the like) to the point when the frame-memory-transfer control unit 1172 reads a rectangular pixel block including the reference block and writes the read pixel into the reference block memory 1171.

It is to be noted that, although the method in which a vertex coordinate of a circumscribing rectangle is used for calculating a horizontal coordinate and a vertical coordinate of a reference screen coordinate in a rectangular region including the non-rectangular reference block is described, a vertex coordinate of a rectangle including the reference block or a coordinate of a side of the reference block may be used for the calculation.

(Embodiment 2)

Figure 33:
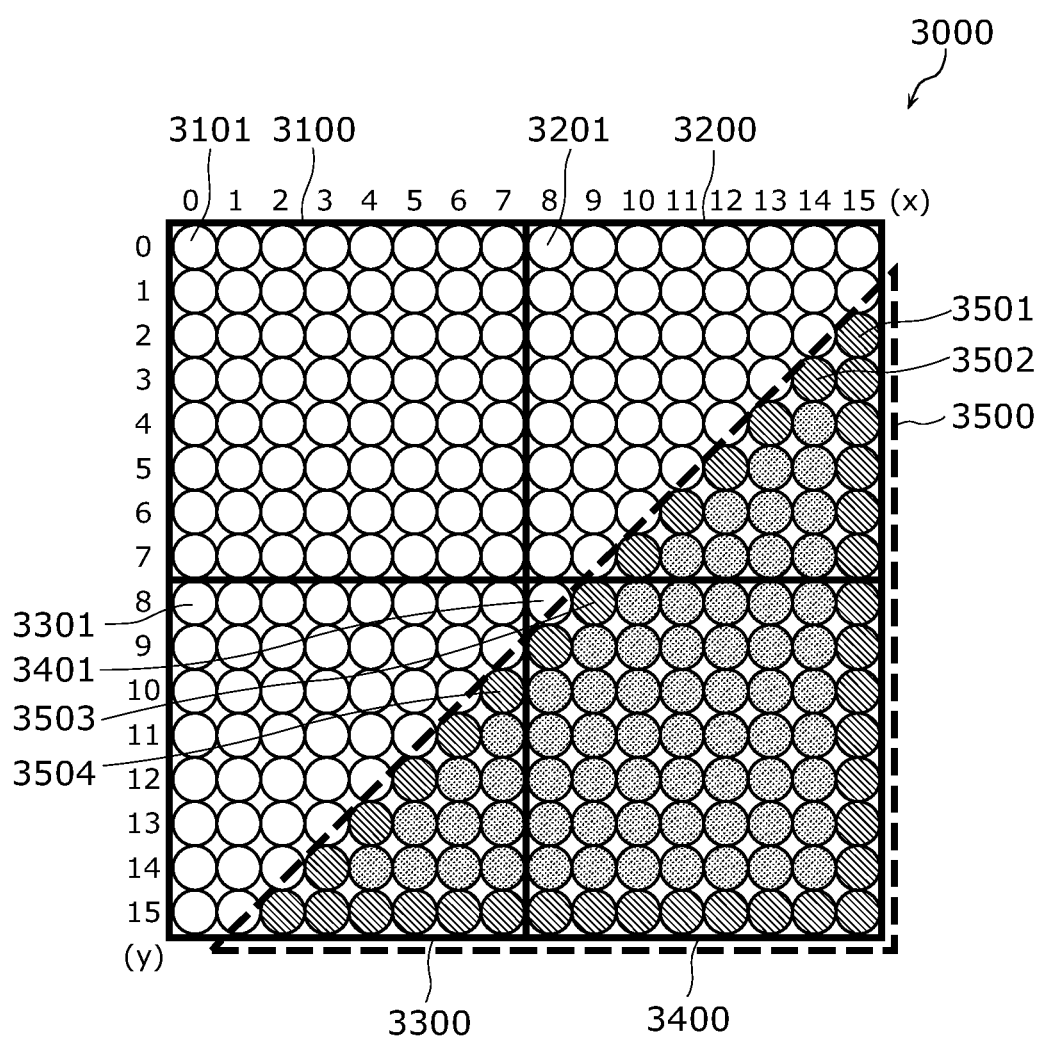
FIG. 33 is a diagram for describing the process of calculating an address of a pixel block according to Embodiment 2.

The frame-memory-transfer control unit 1172 according to Embodiment 1 transfers pixel data of a single rectangular pixel block that circumscribes a non-rectangular reference block, from the frame memory 1140 to the reference block memory 1171. When a triangle reference block 3500 (105 pixels) indicated by hatching (including diagonal hatching and dot hatching) in FIG. 33 is used for motion compensation, a rectangular pixel block 3000 (256 pixels) is the target for transfer. As described above, there is a possibility that many pixels (151 pixels in the above example) which are not actually used for motion compensation need to be transferred depending on the shape or the size of a reference block.

In view of the above, Embodiment 2 aims to reduce the load for transferring from the frame memory 1140 to the reference block memory 1171, by excluding part of pixels which are not used for motion compensation from the target for transfer. It is to be noted that, since the configuration and fundamental operation of an image coding apparatus and an image decoding apparatus according to Embodiment 2 are the same as those in Embodiment 1, detailed explanation for the same points is omitted and description will be given focusing on the difference.

Figure 34:
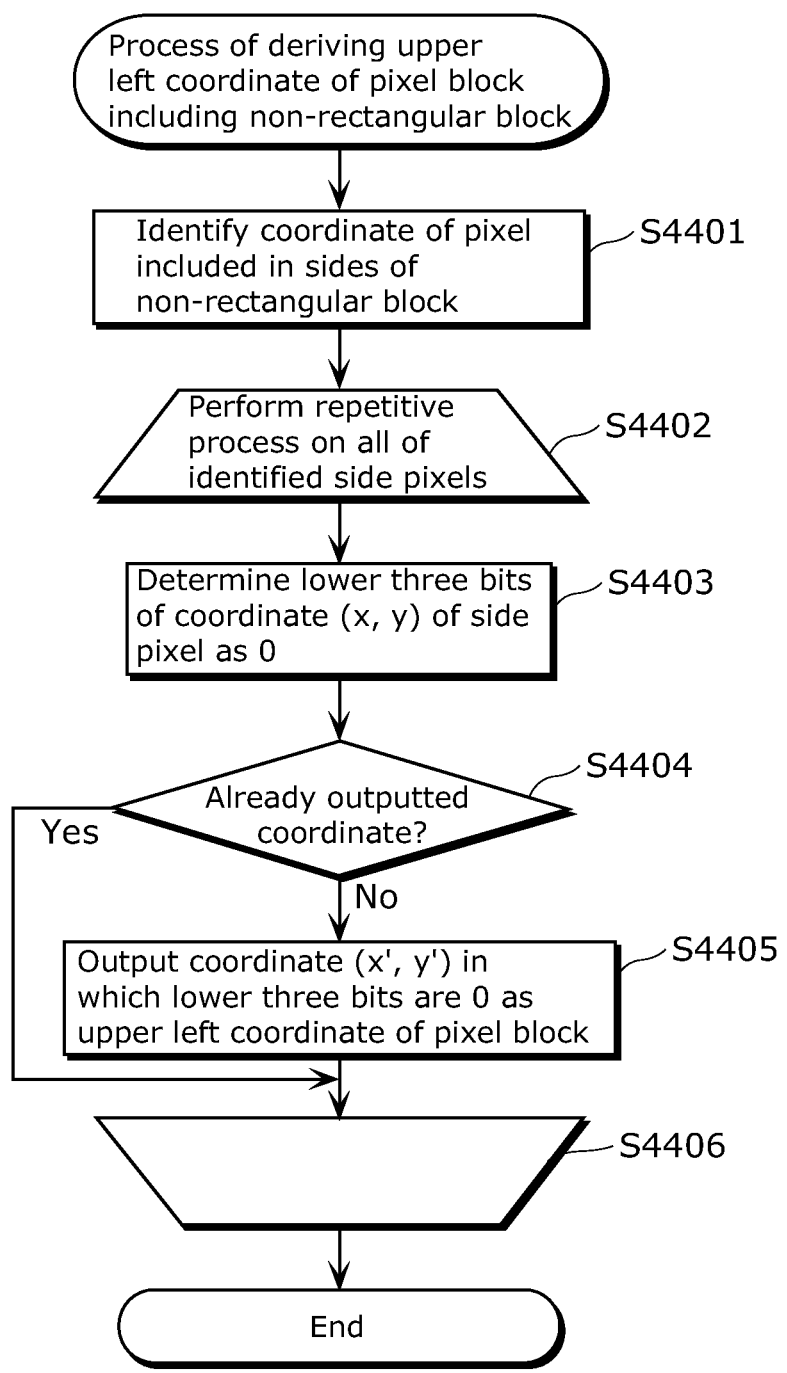
FIG. 34 is a flowchart illustrating a processing flow for deriving an upper left coordinate of a rectangular pixel block according to Embodiment 2.

FIG. 33 is a diagram which shows a rectangular pixel block including a non-rectangular reference block used for motion compensation. FIG. 34 is a flowchart illustrating a process of deriving an upper left coordinate of a pixel block according to Embodiment 2. More specifically, Embodiment 2 differs from Embodiment 1 in the process corresponding to Step S2303 in FIG. 13.

First, the frame-memory-transfer control unit 1172 according to Embodiment 2 is, as shown in FIG. 33, capable of partitioning the reference image 3000 into rectangular pixel blocks each having a predetermined size, that is, pixel blocks 3100, 3200, 3300, and 3400, and transferring in a unit of the pixel block 3100, 3200, 3300, or 3400 from the frame memory 1140 to the reference block memory 1171. More specifically, each of the pixel blocks 3100, 3200, 3300, and 3400 is an access unit of DRAM, for example, and is a square of 8 pixels×8 pixels in the example shown in FIG. 33. However, the size of a pixel block is not limited to that described above. In addition, the pixel block is not necessarily a square, but may be rectangular.

Then, the frame-memory-transfer control unit 1172 according to Embodiment 2 identifies at least one of the pixel blocks 3200, 3300, and 3400 each of which includes a pixel included in the non-rectangular reference block 3500, from among the plural pixel blocks 3100, 3200, 3300, and 3400, and transfers pixel data of the identified at least one of the pixel blocks 3200, 3300, and 3400 from the frame memory 1140 to the reference block memory 1171.

The following describes the process for deriving an upper left coordinate of a pixel block that is a target for transfer, with referenced to FIG. 34. It is to be noted that, FIG. 34 is an example of the process for deriving an upper left coordinate, and the present invention is not limited to this.

First, the frame-memory-transfer control unit 1172 identifies a coordinate of a pixel included in sides of the non-rectangular reference block 3500 (S4401). In the example of FIG. 33, the coordinates of 39 pixels indicated by diagonal hatching are identified. It is to be noted that the coordinate of a pixel is represented by a combination of x coordinate (lateral direction) and y coordinate (lengthwise direction), and the coordinate of a pixel 3101 positioned at the upper left is (0, 0), for example.

Next, the frame-memory-transfer control unit 1172 performs the processes from Step S4403 to Step S4405 on all of the 39 pixels identified in Step S4401 (S4402 and S4406). This repetitive process is a process of deriving an upper left coordinate of a pixel block including a pixel included in the non-rectangular reference block 3500.

First, the frame-memory-transfer control unit 1172 replaces lower three bits of a coordinate value of the pixel included in the sides of the reference block 3500 with 0 (S4403). For example, the lower three bits of the coordinate (15, 2) of a pixel 3501 positioned at the upper right of the non-rectangular reference block 3500 is replaced with 0, thereby obtaining a coordinate (8, 0) of a pixel 3201 positioned at the upper left of a pixel block 3200 including the pixel 3501. However, the number of bits to be replaced differs when the size of a pixel block is different. For example, when the size of a pixel block is 16 pixels×16 pixels, lower four bits of the coordinate value is to be replaced.

Next, the frame-memory-transfer control unit 1172 determines whether or not the coordinate (8, 0) derived in Step S4403 is a coordinate already outputted in Step S4404 which is to be described later (S4403). When it is determined that the coordinate is not yet output (No in S4403), the frame-memory-transfer control unit 1172 outputs the coordinate (8, 0) derived in Step S4403 as the upper left coordinate of the pixel block 3200 including the pixel included in the non-rectangular reference block 3500 (S4404).

On the other hand, when the processes of Step S4403 to Step S4405 are performed next on a pixel 3502 positioned at the lower left of the pixel 3501, the coordinate (8, 0) of the pixel 3201 positioned at the upper left of the pixel block 3200 is obtained in the same manner as the case of the pixel 3501 (S4403). Accordingly, the coordinate is not outputted (Yes in S4404).

When the processes described above are performed on 39 pixels indicated by the diagonal hatching in FIG. 33, for example, the coordinate (8, 8) of the pixel 3401 positioned at the upper left of the pixel block 3400 is obtained from the coordinate (9, 8) of the pixel 3503, and the coordinate (0, 8) of the pixel 3301 positioned at the upper left of the pixel block 3300 is obtained from the coordinate (7, 10) of the pixel 3504.

More specifically, it is possible to obtain the upper left coordinates of three pixel blocks 3200, 3300, and 3400 through the process corresponding to Step S2303 in FIG. 13, by applying the process of Embodiment 2 to FIG. 33. On the other hand, the size of each of the pixel blocks 3200, 3300, and 3400 is fixed (8 pixels×8 pixels), and thus there is no need for deriving the size once again.

As described above, according to Embodiment 2, in order to use the reference block 3500 for motion compensation, it is sufficient to transfer the pixel data (192 pixels) of three pixel blocks 3200, 3300, and 3400 from the frame memory 1140 to the reference block memory 1171, making it possible to reduce the load for transferring compared to Embodiment 1.

(Embodiment 3) Set System Mounting

*An Execution Program and a Recording Medium Holding the Program*

The processing described in each of Embodiments can be simply implemented in an independent computer system, by recording, in a recording medium, a program for implementing the configurations of the image decoding method described in each of the above-described embodiments. The recording media may be any recording media as long as a program can be recorded, such as a magnetic disk, an optical disk, a magnetic optical disk, an IC card, and a semiconductor memory.

Hereinafter, the applications to the image processing apparatus described in each of the embodiments and systems using thereof will be described.

*A System Connected Via a Network*

Figure 35:
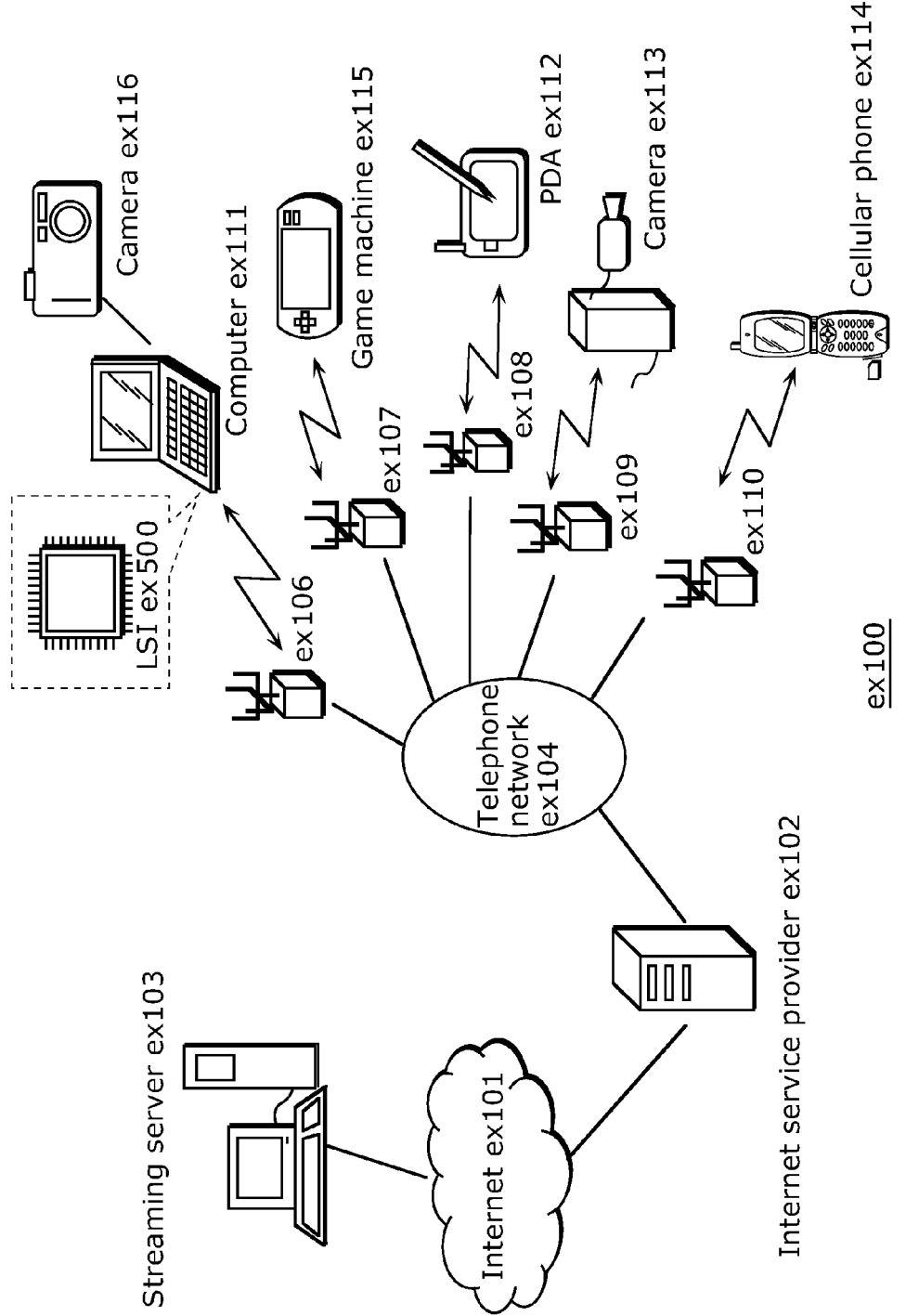
FIG. 35 illustrates an overall configuration of a content providing system for implementing content distribution services.

FIG. 35 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 35, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM(r)), Code Division Multiple Access (CDMA), Wideband-Code Division Multiple Access (W-CDMA), a Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that has received the distributed data decodes and reproduces the received data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes are performed by an LSI ex500 generally included in each of the computer ex111 and the devices. The LSI ex500 may be configured of a single chip or a plurality of chips. It is to be noted that software for coding and decoding video may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. As described above, the clients can receive and decode information transmitted by the user, and reproduce the decoded data in real time in the content providing system ex100, so that the user who does not have any particular right and equipment can implement personal broadcasting.

*Broadcasting System*

Figure 36:
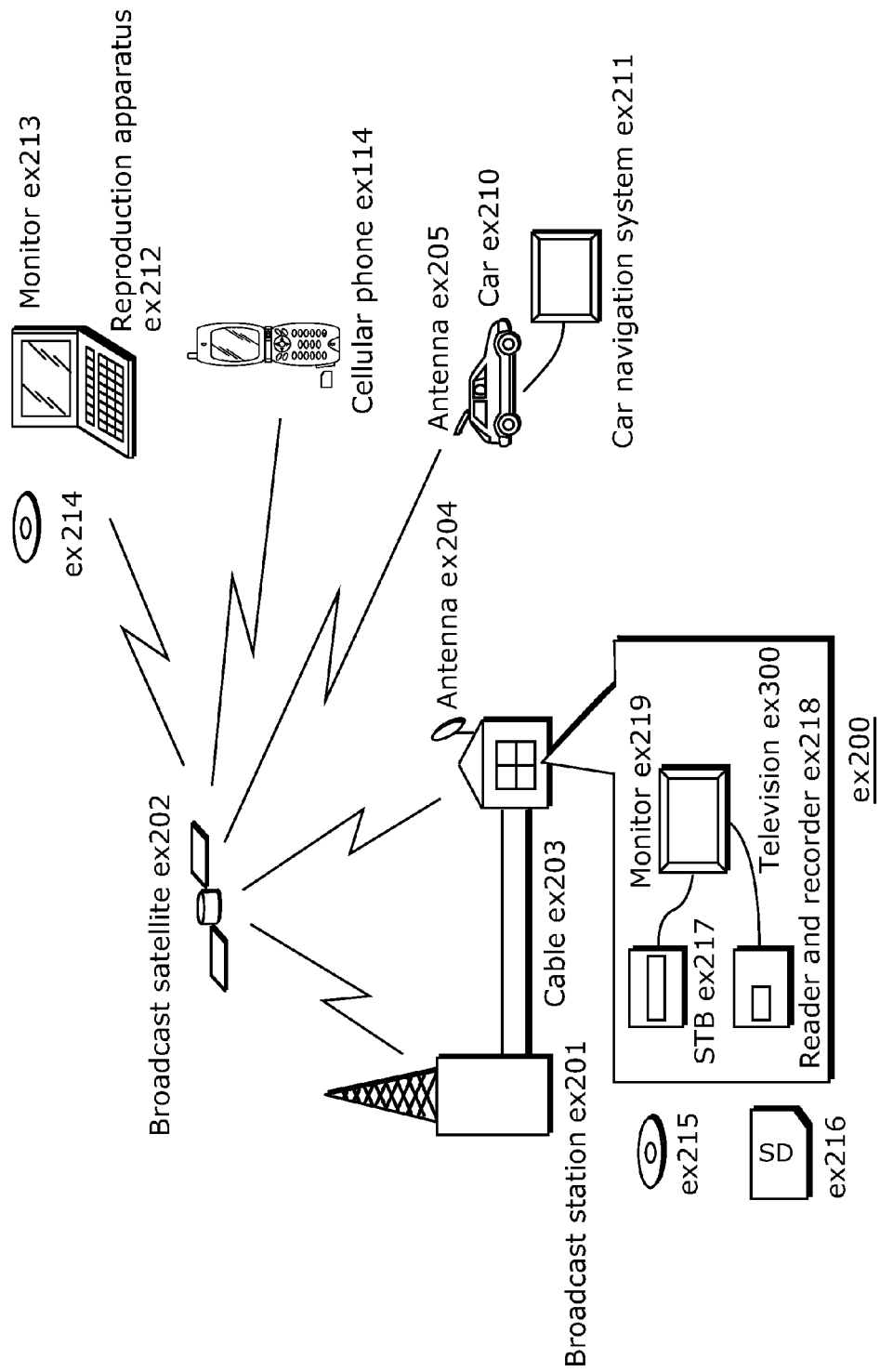
FIG. 36 is an overall configuration of a digital broadcasting system.

It is to be noted that, aside from the example of the content providing system ex100, at least one of the video coding apparatus and the video decoding apparatus described in each of the embodiments may be implemented in a digital broadcasting system ex200 as illustrated in FIG. 36. More specifically, a broadcast station ex201 communicates or transmits, via radio waves to a broadcast satellite ex202, a bit stream of video information. The bit stream is a coded bit stream which is coded using the video coding method described in each of the embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received bit stream and reproduces the decoded bit stream.

In addition, the reproduction apparatus ex212 which reads and decodes the bit stream recorded on the storage media ex214 such as a CD and a DVD which are recording medium can include the image decoding apparatus shown in the embodiments describe above. In this case, the reproduced video signal is displayed on the monitor ex213.

Furthermore, a reader/recorder ex218 that (i) reads and decodes the coded bit stream recorded on a recording media ex215, such as a DVD and a BD, or (ii) codes video signals and writes the coded video signals into the recording medium ex215 can include the video decoding apparatus or the video coding apparatus as shown in each of the embodiments. In this case, the reproduced video signals are displayed on the monitor ex219, and can be reproduced by another device or system using the recording medium ex215 on which the coded bit stream is recorded. In addition, it is also possible to implement the video decoding apparatus in the set top box ex217 connected to the cable ex203 for a cable television or to the antenna ex204 for satellite and/or terrestrial broadcasting, so as to display the video signals on the monitor ex219 of the television. The video decoding apparatus may be implemented not in the set top box but in the television.

*Television as an Example of the Device in the Broadcasting System*

Figure 37:
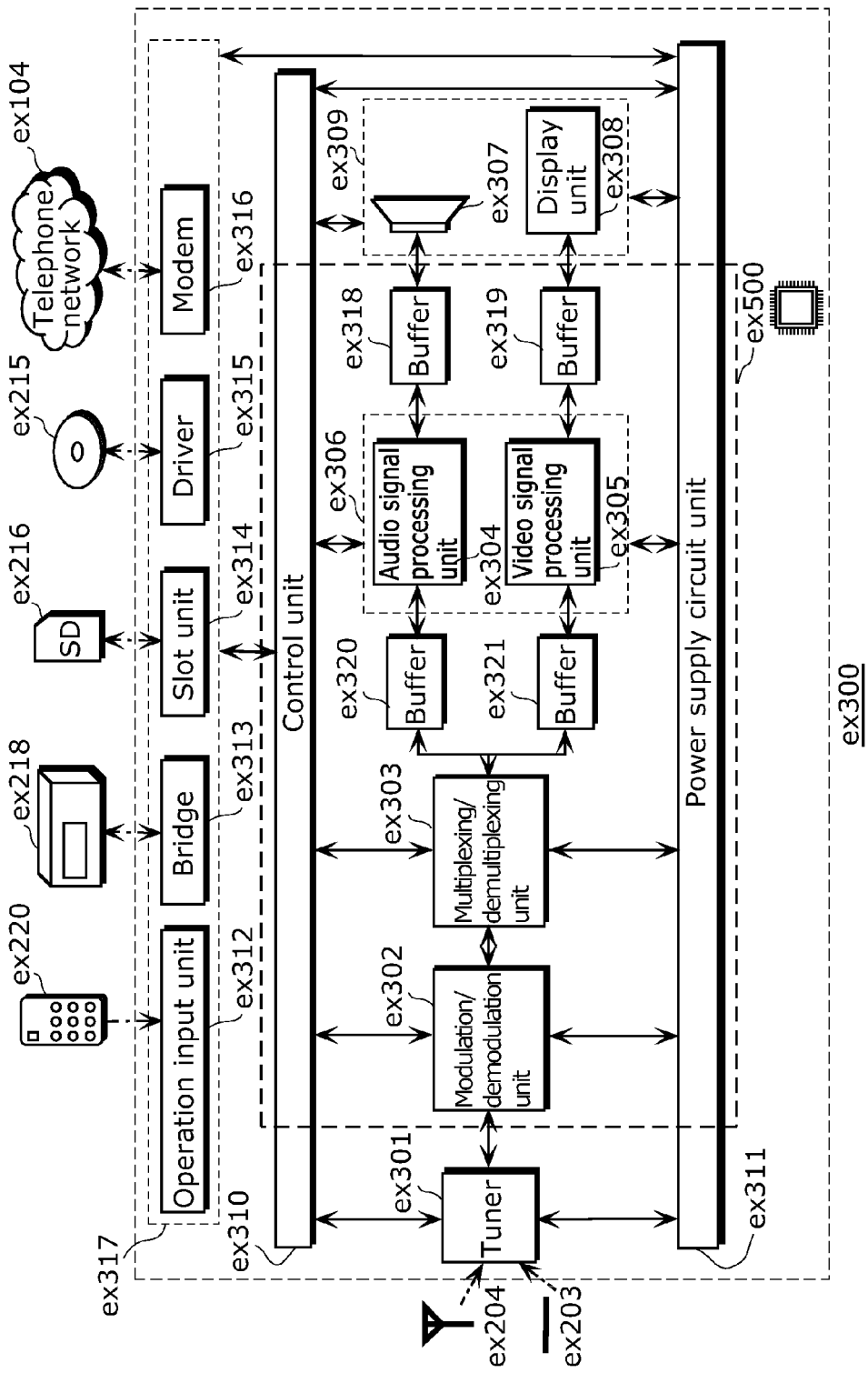
FIG. 37 is a block diagram illustrating an example of a configuration of a television.

FIG. 37 illustrates the television (receiver) ex300 that uses the image decoding method described in each of the embodiments. The television ex300 includes: a tuner ex301; a modulation/demodulation unit ex302; and the multiplexing/demultiplexing unit ex303. The tuner ex301 obtains or outputs a bit stream of video information via an antenna ex204 or a cable ex203 which receives the above-mentioned broadcast. The modulation/demodulation unit ex302 demodulates the received coded data or modulates the received coded data into coded data to be transmitted to outside. The multiplexing/demultiplexing unit ex303 demultiplexes the demodulated video data or audio data, or multiplexes the coded video data or audio data. The television ex300 further includes: an audio signal processing unit ex304 and a video signal processing unit ex305 that decode audio data and video data, respectively, or code the respective information; a speaker ex307 that outputs the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes data obtained from outside through the antenna ex204 and others and reproduces the decoded data will be described. In the television ex300, upon a user operation from a remote controller ex220 and others, the multiplexing/demultiplexing unit ex303 demultiplexes the video data and the audio data which are demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of the embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read coded bit stream not through a broadcast and others but from the recording media ex215 and ex216, such as a magnetic/optical disk, and an SD card. Next, a configuration in which the television ex300 codes an audio signal and a video signal, and transmits the data outside or writes the data on a recording medium will be described. In the television ex300, upon a user operation from the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signals outside. When the multiplexing/demultiplexing unit ex303 multiplexes the video signal and the audio signal, the signals may be temporarily stored in the buffers ex320 and ex321, and others so that the signals are reproduced in synchronization with each other. It is to be noted that, the buffers ex318 to ex321 may be plural as illustrated, or at least one buffer may be shared. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. It is to be noted that, although the television ex300 can code, multiplex, and provide outside data in the description, it may be capable of only receiving, decoding, and providing outside data but not the coding, multiplexing, and providing outside data.

In addition, when the reader/recorder ex218 writes or reads the coded bit stream to and from the recording medium, the above-mentioned decoding or coding may be performed by any one of the television ex300 and the reader/recorder ex218, or the decoding or coding may be shared by television ex300 and the reader/recorder ex218.

*The Configuration of which the Television or the Reader/Recorder Records and Reproduces on and from the Recording Medium*

Figure 38:
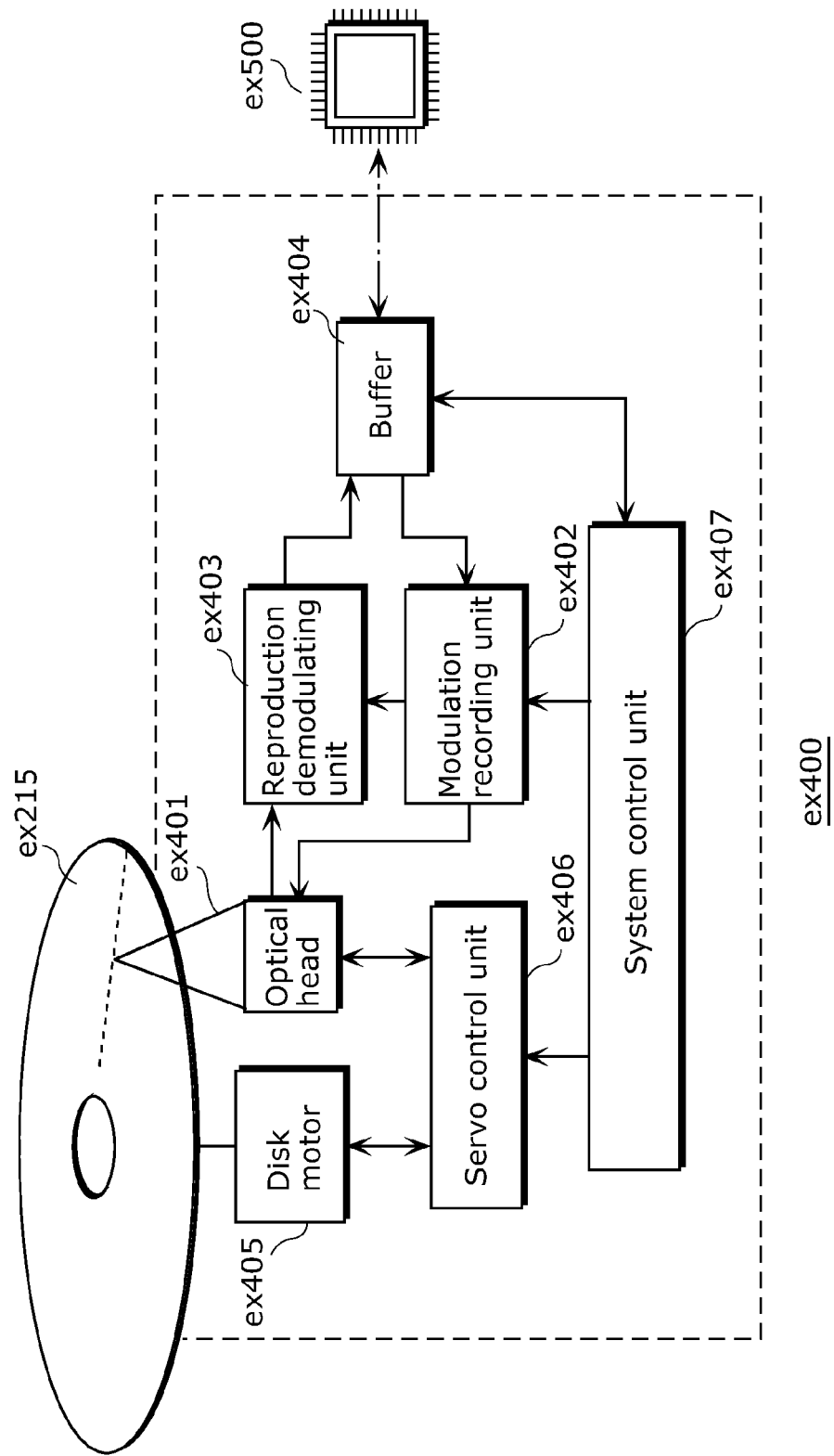
FIG. 38 is a block diagram illustrating an example of a configuration of an information reproducing/recording unit that reads and writes information from or on a recording medium that is an optical disk.

As an example, FIG. 38 illustrates a configuration of an information reproducing/recording unit ex400 when data is read or written from or on an optical disk. The information reproducing/recording unit ex400 includes constituent elements ex401 to ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined to information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 39:
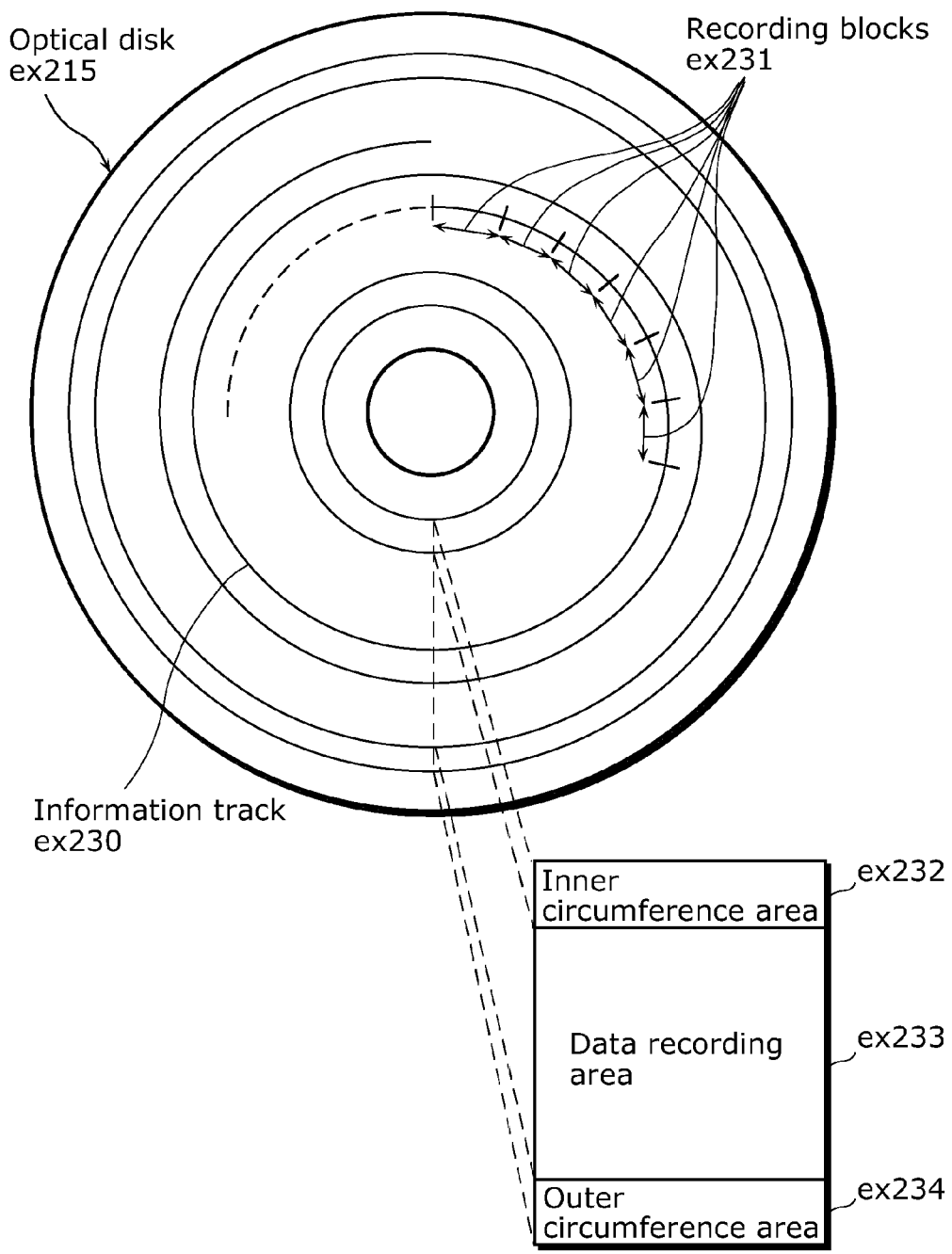
FIG. 39 is a diagram showing an example of a configuration of a recording medium that is an optical disk.

FIG. 39 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 37. The same will be true for the configuration of the computer ex111, the cellular phone ex114, and others. Furthermore, similarly to the television ex300, a terminal such as the cellular phone ex114 probably have three types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the video coding method or the video decoding method in each of the embodiments can be used in any of the devices and systems described above. Thus, the advantages described in each of the embodiments can be obtained.

Furthermore, the present invention is not limited to Embodiments, and various modifications and revisions are possible without departing from the scope of the present invention.

(Embodiment 4) LSI Implementation
*Only the LSI1 Invention Part*

Figure 40:
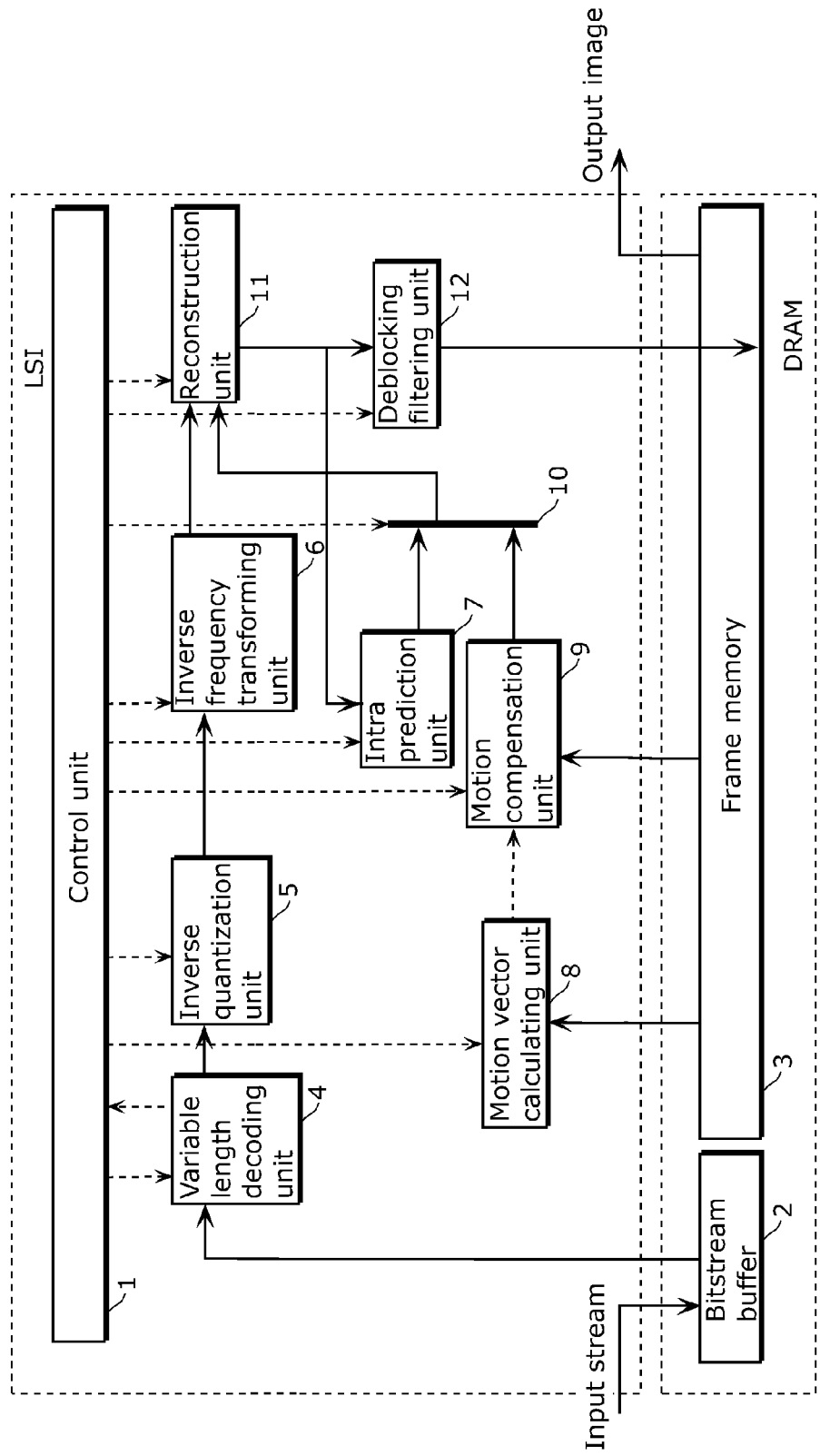
FIG. 40 is a configuration diagram illustrating an example of a configuration of an integrated circuit for implementing the video decoding apparatus according to each of Embodiments.

According to this embodiment, the image decoding apparatus described in Embodiment 1 is implemented as an LSI that is typically a semiconductor integrated circuit and shown in FIG. 40. The frame memory 3 is implemented on a DRAM and other circuits and memories are included on the LSI.

It is to be noted that they may be realized as a single chip one-by-one, or as a single chip to include part or all of them. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. It is also possible to use a filed programmable gate array (FPGA) which can be programmed in the field after manufacturing an LSI, or a reconfigurable processor in which connection and setting of circuit cells inside an LSI can be reconfigured.

In the future, with advancement in semiconductor technology, a brand-new technology may replace LSI. The functional blocks can be integrated using such a technology. The possibility is that the present invention is applied to biotechnology.

In addition, it is also possible to configure a drawing device applicable to a variety of applications, by combining a semiconductor chip on which the image decoding apparatus according to the present embodiment is integrated and a display for drawing an image. The present invention can be used as an information drawing means in a cellular phone, a television, a digital video recorder, a digital video camera, a car navigation, and so on. As a display, it is possible to combine with, in addition to a cathode-ray tube (CRT), a flat display such as a liquid crystal, a plasma display panel (PDP), an organic EL, and so on, a projection display represented by a projector, and so on.

In addition, although the configurations of the system LSI and a dynamic random access memory (DRAM) are described in the present embodiment, other storage devices such as an embedded DRAM (eDRAM), a static random access memory (SRAM), and a hard disk may be used for the configuration.

(Embodiment 5) Set System Mounting
*The Whole LSI 1*

Figure 41:
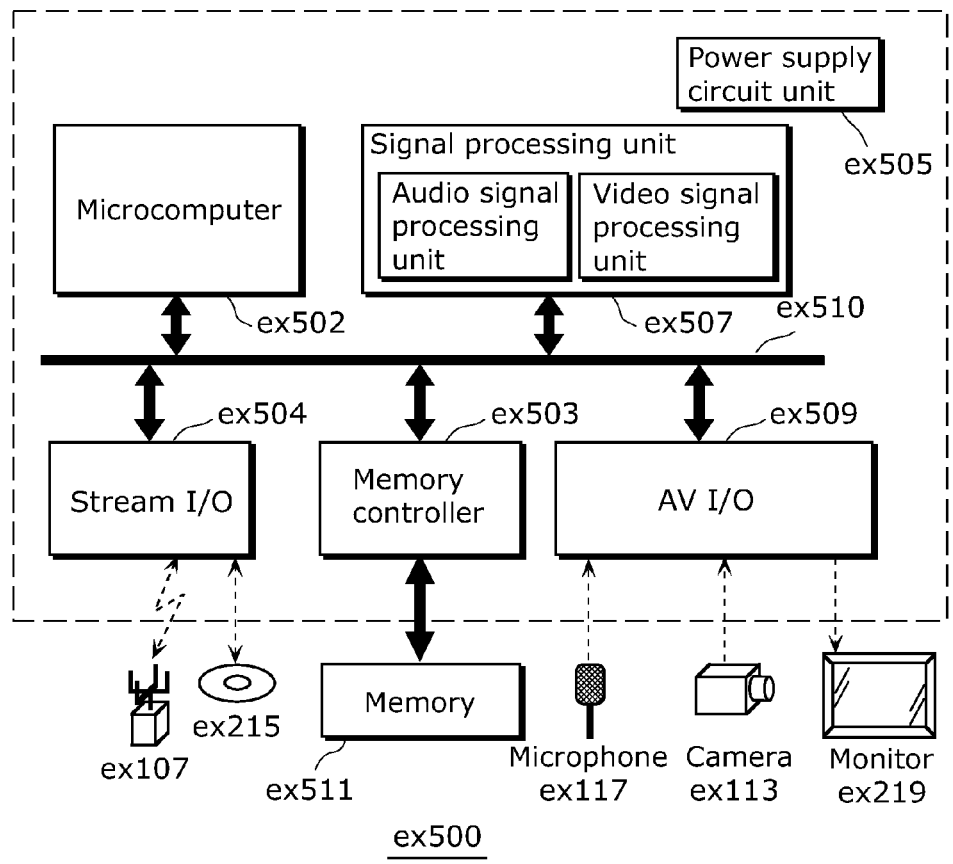
FIG. 41 is a configuration diagram illustrating an example of a configuration of an integrated circuit for implementing the video decoding apparatus according to each of Embodiments.
Figure 42:
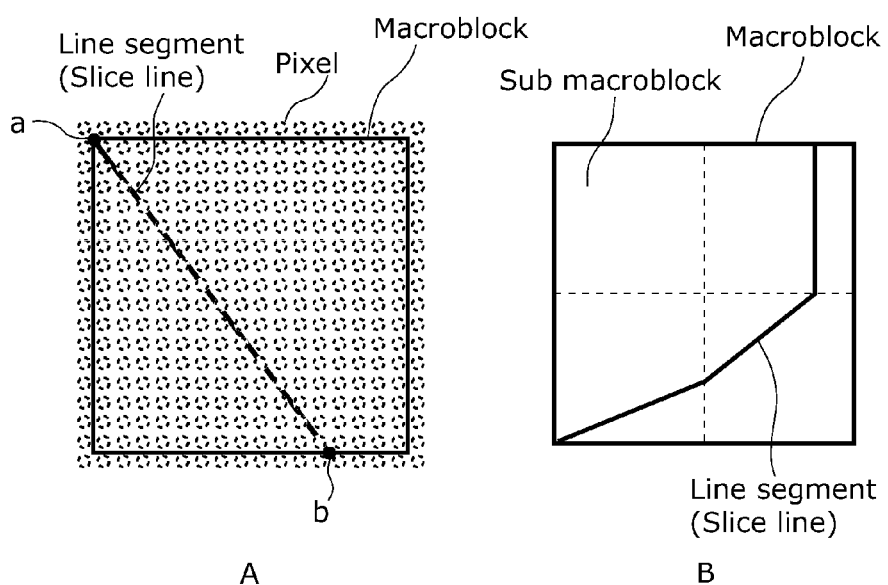
FIG. 42 is a diagram illustrating an example of a conventional macroblock segment.
Figure 43:
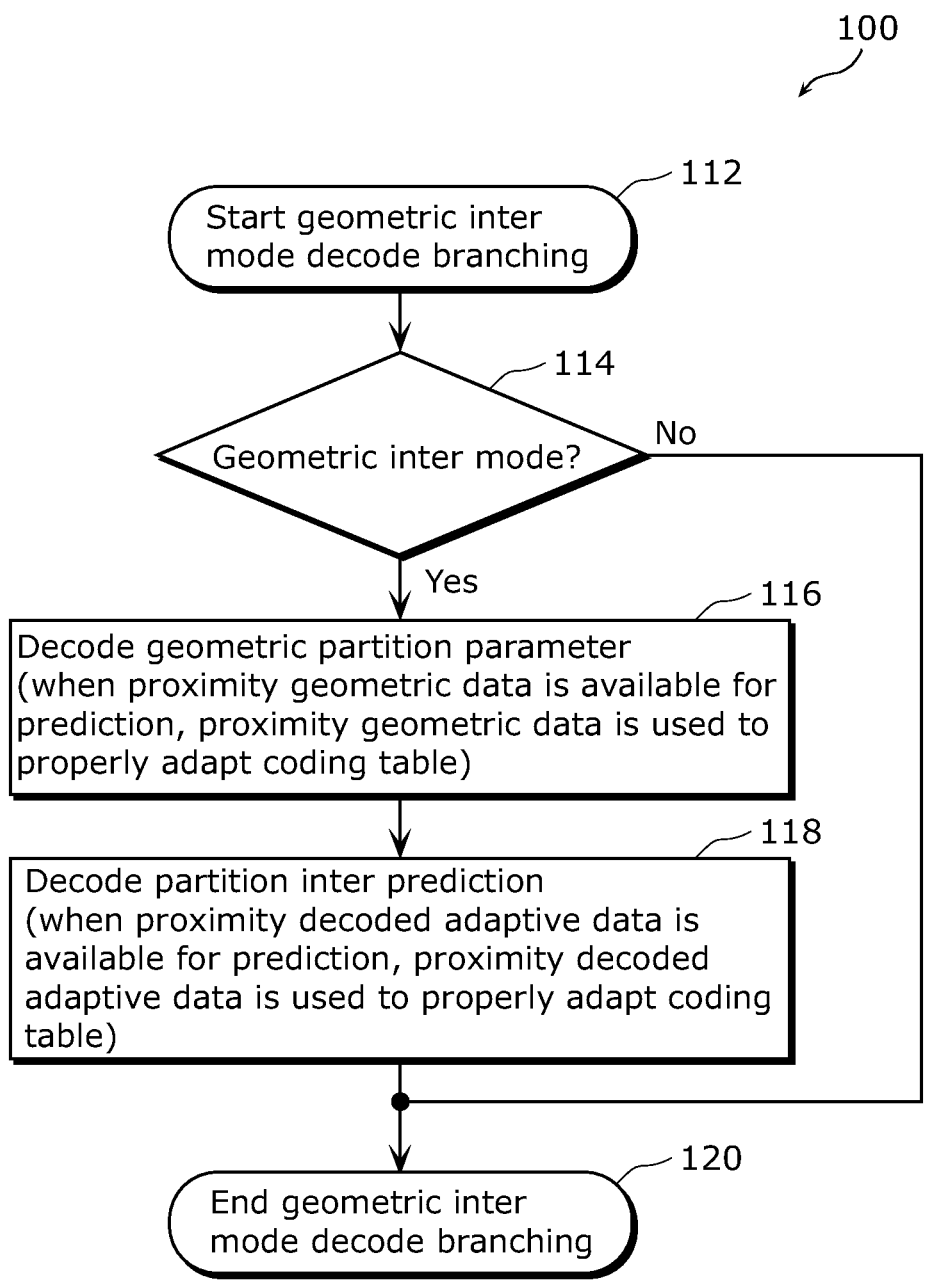
FIG. 43 is a flow chart of an exemplary method of decoding the inter prediction blocks resulting from conventional geometrical segmentation.
Figure 44:
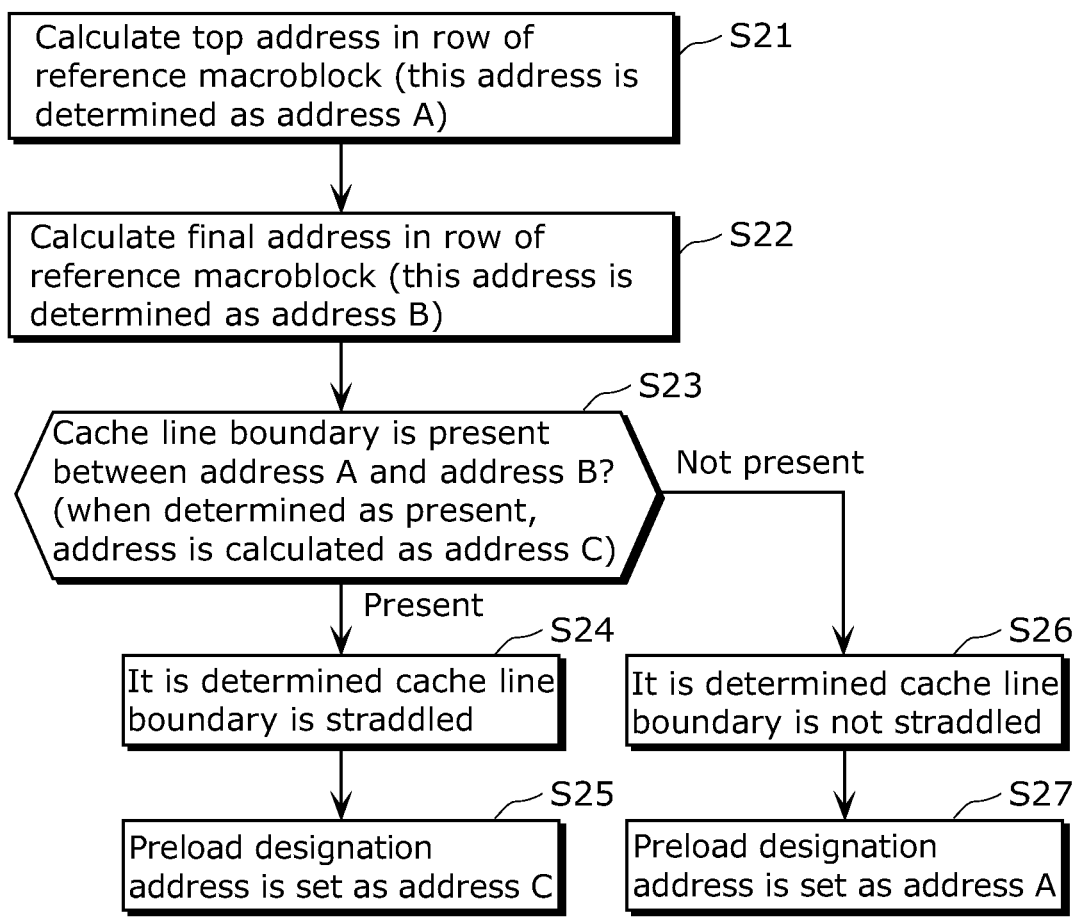
FIG. 44 is a detailed flowchart of the process of determining whether or not a reference macroblock straddles a cache line border, and the process of changing a preload designation address, performed by a conventional motion compensation apparatus.
Figure 45:
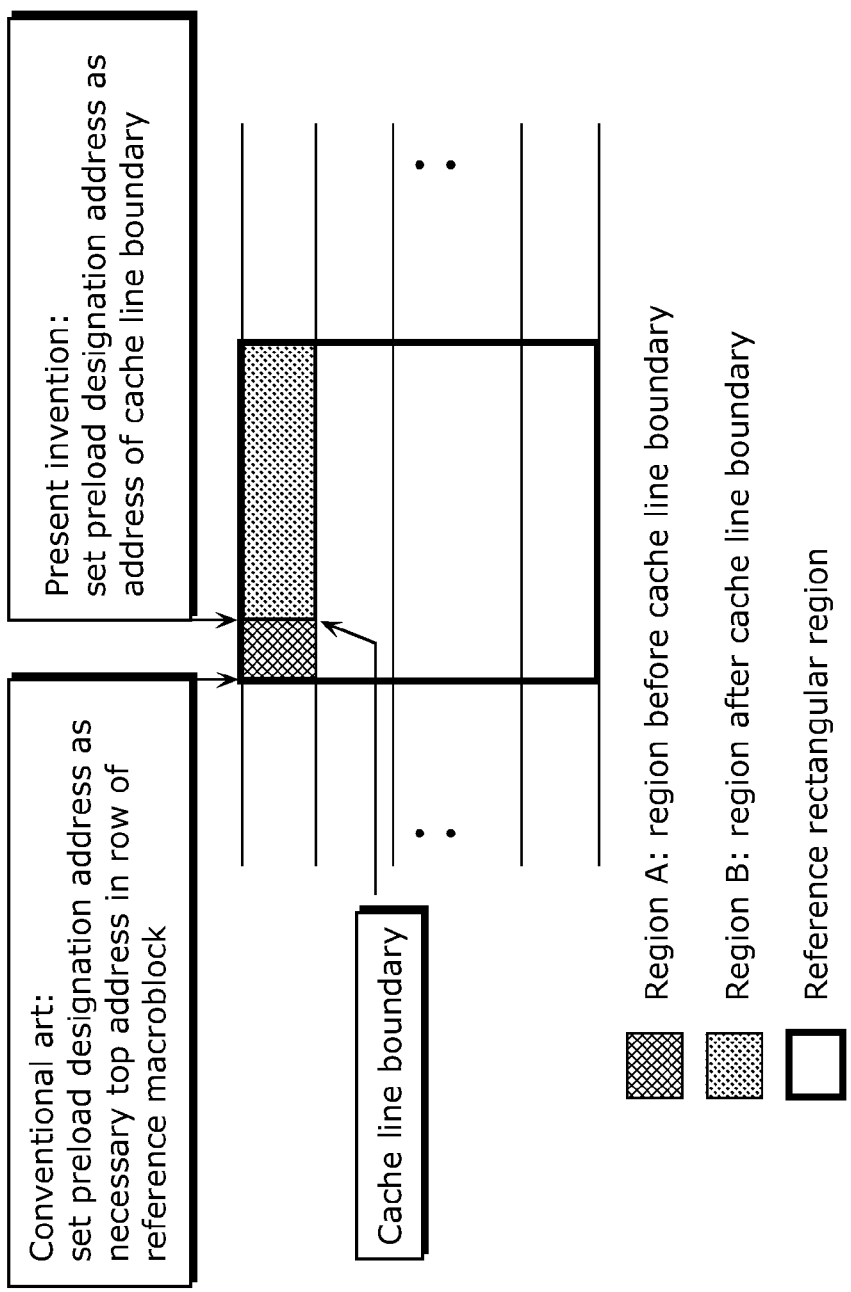
FIG. 45 is a diagram explaining a method of setting a preload designation address performed by the conventional motion compensation apparatus, when a reference macroblock straddles the cache line border.

Each of the image decoding apparatus and the method in each of the embodiments is typically achieved in the form of an integrated circuit or a Large Scale Integrated (LSI) circuit. As an example of the LSI, FIG. 41 illustrates a configuration of the LSI ex500 that is made into one chip. The LSI ex500 includes the elements ex502 to ex509 described below and each of the elements is connected via the bus ex510. The power supply circuit unit ex505 is activated by supplying each of the elements with power when the power supply circuit unit ex505 is turned on.

In addition, when decoding process is performed, for example, the LSI ex500 temporarily stores coded data obtained by the stream I/O ex506 from the demodulation processing circuit ex220 under control of the microcomputer ex502 or coded data obtained by reading from the recording medium ex215, in the memory ex511. Under control of the microcomputer ex502, the stored data is segmented into data portions according to the processing amount and speed to be transmitted to a signal processing unit ex507. Then, the signal processing unit ex507 decodes an audio signal and/or a video signal. Here, the decoding of the video signal is the decoding described in each of the embodiments described above. In addition, each of the signals may be temporarily stored in the memory ex511 or the like such that the decoded audio signal and the decoded video signal are reproduced in synchronization with each other, depending on the situation. The decoded output signal is outputted to the monitor ex219 or the like from the AV I/O ex509, via the memory ex511 and the like as necessary. According to the configuration, the memory ex511 is accessed via the memory controller ex503.

Although the memory ex511 is an element outside the LSI ex500, it may be included in the LSI ex500. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Industrial Applicability

The image decoding apparatus according to the present invention can be used for a variety of purposes The image decoding apparatus according to the present invention can be used for, for example, a high-resolution information display device or capturing device, such as a television, a digital video recorder, a car navigation, a cellular phone, a digital camera, a digital video camera, ands so on, and are useful.

Reference Signs List 100 method
12 starting block 114, 116, 118 functional block
120 end block
1000 image coding apparatus
1100 coding processing unit
1110 subtractor
1120 coding unit
1121 orthogonal transformation unit
1122 quantization unit
1123 entropy coding unit
   1124, 2112 inverse quantization unit
1125, 2113 inverse orthogonal transformation unit
1126, 2120 adder
1130, 2130 deblocking filter
1140, 2140 frame memory
1150. 2150 intra prediction unit
1160 motion estimation unit
1170, 2160 motion compensation unit
1171, 2161 reference block memory
1172, 2162 frame-memory-transfer control unit
1173, 2163 reference-block-memory-transfer control unit
1174, 2164 motion compensation processing unit
1175, 2165 reference-block-memory-state managing unit
1180, 2170 switch
1200 coding control unit
2000 image decoding apparatus
2100 decoding processing unit
2110 decoding unit
2111 entropy decoding unit
2200 decoding control unit
3000 reference image
3100, 3200, 3300, 3400 pixel block
3101, 3201, 3301, 3401, 3501, 3502, 3503, 3504 pixel
3500 reference block
ex100 content providing system
ex101 Internet
ex102 Internet service provider
ex103 streaming server
ex104 telephone network
ex106 base station
ex107 base station
ex108 base station
ex109 base station
ex110 base station
ex111 computer
ex112 PDA (Personal Digital Assistant)
ex113 camera
ex114 cellular phone
ex115 game machine
ex116 camera
ex117 microphone
ex200 digital broadcasting system
ex201 broadcast station
ex202 broadcast satellite
ex203 cable
ex204 antenna
ex205 antenna
ex210 car
ex211 car navigation
ex212 reproduction apparatus
ex213 monitor
ex215 recording medium
ex216 recording medium
ex217 set top box (STB)
ex218 reader/recorder
ex219 monitor
ex220 demodulation unit
ex230 information track
ex231 recording block
ex232 inner circumference area
ex233 data recording area
ex234 outer circumference area
ex300 television (receiver)
ex301 tuner
ex302 modulation/demodulation unit
ex303 multiplexing/demultiplexing unit
ex304 audio signal processing unit
ex305 video signal processing unit
ex306 signal processing unit
ex307 speaker
ex308 display unit
ex309 output unit
ex310 control unit
ex311 power supply circuit unit
ex312 operation input unit
ex313 bridge
ex314 slot unit
ex315 driver
ex316 modem
ex317 interface unit
ex318 buffer
ex319 buffer
ex400 information reproducing/recording unit
ex401 optical head
ex402 modulation recording unit
ex403 reproduction demodulating unit
ex404 buffer
ex405 disk motor
ex406 servo control unit
ex407 system control unit
ex500 LSI
ex502 CPU
ex503 memory controller
ex505 power supply circuit unit
ex506 stream I/O
ex507 signal processing unit
ex509 AV I/O
ex510 bus
ex511 memory

The invention claimed is:

1. A video decoding apparatus for decoding a coded stream to generate decoded video, the video decoding apparatus comprising:

a frame memory for storing a reference image;

a motion compensation unit configured to perform motion compensation on a current block to be decoded, using the reference image stored in the frame memory, the current block being included in video and having a non-rectangular shape; and a decoding unit configured to generate the decoded video from the coded stream, wherein the motion compensation unit includes:

a reference block memory for storing part of the reference image;

a frame-memory-transfer control unit configured to identify a pixel block in the reference image and transfer pixel data of the identified pixel block from the frame memory to the reference block memory, the pixel block having a rectangular shape and including a reference block that has a non-rectangular shape and is used for the motion compensation on the current block; and a motion compensation processing unit configured to generate a prediction block of the current block, using the reference block included in the pixel block stored in the reference block memory, the decoding unit is configured to block partition information and a motion vector from the coded stream and generate the decoded video from the coded stream, using the coded stream and the prediction block generated by the motion compensation unit, the block partition information indicating a shape of the reference image, and the frame-memory-transfer control unit is configured to identify the pixel block, using the block partition information and the motion vector which are obtained by the decoding unit, the pixel block having the rectangular shape and including the reference block having the non-rectangular shape.

2. The video decoding apparatus according to claim 1, wherein the motion compen sation unit further includes a reference-block-transfer control unit configured to extract the reference block having the non-rectangular shape from the pixel block having the rectangular shape, and transefer pixel data of the extracted reference block, from the reference block memory to the motion compensation processing unit, and the motion compensation processing unit is configured to generate the prediction block of the current block, using the reference block transferred from the feference block memory by the reference-block-transfer control unit.

3. The video decoding apparatus according to claim 1, wherein the frame-memory-transfer control unit is configured to identify the pixel block that circumscribes the reference block, and transfer pixel data of the identified pixel block from the frame memory to the reference block memory, the pixel block having the rectangular shape, and the reference block having the non-rectangular shape.

4. The video decoding apparatus according to claim 1, wherein the frame-memory-transfer control unit is configured to identify, from among a plurality of pixel blocks each included in the reference image and having the rectangular shape and a predetermined size, at least one pixel block including a pixel that is included in the reference block having the non-rectangular shape, and transfer pixel data of the identified at least one pixel block from the frame memory to the reference block memory.

5. The video decoding apparatus according to claim 1, wherein the motion compensation unit further includes a reference-block-memory-state managing unit configured to manage, per transfer block of a predetermined size, whether or not pixel data of the reference image is stored in the reference block memory, and the frame-memory-transfer control unit is configured to selectively transfer pixel data of the identified at least one pixel block which is not stored in the reference block memory, per transfer block managed by the reference-block-memory-state managing unit.

6. A video coding apparatus for coding video to generate a coded stream, the video coding apparatus comprising:

a frame memory for storing a reference image;

a motion compensation unit configured to perform motion compensation on a current block to be coded, using the reference image stored in the frame memory, the current block being included in video and having a non-rectangular shape; and a coding unit configured to generate coded stream from the video, wherein the motion compensation unit includes:

a reference block memory for storing part of the reference image;

a frame-memory-transfer control unit configured to identify a pixel block in the reference image and transfer pixel data of the identified pixel block from the frame memory to the reference block memory, the pixel block having a rectangular shape and including a reference block that has a non-rectangular shape and is used for the motion compensation on the current block; and a motion compensation processing unit configured to generate a prediction block of the current block, using the reference block included in the pixel block stored in the reference block memory, the coding unit is configured to generate block partition information and a motion vector, and generate the coded stream from the video, using the prediction block generated by the motion compensation unit, the block partition information indicating a shape of the reference image, and the frame-memory-transfer control unit is configured to identify the pixel block, using the block partition information and the motion vector which are generated by the coding unit, the pixel block having the rectangular shape and including the reference block having the non-rectangular shape.

7. The video coding apparatus according to claim 6, wherein the motion compensation unit further includes a reference-block-transfer control unit configured to extract the reference block from the pixel block, and transfer pixel data of the extracted reference block, from the reference block memory to the motion compensation processing unit, the pixel block having the rectangular shape, and the reference block having the non-rectangular shape, and the motion compensation processing unit is configured to generate the prediction block of the current block, using the reference block transferred from the reference block memory by the reference-block-tansfer control unit.

8. The video coding apparatus according to claim 6, wherein the frame-memory-transfer control unit is configured to identify the pixel block that circumscribes the reference block, and transfer pixel data of the identified pixel block from the frame memory to the reference block memory, the pixel block having the rectangular shape, and the reference block having the non-rectangular shape.

9. The video coding apparatus according to claim 6, wherein the frame-memory-transfer control unit is configured to identify, from among a plurality of pixel block each included in the reference image and having the rectangular shape and a predetermined size, at least one pixel block including a pixel that is included in the reference block having the non-rectangular shape and transfer the identified at least one pixel block from the frame memory to the reference block memory.

10. The video coding apparatus according to claim 6, wherein the motion compensation unit further includes a reference-block-memory-state managing unit configured to manage, per transfer block having a predetermined size, wherein or not the pixel data of the reference image is stored in the reference block memory, and the frame-memory-transfer control unit is configured to selectively transfer pixel data of the identified at least one pixel block which is not stored in the reference block memory, per transfer block managed by the reference-block-memory-state managing unit.

11. A video decoding method for decoding a coded stream to generate decoded video, which is performed by a video decoding apparatus including a frame memory for storing a reference image and a reference block memory for storing part of the reference image, the video decoding method comprising:
  performing motion compensation on a current block to be decoded, using the reference image stored in the frame memory, the current block being included in video and having a non-rectangular shape; and
  generating the decoded video from the coded stream,
  wherein the performing motion compensation includes:
    identifying a pixel block in the reference image and transferring pixel data of the identified pixel block from the frame memory to the reference block memory, the pixel block having a rectangular shape and including a reference block that has a non-rectangular shape and is used for motion compensation on the current block; and
    generating a prediction block of the current block, using the reference block included in the pixel block stored in the reference block memory,
  in the generating of the decoded video, block partition information and a motion vector are obtained from the coded stream, and the decoded video is generated from the coded stream, using the coded stream and the prediction block generated in the performing motion compensation, the block partition information indicating a shape of the reference image, and
  in the identifying, the pixel block is identified using the block partition information and the motion vector which are obtained in the generating of the decoded video, the pixel block having the rectangular shape, and the reference block having the non-rectangular shape.

12. A video coding method for coding video to generate a coded stream, which is performed by a video coding apparatus including a frame memory for storing a reference image and a reference block memory for storing part of the reference image, the video coding method comprising:
  performing motion compensation on a current block to be coded, using the reference image stored in the frame memory, the current block being included in video and having a non-rectangular shape; and
  generating the coded stream from the video,
  wherein the performing motion compensation includes:
    identifying a pixel block in the reference image and transferring pixel data of the identified pixel block from the frame memory to the reference block memory, the pixel block having a rectangular shape and including a reference block that has a non-rectangular shape and is used for motion compensation on the current block; and
    generating a prediction block of the current block, using the reference block included in the pixel block stored in the reference block memory,
  in the generating of the coded stream, block partition information and a motion vector are generated, and the coded stream is generated from the video, using the prediction block generated in the performing motion compensation, the block partition information indicating a shape of the reference image, and
  in the identifying, the pixel block is identified using the block partition information and the motion vector which are generated in the generating of the coded stream, the pixel block having the rectangular shape and including the reference block having the non-rectangular shape.

13. A non-transitory computer-readable recording medium for use in a computer, the recording medium having a computer program recorded thereon for causing a computer to decode a coded stream to generate decoded video, the computer including a frame memory for storing a reference image and a reference block memory for storing part of the reference image, and the program causing the computer to execute:
  performing motion compensation on a current block to be decoded, using the reference image stored in the frame memory, the current block being included in video and having a non-rectangular shape; and
  generating the decoded video from the coded stream,
  wherein the performing motion compensation includes:
    identifying a pixel block in the reference image and transferring pixel data of the identified pixel block from the frame memory to the reference block memory, the pixel block having a rectangular shape and including a reference block that has a non-rectangular shape and is used for motion compensation on the current block; and
    generating a prediction block of the current block, using the reference block included in the pixel block stored in the reference block memory,
  in the generating of the decoded video, block partition information and a motion vector are obtained from the coded stream, and the decoded video is generated from the coded stream, using the coded stream and the prediction block generated in the performing motion compensation, the block partition information indicating a shape of the reference image, and
  in the identifying, the pixel block is identified using the block partition information and the motion vector which are obtained in the generating of the decoded video, the pixel block having the rectangular shape, and the reference block having the non-rectangular shape.

14. A non-transitory computer-readable recording medium for use in a computer, the recording medium having a computer program recorded thereon for causing a computer to code video to generate a coded stream, the computer including a frame memory for storing a reference image and a reference block memory for storing part of the reference image, and the program causing the computer to execute:
  performing motion compensation on a current block to be coded, using the reference image stored in the frame memory, the current block being included in video and having a non-rectangular shape; and
  generating the coded stream from the video,
  wherein the performing motion compensation includes:
    identifying a pixel block in the reference image and transferring pixel data of the identified pixel block from the frame memory to the reference block memory, the pixel block having a rectangular shape and including a reference block that has a non-rectangular shape and is used for motion compensation on the current block; and
    generating a prediction block of the current block, using the reference block included in the pixel block stored in the reference block memory,
  in the generating of the coded stream, block partition information and a motion vector are generated, and the coded stream is generated from the video, using the prediction block generated in the performing motion compensation, the block partition information indicating a shape of the reference image, and
  in the identifying, the pixel block is identified using the block partition information and the motion vector which are generated in the generating of the coded stream, the pixel block having the rectangular shape and including the reference block having the non-rectangular shape.

15. An integrated circuit for decoding a coded stream to generate decoded video, the integrated circuit comprising:
  a frame memory for storing a reference image;
  a motion compensation unit configured to perform motion compensation on a current block to be decoded, using the reference image stored in the frame memory, the current block being included in video and having a non-rectangular shape; and a decoding unit configured to generate the decoded video from the coded stream, wherein the motion compensation unit includes:

a reference block memory for storing part of the reference image;

a frame-memory-transfer control unit configured to identify a pixel block in the reference image and transfer pixel data of the identified pixel block from the frame memory to the reference block memory, the pixel block having a rectangular shape and including a reference block that has a non-rectangular shape and is used for the motion compensation on the current block; and a motion compensation processing unit configured to generate a prediction block of the current block, using the reference block included in the pixel block stored in the reference block memory, the decoding unit is configured to obtain block partition information and a motion vector from the coded stream and generate the decoded video from the coded stream, using the coded stream and the prediction block generated by the motion compensation unit, the block partition information indicating a shape of the reference image, and the frame-memory-transfer control unit is configured to identify the pixel block, using the block partition information and the motion vector which are obtained by the decoding unit, the pixel block having the rectangular shape and including the reference block having the non-rectangular shape.

16. An integrated circuit for coding video to generate a coded stream, the integrated circuit comprising:

a frame memory for storing a reference image;

a motion compensation unit configured to perform motion compensation on a current block to be coded, using the reference image stored in the frame memory, the current block being included in video and having a non-rectangular shape; and a coding unit configured to generate the coded stream from the video, wherein the motion compensation unit includes:

a reference block memory for storing part of the reference image;

a frame-memory-transfer control unit configured to identify a pixel block in the reference image and transfer pixel data of the identified pixel block from the frame memory to the reference block memory, the pixel block having a rectangular shape and including a reference block that has a non-rectangular shape and is used for the motion compensation on the current block; and a motion compensation processing unit configured to generate a prediction block of the current block, using the reference block included in the pixel block stored in the reference block memory, the coding unit is configured to generate block partition information and a motion vector, and generate the coded stream from the video, using the prediction block generated by the motion compensation unit, the block partition information indicating a shape of the reference image, and the frame-memory-transfer control unit is configured to identify the pixel block, using the block partition information and the motion vector which are generated by the coding unit, the pixel block having the rectangular shape and including the reference block having the non-rectangular shape.

* * * * *